United States Patent
Park et al.

(10) Patent No.: US 10,911,193 B2
(45) Date of Patent: Feb. 2, 2021

(54) METHOD FOR TRANSMITTING/RECEIVING PPDU IN WIRELESS COMMUNICATION SYSTEM AND APPARATUS THEREFOR

(71) Applicant: LG ELECTRONICS INC., Seoul (KR)

(72) Inventors: Eunsung Park, Seoul (KR); Wookbong Lee, Seoul (KR); Jinsoo Choi, Seoul (KR); Hangyu Cho, Seoul (KR); Jiwon Kang, Seoul (KR); Kilbom Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/329,227

(22) PCT Filed: Oct. 15, 2015

(86) PCT No.: PCT/KR2015/010888
§ 371 (c)(1),
(2) Date: Jan. 25, 2017

(87) PCT Pub. No.: WO2016/089003
PCT Pub. Date: Jun. 9, 2016

(65) Prior Publication Data
US 2018/0212725 A1    Jul. 26, 2018

Related U.S. Application Data

(60) Provisional application No. 62/087,804, filed on Dec. 5, 2014, provisional application No. 62/089,217, filed (Continued)

(51) Int. Cl.
*H04L 5/00* (2006.01)
*H04L 27/26* (2006.01)
(Continued)

(52) U.S. Cl.
CPC ......... *H04L 5/0044* (2013.01); *H04B 7/0452* (2013.01); *H04L 27/26* (2013.01);
(Continued)

(58) Field of Classification Search
CPC ............... H04L 5/0044; H04L 27/2659; H04L 27/2663; H04L 5/0007; H04B 7/0452; H04W 84/12
See application file for complete search history.

(56) References Cited

U.S. PATENT DOCUMENTS 9,794,044 B2 * 10/2017 Sun .................... H04L 5/0007
2012/0327871 A1   12/2012 Ghosh et al.
(Continued)

FOREIGN PATENT DOCUMENTS

WO   2011130363   10/2011
WO   2013033231   3/2013

OTHER PUBLICATIONS

PCT International Application No. PCT/KR2015/010888, Written Opinion of the International Searching Authority dated Feb. 11, 2016, 3 pages.

*Primary Examiner* — Peter P Chau
(74) *Attorney, Agent, or Firm* — Lee, Hong, Degerman, Kang & Waimey

(57) ABSTRACT

The present invention relates to a method for transmitting and receiving a Physical Protocol Data Unit (PPDU) and an apparatus for supporting the same. Particularly, a method for transmitting a Physical Protocol Data Unit (PPDU) performed by an apparatus in a wireless communication system may include generating a High Efficiency-Short Training Field (HE-STF) sequence in a frequency domain throughout a transmission bandwidth of the PPDU and transmitting the PPDU that includes an HE-STF field which is constructed based on the HE-STF sequence, wherein the HE-STF sequence may be mapped to a data tone except a direct (Continued)

current tone and a guard tone, and wherein a non-zero value may be mapped to all data tones that include a tone index which is a multiple of a predetermined value in the data tone.

7 Claims, 17 Drawing Sheets

Related U.S. Application Data on Dec. 8, 2014, provisional application No. 62/092,843, filed on Dec. 17, 2014, provisional application No. 62/120,884, filed on Feb. 26, 2015, provisional application No. 62/147,601, filed on Apr. 15, 2015.

(51) Int. Cl.
*H04B 7/0452* (2017.01)
*H04W 84/12* (2009.01)
(52) U.S. Cl.
CPC ...... *H04L 27/2659* (2013.01); *H04L 27/2663* (2013.01); *H04L 5/0007* (2013.01); *H04W 84/12* (2013.01)

(56) References Cited

U.S. PATENT DOCUMENTS

| | | | |
|---|---|---|---|
| 2013/0286959 A1 | 10/2013 | Lou et al. | |
| 2014/0211775 A1 | 7/2014 | Sampath et al. | |
| 2015/0117227 A1* | 4/2015 | Zhang | H04L 1/0057 370/245 |
| 2015/0146653 A1* | 5/2015 | Zhang | H04L 5/0041 370/329 |
| 2016/0087766 A1* | 3/2016 | Sun | H04L 5/0007 370/329 |
| 2016/0128005 A1* | 5/2016 | Chen | H04L 27/2613 455/127.2 |
| 2016/0165482 A1* | 6/2016 | Yang | H04L 27/2613 370/336 |
| 2017/0047971 A1* | 2/2017 | Seok | H04L 27/2602 |
| 2017/0104565 A1* | 4/2017 | Seok | H04L 5/0044 |
| 2017/0105143 A1* | 4/2017 | Seok | H04W 28/06 |
| 2017/0105213 A1* | 4/2017 | Seok | H04W 72/0446 |
| 2017/0118775 A1* | 4/2017 | Seok | H04W 74/0816 |
| 2017/0171861 A1* | 6/2017 | Seok | H04W 72/0453 |
| 2017/0201944 A1* | 7/2017 | Lin | H04W 52/0229 |

* cited by examiner

FIG. 12

| L-STF | L-LTF | L-SIG | HE-SIG A | | | | |
|-------|-------|-------|----------|----------|--------|--------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

FIG. 13

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

FIG. 14

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

METHOD FOR TRANSMITTING/RECEIVING PPDU IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/010888, filed on Oct. 15, 2015, which claims the benefit of U.S. Provisional Application No. 62/087,804, filed on Dec. 5, 2014, 62/089,217, field on Dec. 8, 2014, 62/092,843, filed on Dec. 17, 2014, 62/120,884, filed on Feb. 26, 2015, and 62/147,601, filed on Apr. 15, 2015, the contents of which are all hereby incorporated by reference herein in their entirety.

TECHNICAL FIELD

The present invention relates to wireless communication systems, and more particularly, to a method for transmitting and receiving single-user (SU) or multi-user (MU) Physical Protocol Data Unit (PPDU) and an apparatus for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

In a next generation WLAN system, a new PPDU format is defined, and according to this, it is required to define High-Efficiency Short Training Field (HE-STF) which is used for improving performance of Automatic Gain Control (AGC) estimation.

According to this, an object of the present invention is to propose a method for generating HE-STF frequency domain sequence.

Another object of the present invention is to propose a method for transmitting and receiving a PPDU that includes an HE-STF field.

The objects of the present invention are not limited to the technical objects described above, and other technical objects not mentioned herein may be understood to those skilled in the art from the description below.

Technical Solution

In an aspect, a method for transmitting a Physical Protocol Data Unit (PPDU) performed by an apparatus in a wireless communication system may include generating a High Efficiency-Short Training Field (HE-STF) sequence in a frequency domain throughout a transmission bandwidth of the PPDU and transmitting the PPDU that includes an HE-STF field which is constructed based on the HE-STF sequence, wherein the HE-STF sequence may be mapped to a data tone except a direct current tone and a guard tone, and wherein a non-zero value may be mapped to all data tones that include a tone index which is a multiple of a predetermined value in the data tone.

In another aspect, an apparatus for transmitting a Physical Protocol Data Unit (PPDU) in a wireless communication system may include a radio frequency (RF) unit configured to transmit and receive a wireless signal and a processor configured to control the RF unit, wherein the processor is configured to perform: generating a High Efficiency-Short Training Field (HE-STF) sequence in a frequency domain throughout a transmission bandwidth of the PPDU and transmitting the PPDU that includes an HE-STF field which is constructed based on the HE-STF sequence, wherein the HE-STF sequence may be mapped to a data tone except a direct current tone and a guard tone, and wherein a non-zero value may be mapped to all data tones that include a tone index which is a multiple of a predetermined value in the data tone.

Preferably, the predetermined value may be 16 when the HE-STF field has 0.8 µs periodicity, and wherein the predetermined value may be 8 when the HE-STF field has 1.6 µs periodicity.

Preferably, the HE-STF sequence may be generated based on a subsequence including $(\sqrt{1/2})$ {-1-j, 0, 0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 1+j, 0, 0, 0, -1-j, 0, 0, 0, -1-j, 0, 0, 0, 1+j, 0, 0, 0, 1+j, 0, 0, 0, 1+j, 0, 0, 0, 1+j, 0, 0, 0, 1+j}.

Preferably, the HE-STF sequence may be generated by upscaling four times the tone index of the subsequence, in the case that the PPDU bandwidth is 20 MHz, when the HE-STF field has 0.8 µs periodicity.

Preferably, wherein the HE-STF sequence may be generated by upscaling four times the tone index of the subsequence including {subsequence, 0, 0, 0, 0, 0, 0, 0, subsequence}, and wherein any one value which is predefined among 1, -1, j and j may be multiplied to each of the subsequences, respectively, in the case that the PPDU bandwidth is 40 MHz, when the HE-STF field has 0.8 µs periodicity.

Preferably, the HE-STF sequence may be generated by upscaling four times the tone index of the subsequence that includes {subsequence, 0, 0, 0, a, 0, 0, 0, subsequence, 0, 0, 0, 0, 0, 0, 0, subsequence, 0, 0, 0, b, 0, 0, 0, subsequence}, wherein any one value which is predefined among 1, -1, j and j may be multiplied to each of the subsequences, respectively, and wherein a predefined value or a single value which is arbitrarily selected among $(\sqrt{1/2})(1+j)$, $(\sqrt{1/2})(1-j)$, $(\sqrt{1/2})(-1+j)$ and $(\sqrt{1/2})(-1-j)$ values may be allocated to a and b, respectively, in the case that the PPDU bandwidth is 80 MHz, when the HE-STF field has 0.8 µs periodicity.

Preferably, the HE-STF sequence may be generated by upscaling two times the tone index of the subsequence that includes {subsequence, 0, 0, 0, 0, 0, 0, 0, subsequence}, in the case that the PPDU bandwidth is 20 MHz, when the HE-STF field has 1.6 µs periodicity.

Preferably, the HE-STF sequence may be generated by upscaling two times the tone index of the subsequence that includes {subsequence, 0, 0, 0, a, 0, 0, 0, subsequence, 0, 0, 0, 0, 0, 0, 0, subsequence, 0, 0, 0, b, 0, 0, 0, subsequence}, wherein any one value which is predefined among 1, -1, j and j may be multiplied to each of the subsequences, respectively, and wherein a predefined value or a single value which is arbitrarily selected among $(\sqrt{1/2})(1+j)$, $(\sqrt{1/2})(1-j)$, $(\sqrt{1/2})(-1+j)$ and $(\sqrt{1/2})(-1-j)$ values may be allocated to a and b, respectively, in the case that the PPDU bandwidth is 40 MHz, when the HE-STF field has 1.6 µs periodicity.

Preferably, zero value may be allocated to a tone that has tone indexes -248 and 248.

Preferably, the HE-STF sequence may be generated by upscaling two times the tone index of the subsequence that includes {subsequence, 0, 0, 0, a, 0, 0, 0, subsequence, 0, 0, 0, b, 0, 0, 0, subsequence, 0, 0, 0, c, 0, 0, 0, subsequence, 0, 0, 0, 0, 0, 0, subsequence, 0, 0, 0, d, 0, 0, 0, subsequence, 0, 0, 0, e, 0, 0, 0, subsequence, 0, 0, 0, f, 0, 0, 0, subsequence}, wherein any one value which is predefined among 1, -1, j and j may be multiplied to each of the subsequences, respectively, and wherein a predefined value or a single value which is arbitrarily selected among $(\sqrt{1/2})(1+j)$, $(\sqrt{1/2})(1-j)$, $(\sqrt{1/2})(-1+j)$ and $(\sqrt{1/2})(-1-j)$ values may be allocated to a, b, c, d, e and f, respectively, in the case that the PPDU bandwidth is 80 MHz, when the HE-STF field has 1.6 µs periodicity.

Preferably, zero value may be allocated to a tone that has tone indexes -504 and 504.

Preferably, a phase rotation may be applied to the generated HE-STF sequence for each 20 MHz sub channel.

Technical Effects

According to the embodiment of the present invention, a peak-to-power average ratio (PAPR) with respect to an HE-STF field may be minimized.

Further, according to the embodiment of the present invention, a PPDU that includes an HE-STF field which is configured based on HE-STF sequence may be smoothly transmitted and received at a transmitting/receiving terminal.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 12 is a diagram exemplifying an HE format PPDU according to an embodiment of the present invention.

FIG. 13 is diagram exemplifying an HE format PPDU according to an embodiment of the present invention.

FIG. 14 is a diagram exemplifying an HE format PPDU according to an embodiment of the present invention.

BEST MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

General System

Figure 1:
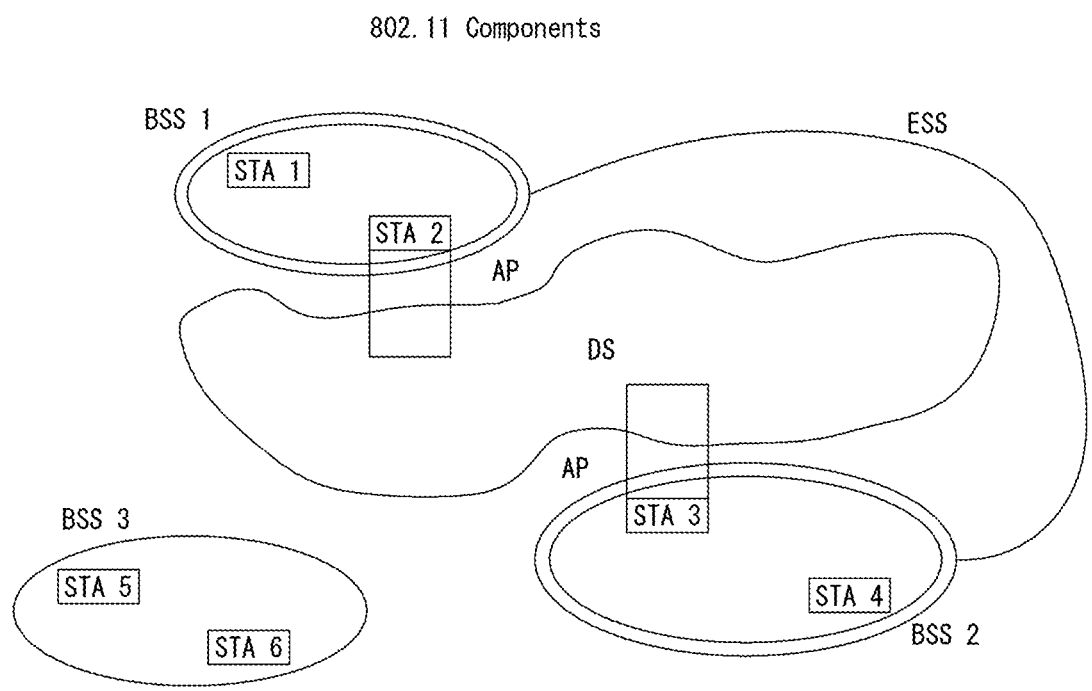
FIG. 1 is a diagram illustrating an example of IEEE 802.11 system to which the present invention may be applied.

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Figure 2:
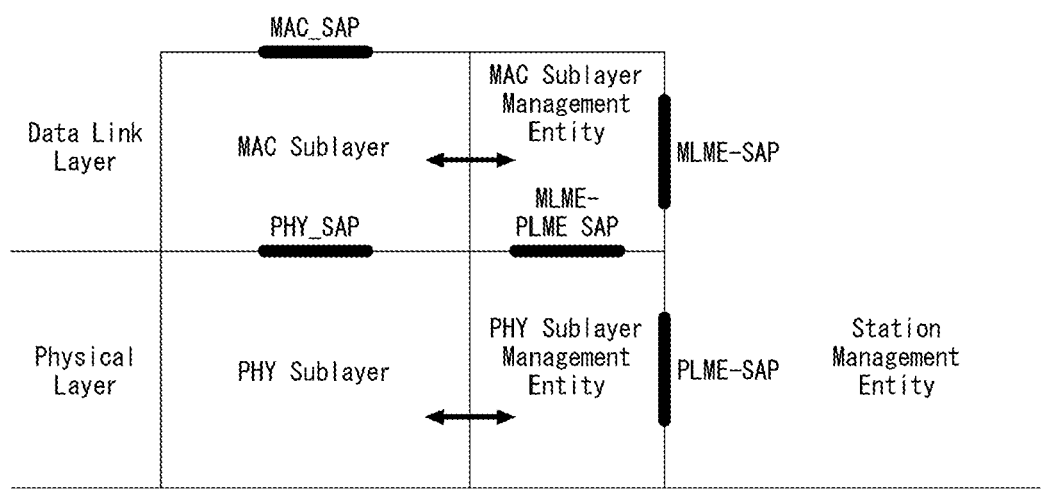
FIG. 2 is a diagram exemplifying a structure of layer architecture in IEEE 802.11 system to which the present invention may be applied.

FIG. 2 is a diagram exemplifying a structure of layer architecture in IEEE 802.11 system to which the present invention may be applied.

Referring to FIG. 2, the layer architecture in the IEEE 802.11 system may include Medium Access Control (MAC) sublayer/layer and PHY sublayer/layer.

The PHY may be divided into a Physical Layer Convergence Procedure (PLCP) entity and a Physical Medium Dependent (PMD) entity. In this case, the PLCP entity performs a role of connecting the MAC and a data frame, and the PMD entity performs a role of wirelessly transmitting and receiving data with two or more STAs.

Both of the MAC and the PHY may include management entities, and each of them may be referred to MAC Sublayer Management Entity (MLME) and Physical Sublayer Management Entity (PLME), respectively. These management entities provide a layer management service interface through an operation of layer management function. The MLME may be connected to the PLME, and perform a management operation of MAC, and similarly, the PLME may be connected to the MLME, and perform a management operation of PHY.

In order to provide an accurate MAC operation, a Station Management Entity (SME) may be existed in each STA. The SME is a management entity independent from each layer, and collects layer based state information from the MLME and the PLME or configures a specific parameter value of each layer. The SME may perform such a function by substituting general system management entities, and may implement a standard management protocol.

The MLME, the PLME and the SME may interact in various methods based on a primitive. Particularly, XX-GET.request primitive is used for requesting a Management Information Base (MIB) attribute value. XX-GET.confirm primitive returns the corresponding MIB attribute value when the state of it is in 'SUCCESS', otherwise, returns a state field with an error mark. XX-SET.request primitive is used for requesting to configure a designated MIB attribute to a given value. When the MIB attribute signifies a specific operation, the request requests an execution of the specific operation. And, when a state of XX-SET.request primitive is in 'SUCCESS', this means that the designated MIB attribute is configured as the requested value. When the MIB attribute signifies a specific operation, the primitive is able to verify that the corresponding operation is performed.

PHY provides an interface to MAC through TXVECTOR, RXVECTOR and PHYCONFIG_VECTOR. The TXVECTOR supports a transmission parameter to PHY for each PPDU. By using the RXVECTOR, PHY notifies the received PPDU parameter to MAC. The TXVECTOR is delivered to PHY from MAC through PHY-TXSTART.request primitive, and the RXVECTOR is delivered to MAC from PHY through PHY-RX S TART.indication primitive.

By using the PHYCONFIG_VECTOR, MAC configures an operation of PHY regardless of transmission and reception of frame.

The operation in each sublayer (or layer) will be briefly described as follows.

MAC generates one or more MAC Protocol Data Unit (MPDU) by attaching a MAC header and Frame Check Sequence (FCS) to a MAC Service Data Unit (MSDU) delivered from a higher layer (e.g., LLC) or a fragment of the MSDU. The generated MPDU is delivered to PHY.

When an aggregated MSDU (A-MSDU) scheme is used, a plurality of MSDUs may be merged into one A-MSDU. The MSDU merging operation may be performed in a MAC higher layer. The A-MSDU is delivered to PHY as a single MPDU (i.e., not being fragmented).

PHY generates a Physical Protocol Data Unit (PPDU) by attaching an additional field that includes required information to a Physical Service Data Unit (PSDU) received from MAC by a physical layer transceiver. The PPDU is transmitted through a wireless medium.

Since the PSDU is a unit that PHY receives from MAC and MPDU is a unit that MAC transmits to PHY, the PSDU is the same as the MPDU, substantially.

When an aggregated MPDU (A-MPDU) scheme is used, a plurality of MPDUs (in this case, each MPDU may carry the A-MPDU) may be merged into a single A-MPDU. The MPDU merging operation may be performed in a MAC lower layer. Various types of MPDU (e.g., QoS data, Acknowledge (ACK), block ACK, etc.) may be merged into the A-MPDU. PHY receives the A-MPDU from MAC as a single PSDU. That is, the PSDU includes a plurality of MPDUs. Accordingly, the A-MPDU is transmitted through a wireless medium within a single PPDU.

Physical Protocol Data Unit (PPDU) Format

A Physical Protocol Data Unit (PPDU) signifies a data block which is generated in physical layer. Hereinafter, the PPDU format will be described based on IEEE 802.11 WLAN system to which the present invention may be applied.

Figure 3:
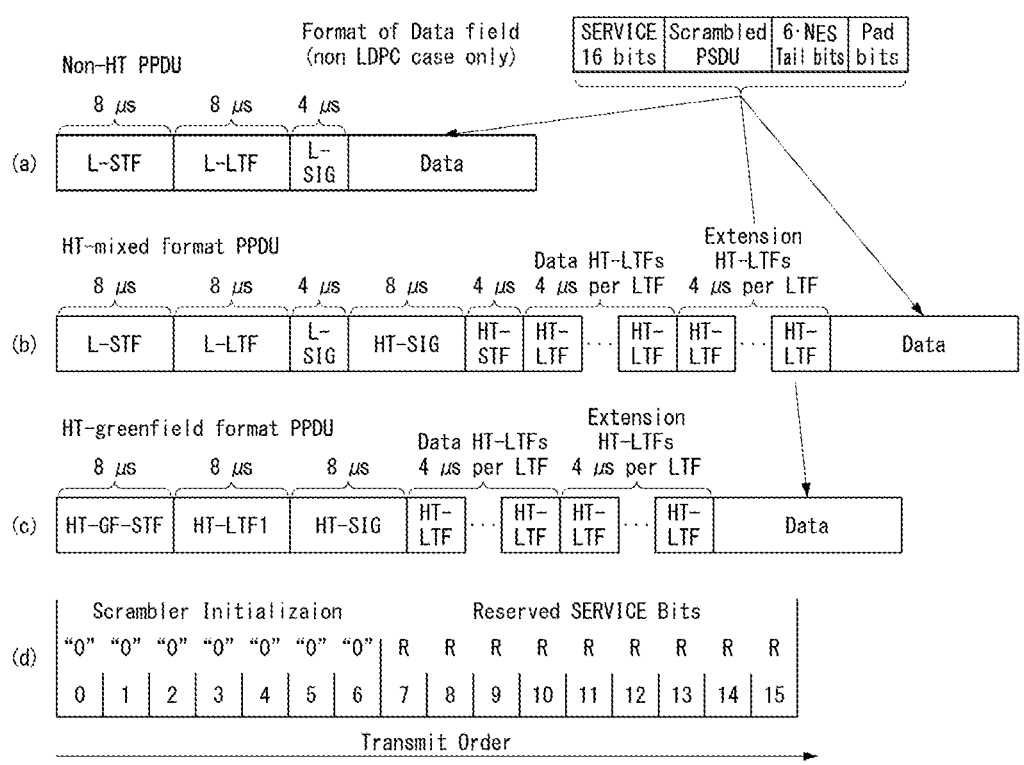
FIG. 3 exemplifies a non-HT format PPDU and an HT format PPDU of a wireless communication system to which the present invention may be applied.

FIG. 3 exemplifies a non-HT format PPDU and an HT format PPDU of a wireless communication system to which the present invention may be applied.

FIG. 3(a) exemplifies the non-HT format for supporting IEEE 802.11a/g system. The non-HT PPDU may also be called a legacy PPDU.

Referring to FIG. 3(a), the non-HT format PPDU includes a legacy format preamble that includes a Legacy (or Non-HT) Short Training field (L-STF), a Legacy (or Non-HT) Long Training field (L-LTF) and a Legacy (or Non-HT) SIGNAL (L-SIG) field, and a data field.

The L-STF may include a short training orthogonal frequency division multiplexing (OFDM) symbol. The L-STF may be used for frame timing acquisition, Automatic Gain Control (AGC), diversity detection and coarse frequency/time synchronization.

The L-LTF may include a long training orthogonal frequency division multiplexing (OFDM) symbol. The L-LTF may be used for fine frequency/time synchronization and channel estimation.

The L-SIG field may be used for transmitting control information for demodulating and decoding a data field. The L-SIG field may include information on a data rate and a data length.

FIG. 3(b) exemplifies an HT-mixed format PPDU for supporting both IEEE 802.11n system and IEEE 802.11a/g system.

Referring to FIG. 3(b), the HT-mixed format PPDU includes an HT format preamble that includes a legacy format preamble including the L-STF, the L-LTF and the L-SIG field, an HT-Signal (HT-SIG) field, an HT Short Training field (HT-STF) and an HT Long Training field (HT-LTF), and a data field.

Since the L-STF, the L-LTF and the L-SIG field signify legacy fields for backward compatibility, the fields from the L-STF to the L-SIG field are identical to those of the non-HT format. The L-STA may interpret a data field through the L-STF, the L-LTF and the L-SIG field even though the L-STA receives a HT-mixed PPDU. However, the L-LTF may further include information for channel estimation such that an HT-STA receives the HT-mixed PPDU and demodulates the L-SIG field and the HT-SIG field.

The HT-STA may notice that the field behind the legacy field is the HT-mixed format PPDU using the HT-SIG field, and based on this, the HT-STA may decode the data field.

The HT-LTF field may be used for channel estimation for demodulating the data field. Since IEEE 802.11n standard supports Single-User Multi-Input and Multi-Output (SU-MIMO), a plurality of the HT-LTF fields may be included for the channel estimation with respect to each data field transmitted via a plurality of spatial streams.

The HT-LTF field may include a data HT-LTF used for channel estimation with respect to spatial stream and an extension HT-LTF additionally used for full channel sounding. Accordingly, the number of a plurality of HT-LTF may be equal to or more than the number of transmitted spatial stream.

In the HT-mixed format PPDU, the L-STF, the L-LTF and the L-SIG field are firstly transmitted such that an L-STA also receives and acquires data. Later, the HT-SIG field is transmitted for demodulating and decoding the data transmitted for the HT-STA.

Up to the HT-SIG field, fields are transmitted without performing beamforming such that the L-STA and the HT-STA receive the corresponding PPDU and acquire data, and wireless signal transmission is performed through precoding for the HT-STF, the HT-LTF and the data field, which are transmitted later. Herein, the plurality of HT-LTF and the data field are transmitted after transmitting the HT-STF such that the STA that receives data through precoding may consider the part in which power is varied by precoding.

FIG. 3(c) exemplifies an HT-greenfield (HT-GF) format PPDU for supporting IEEE 802.11n system only.

Referring to FIG. 3(c), the HT-GF format PPDU includes an HT-GF-STF, an HT-LTF1, an HT-SIG field, a plurality of HT-LTF2 and a data field.

The HT-GF-STF is used for frame time acquisition and AGC.

The HT-LTF1 is used for channel estimation.

The HT-SIG field is used for demodulating and decoding the data field.

The HT-LTF2 is used for channel estimation for demodulating the data field. Similarly, since the HT-STA requires channel estimation for each data field transmitted via a plurality of spatial streams due to the use of SU-MIMO, a plurality of HT-LTF2 may be included.

The plurality of HT-LTF2 may include a plurality of DATA HT-LTF and a plurality of extension HT-LTF, similar to the HT-LTF field of the HT-mixed PPDU.

In FIGS. 3(a) to 3(c), the data field is a payload, and the data field may include a SERVICE field, a scrambled PSDU field, Tail bits, and padding bits. All bits of the data field are scrambled.

FIG. 3(d) illustrates a SERVICE field included in the data field. The SERVICE field has 16 bits. Each bit is placed from number 0 to 15, and sequentially transmitted from number 0 bit. 0 to 6 numbered bits are set to zero, and are used for synchronizing descrambler within a receiver terminal.

In order to effectively utilize radio channels, IEEE 802.11ac WLAN system supports a transmission of downlink Multi User Multiple Input Multiple Output (MU-MIMO) scheme in which a plurality of STAs access channel simultaneously. According to the MU-MIMO transmission scheme, an AP may transmit packets to one or more STAs that are paired by MIMO simultaneously.

A downlink multi-user (DL MU) transmission means a technique that an AP transmits a PPDU to a plurality of non-AP STAs through the same time resource through one or more antennas.

Hereinafter, the MU PPDU means a PPDU that transmits one or more PSDUs for one or more STAs using the MU-MIMO technique or the 01-DMA technique. And the SU PPDU means a PPDU which is available to deliver only one PSDU or a PPDU that has a format in which the PSDU is not existed.

For the MU-MIMO transmission, the size of the control information transmitted to an STA may be relatively greater than that of the control information based on 802.11n. Examples of the control information additionally required for supporting the MU-MIMO may include information indicating the number of spatial stream received by each STA, the information related to modulating and coding the data transmitted to each STA, and the like.

Accordingly, when the MU-MIMO transmission is performed for providing data service to a plurality of STAs simultaneously, the size of transmitted control information may increase as the number of STAs that receive the control information.

As such, in order to effectively transmit the increasing size of the control information, a plurality of control information required for the MU-MIMO transmission may be transmitted by being classified into common control information commonly required for all STAs and dedicated control information individually required for a specific STA.

Figure 4:
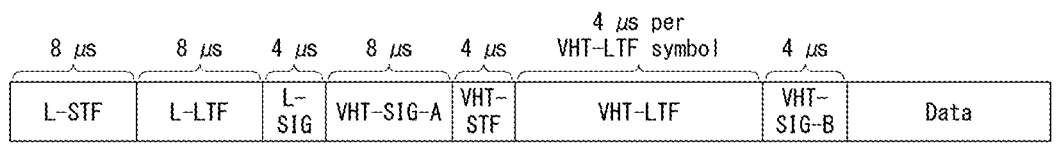
FIG. 4 exemplifies a VHT format PPDU of a wireless communication system to which the present invention may be applied.

FIG. 4 exemplifies a VHT format PPDU of a wireless communication system to which the present invention may be applied.

Referring to FIG. 4, the VHT format PPDU includes a legacy format preamble that includes the L-STF, the L-LTF and the L-SIG field and a VHT format preamble that includes a VHT-Signal-A (VHT-SIG-A) field, a VHT Short Training field (VHT-STF), a VHT Long Training field (VHT-LTF) and a VHT-Signal-B (VHT-SIG-B) field and a data field.

Since the L-STF, the L-LTF and the L-SIG field signify legacy fields for backward compatibility, the fields from the L-STF to the L-SIG field are identical to those of the non-HT format. However, the L-LTF may further include information for channel estimation to be performed to demodulate the L-SIG field and the VHT-SIG-A field.

The L-STF, the L-LTF, the L-SIG field and the VHT-SIG-A field may be repeatedly transmitted in a unit of 20 MHz channel. For example, when a PPDU is transmitted through four 20 MHz channels (i.e., 80 MHz bandwidth), the L-STF, the L-LTF, the L-SIG field and the VHT-SIG-A field may be repeatedly transmitted in every 20 MHz channel.

The VHT-STA may be aware whether the PPDU is the VHT format PPDU using the VHT-SIG-A field which follows the legacy field, and based on this, the VHT-STA may decode the data field.

In the VHT format PPDU, the L-STF, the L-LTF and the L-SIG field are firstly transmitted such that an L-STA also receives and acquires data. Later, the VHT-SIG-A field is transmitted for demodulating and decoding the data transmitted for the VHT-STA.

The VHT-SIG-A field is a field for transmitting common control information between VHT STAs paired with an AP in MIMO scheme, and includes the control information for interpreting the received VHT format PPDU.

The VHT-SIG-A field may include a VHT-SIG-A1 field and a VHT-SIG-A2 field.

The VHT-SIG-A1 field may include channel bandwidth (BW) information to use, information on whether to apply Space Time Block Coding (STBC), Group Identifier (Group ID) information for indicating a group of STAs that are grouped in MU-MIMO scheme, information of the Number of space-time stream (NSTS) to use/Partial association Identifier (AID) and Transmit power save forbidden information. Herein, the Group ID may signify an identifier allocated to an STA group which is to be transmitted for supporting MU-MIMO transmission, and may represent whether the currently used MIMO transmission scheme is MU-MIMO or SU-MIMO.

Table 1 below exemplifies the VHT-SIG-A1 field.

TABLE 1

| Field | Bit | Description |
|---|---|---|
| BW | 2 | In the case of 20 MHz, set to '0', In the case of 40 MHz, set to '1', In the case of 80 MHz, set to '2', In the case of 160 MHz or 80 + 80 MHz, set to '3'. |
| Reserved | 1 | |
| STBC | 1 | In the case of VHT SU PPDU: In the case that STBC is used, set to '1', Otherwise, set to '0' In the case of VHT MU PPDU: Set to '0' |
| Group ID | 6 | Indicate Group ID '0' or '63' indicates VHT SU PPDU, otherwise indicates VHT MU PPDU |

TABLE 1-continued

| Field | Bit | Description |
|---|---|---|
| NSTS/Partial AID | 12 | In the case of VHT MU PPDU, divided by 4 user position 'p' each having 3 bits<br>In the case that space time stream is 0, set to '0',<br>In the case that space time stream is 1, set to '1',<br>In the case that space time stream is 2, set to '2',<br>In the case that space time stream is 3, set to '3',<br>In the case that space time stream is 4, set to '4'.<br>In the case of VHT SU PPDU,<br>Top 3 bits are set as follows.<br>In the case that space time stream is 1, set to '0',<br>In the case that space time stream is 2, set to '1',<br>In the case that space time stream is 3, set to '2',<br>In the case that space time stream is 4, set to '3',<br>In the case that space time stream is 5, set to '4',<br>In the case that space time stream is 6, set to '5',<br>In the case that space time stream is 7, set to '6',<br>In the case that space time stream is 8, set to '7',<br>Bottom 9 bits indicate Partial AID. |
| TXOP_PS_NOT_ALLOWED | 1 | When a VHT AP allows non-AP VHT STA shifted to a power save mode for transmission opportunity (TXOP), set to '0'.<br>Otherwise, set to '1'.<br>In the case of a VHT PPDU transmitted by non-AP VHT STA, set to '1'. |
| Reserved | 1 | |

The VHT-SIG-A2 field may include information on whether to use a short Guard Interval (GI), Forward Error Correction (FEC) information, information on Modulation and Coding Scheme (MCS) for a single user, information on types of channel coding for a plurality of users, beamforming related information, redundancy bits for Cyclic Redundancy Checking (CRC), a tail bit of convolutional decoder, and the like.

Table 2 below exemplifies the VHT-SIG-A2 field.

TABLE 2

| Field | Bit | Description |
|---|---|---|
| Short GI | 1 | In the case that short GI is not used in a data field, set to '0',<br>In the case that short GI is used in a data field, set to '1'. |
| Short GI disambiguation | 1 | In the case that short GI is used and an additional symbol is required for a payload of PPDU, set to '1',<br>In the case that an additional symbol is not required, set to '0'. |
| SU/MU Coding | 1 | In the case of VHT SU PPDU:<br>In the case of BCC(binary convolutional code), set to '0',<br>In the case of LDPC (low-density parity check), set to '1'.<br>In the case of VHT MU PPDU:<br>In the case that NSTS field of which user position is '0' is not '0', indicates coding to use.<br>In the case of BCC, set to '0',<br>In the case of LDPC, set to '1'.<br>In the case that NSTS field of which user position is '0' is '0', set to '1' as a reserved field. |
| LDPC Extra OFDM Symbol | 1 | In the case that an additional extra OFDM symbol is required owing to LDPC PPDU encoding procedure (in the case of SU PPDU) or PPDU encoding procedure of at least one LDPC user (in the case of VHT MU PPDU), set to '1'.<br>Otherwise, set to '0'. |
| SU VHT MCS/MU Coding | 4 | In the case of VHT SU PPDU:<br>Represents VHT-MCS index.<br>In the case of VHT MU PPDU:<br>Indicates coding for user positions '1' to '3' in an order of ascending order from top bit.<br>In the case that NSTS field of each user is not '1', indicates coding to use.<br>In the case of BCC, set to '0',<br>In the case of LDPC, set to '1'.<br>In the case that NSTS field of each user is '0', set to '1' as a reserved field. |

TABLE 2-continued

| Field | Bit | Description |
|---|---|---|
| Beamformed | 1 | In the case of VHT SU PPDU: In the case that Beamforming steering matrix is applied to SU transmission, set to '1'. Otherwise, set to '0' In the case of VHT MU PPDU: Set to '1' as a reserved field. |
| Reserved | 1 | |
| CRC | 8 | Include CRC for detecting error of PPDU in receiver |
| Tail | 6 | Used for trellis end of convolutional decoder Set to '0'. |

The VHT-STF is used for improving the performance of AGC estimation in MIMO transmission. The VHT-STF field duration is 4 µs.

The VHT-LTF is used for a VHT-STA to estimate a MIMO channel Since a VHT WLAN system support the MU-MIMO, the VHT-LTF may be setup as much as the number of spatial streams through which a PPDU is transmitted. Additionally, in the case that full channel sounding is supported, the number of VHT-LTFs may increase.

The VHT-SIG-B field includes dedicated control information required to acquire data for a plurality of VHT-STAs paired in MU-MIMO scheme by receiving a PPDU. Accordingly, only in the case that the common control information included in the VHT-SIG-A field indicates a MU-MIMO transmission by a PPDU which is currently received, a VHT-STA may be designed to decode the VHT-SIG-B field. On the contrary, in the case that the common control information indicates that a PPDU currently received is for a single VHT-STA (including SU-MIMO), an STA may be designed not to decode the VHT-SIG-B field.

The VHT-SIG-B field includes information on modulation, encoding and rate-matching of each of the VHT-STAs. A size of the VHT-SIG-B field may be different depending on types of MIMO transmission (MU-MIMO or SU-MIMO) and channel bandwidths which are used for PPDU transmissions.

In order to transmit PPDUs of the same size to STAs paired with an AP in a system that supports the MU-MIMO, information indicating a bit size of a data field that configures the PPDU and/or information indicating a bit stream size that configures a specific field may be included in the VHT-SIG-A field.

However, in order to efficiently use the PPDU format, the L-SIG field may be used. In order for the PPDUs of the same size to be transmitted to all STAs, a length field and a rate field transmitted with being included in the L-SIG field may be used for providing required information. In this case, since a MAC Protocol Data Unit (MPDU) and/or an Aggregate MAC Protocol Data Unit (A-MPDU) are configured based on bytes (or octet (oct)) of the MAC layer, an additional padding may be required in the physical layer.

The data field in FIG. 4 is a payload, and may include a SERVICE field, a scrambled PSDU, tail bits and padding bits.

As such, since several formats of PPDU are used in a mixed manner, an STA should be able to distinguish a format of received PPDU.

Herein, the meaning of distinguishing PPDU (or classifying the format of PPDU) may have various meanings. For example, the meaning of distinguishing PPDU may have a meaning of determining whether the received PPDU is a PPDU that is available to be decoded (or interpreted) by an STA. In addition, the meaning of distinguishing PPDU may have a meaning of determining whether the received PPDU is a PPDU that is available to be supported by an STA. Further, the meaning of distinguishing PPDU may be interpreted as a meaning of classifying what the information is that is transmitted through the received PPDU.

This will be described in more detail by reference to the drawing below.

Figure 5:
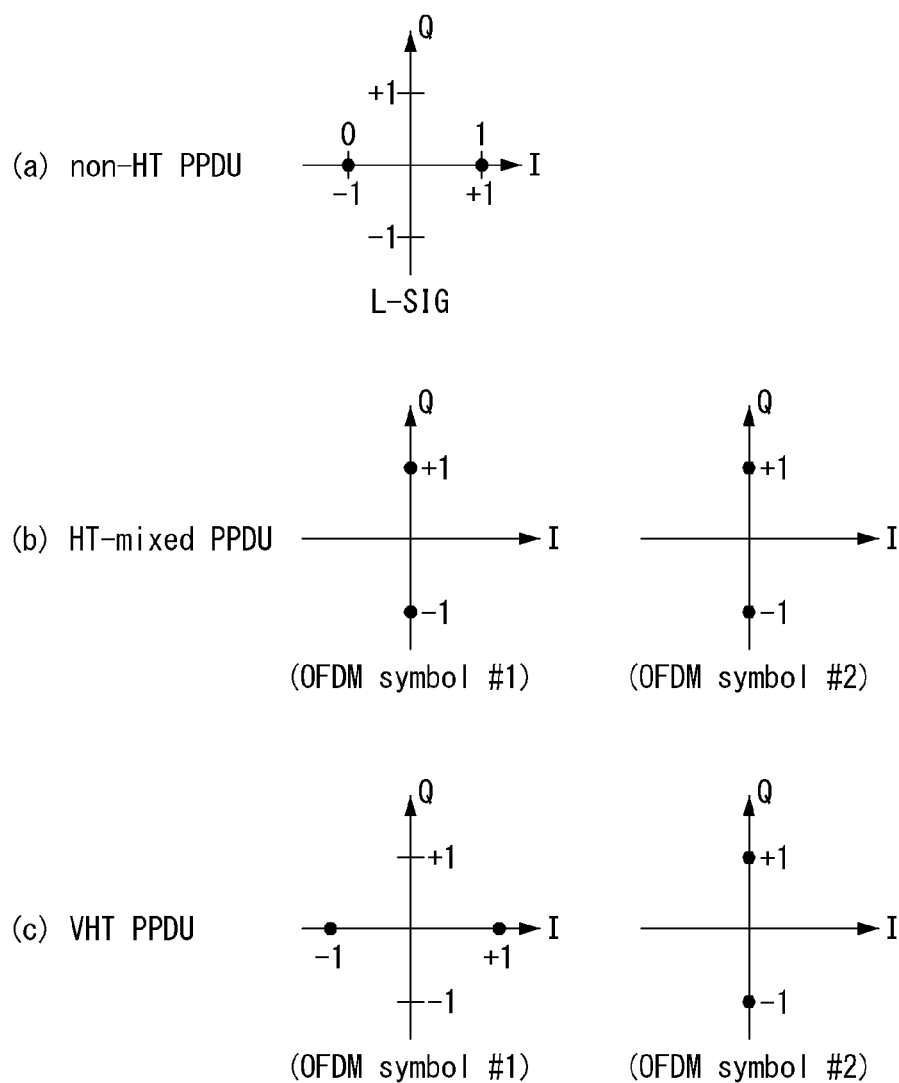
FIG. 5 is a diagram exemplifying a constellation for distinguishing a format of PPDU in a wireless communication system to which the present invention may be applied.

FIG. 5 is a diagram exemplifying a constellation for distinguishing a format of PPDU in a wireless communication system to which the present invention may be applied.

FIG. 5(a) exemplifies a constellation of an L-SIG field included in a non-HT format PPDU and FIG. 5(b) exemplifies a phase rotation for detecting an HT-mixed format PPDU. And FIG. 5(c) exemplifies a phase rotation for detecting a VHT format PPDU.

In order for an STA to distinguish the non-HT format PPDU, the HT-GF format PPDU, the HT-mixed format PPDU and the VHT format PPDU, a phase of constellation of the L-SIG field and the OFDM symbol transmitted after the L-SIG field are used. That is, the STA may classify a PPDU format based on the phase of constellation of the L-SIG field and the OFDM symbol transmitted after the L-SIG field.

Referring to FIG. 5(a), the OFDM symbol that configures the L-SIG field utilizes Binary Phase Shift Keying (BPSK).

First, in order to distinguish the HT-GF format PPDU, when an initial SIG field is detected in a received PPDU, an STA determines whether the SIG field is the L-SIG field. That is, the STA tries to decode based on the constellation example shown in FIG. 5(a). When the STA fail to decode, it may be determined that the corresponding PPDU is the HT-GF format PPDU.

Next, in order to classify the non-HT format PPDU, the HT-mixed format PPDU and the VHT format PPDU, the phase of constellation of the OFDM symbol transmitted after the L-SIG field may be used. That is, the modulation method of the OFDM symbol transmitted after the L-SIG field may be different, and the STA may classify the PPDU formats based on the modulation method for the field after the L-SIG field of the received PPDU.

Referring to FIG. 5(b), in order to distinguish the HT-mixed format PPDU, the phase of two OFDM symbols transmitted after the L-SIG field in the HT-mixed format PPDU may be used.

More particularly, the phases of both 01-DM symbol #1 and OFDM symbol #2 that correspond to the HT-SIG field transmitted after the L-SIG field in the HT-mixed format PPDU rotate as much as 90 degrees in counter-clock wise direction. That is, the modulation method for OFDM symbol #1 and OFDM symbol #2 uses Quadrature Binary Phase Shift Keying (QBPSK). The QBPSK constellation may be a constellation of which phase rotates as much as 90 degrees in counter-clock wise direction with respect to the BPSK constellation.

An STA tries to decode OFDM symbol #1 and OFDM symbol #2 that correspond to the HT-SIG field transmitted after the L-SIG field of the received PPDU based on the constellation example shown in FIG. 5(b). When the STA is successful in decoding, the STA determines the corresponding PPDU to be the HT format PPDU.

Next, in order to distinguish the non-HT format PPDU and the VHT format PPDU, the phase of constellation of the OFDM symbol transmitted after the L-SIG field may be used.

Referring to FIG. 5(c), in order to distinguish the VHT format PPDU, the phases of two OFDM symbols transmitted after the L-SIG field in the VHT format PPDU may be used.

More particularly, the phase of OFDM symbol #1 that corresponds to the VHT-SIG-A field after the L-SIG field in the VHT format PPDU does not rotate, but the phase of OFDM symbol #2 rotates as much as 90 degrees in counter-clock wise direction. That is, the modulation method for OFDM symbol #1 uses the BPSK and the modulation method for OFDM symbol #2 uses the QBPSK.

An STA tries to decode OFDM symbol #1 and OFDM symbol #2 that correspond to the VHT-SIG field transmitted after the L-SIG field of the received PPDU based on the constellation example shown in FIG. 5(c). When the STA is successful in decoding, the STA may determine the corresponding PPDU to be the VHT format PPDU.

On the other hand, when the STA fails to decode, the STA may determine the corresponding PPDU to be the non-HT format PPDU.

MAC Frame Format

Figure 6:
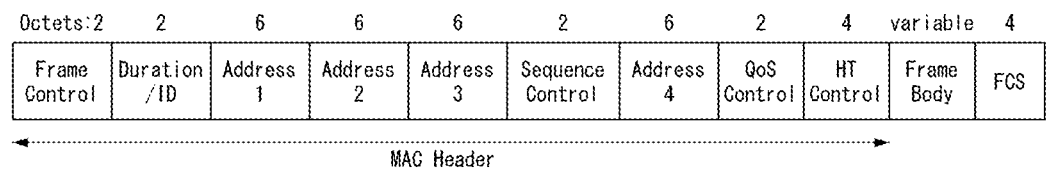
FIG. 6 exemplifies a MAC frame format in IEEE 802.11 system to which the present invention may be applied.

FIG. 6 exemplifies a MAC frame format in IEEE 802.11 system to which the present invention may be applied.

Referring to FIG. 6, a MAC frame (i.e., MPDU) includes a MAC Header, a Frame Body and a frame check sequence (FCS).

The MAC Header is defined by regions that include Frame Control field, Duration/ID field, Address 1 field, Address 2 field, Address 3 field, Sequence Control field, Address 4 field, QoS Control field and HT Control field.

The Frame Control field includes information on characteristics of the corresponding MAC frame. Detailed description for the Frame Control field will be described below.

The Duration/ID field may be implemented to have different values according to a type and a subtype of the corresponding MAC frame.

In the case that a type and a subtype of the corresponding MAC frame is a PS-Poll frame for the power save (PS) operation, the Duration/ID field may be configured to include an association identifier of the STA that transmits the frame. In other case, the Duration/ID field may be configured to have a specific duration value depending on the corresponding type and subtype of the MAC frame. In addition, in the case that the frame is an MPDU included in the aggregate-MPDU (A-MPDU) format, all of the Duration/ID fields included in the MAC header may be configured to have the same value.

Address 1 field to Address 4 field are used to indicate BSSID, source address (SA), destination address (DA), transmitting address (TA) representing an address of a transmission STA and a receiving address (RA) representing an address of a reception STA.

Meanwhile, the address field implemented as the TA field may be set to a bandwidth signaling TA value. In this case, the TA field may indicate that the corresponding MAC frame has additional information to the scrambling sequence. Although the bandwidth signaling TA may be represented as a MAC address of the STA that transmits the corresponding MAC frame, Individual/Group bit included in the MAC address may be set to a specific value (e.g., '1').

The Sequence Control field is configured to include a sequence number and a fragment number. The sequence number may indicate the number of sequence allocated to the corresponding MAC frame. The fragment number may indicate the number of each fragment of the corresponding MAC frame.

The QoS Control field includes information related to QoS. The QoS control field may be included in the case that a QoS data frame is indicated in a Subtype subfield.

The HT Control filed includes control information related to HT and/or VHT transmission and reception techniques. The HT Control field is included in Control Wrapper frame. Further, the HT Control field is existed in the QoS data frame of which Order subfield value is 1, and existed in Management frame.

The Frame Body is defined as a MAC payload, and data to be transmitted in a higher layer is located therein. And the Frame body has a variable size. For example, a maximum size of MPDU may be 11454 octets, and a maximum size of PPDU may be 5.484 ms.

The FCS is defined as a MAC footer, and used for searching an error of the MAC frame.

First three fields (the Frame Control field, the Duration/ID field and the Address 1 field) and the last field (FCS field) configure a minimum frame format, and are existed in all frames. Other fields may be existed in a specific frame type.

Figure 7:
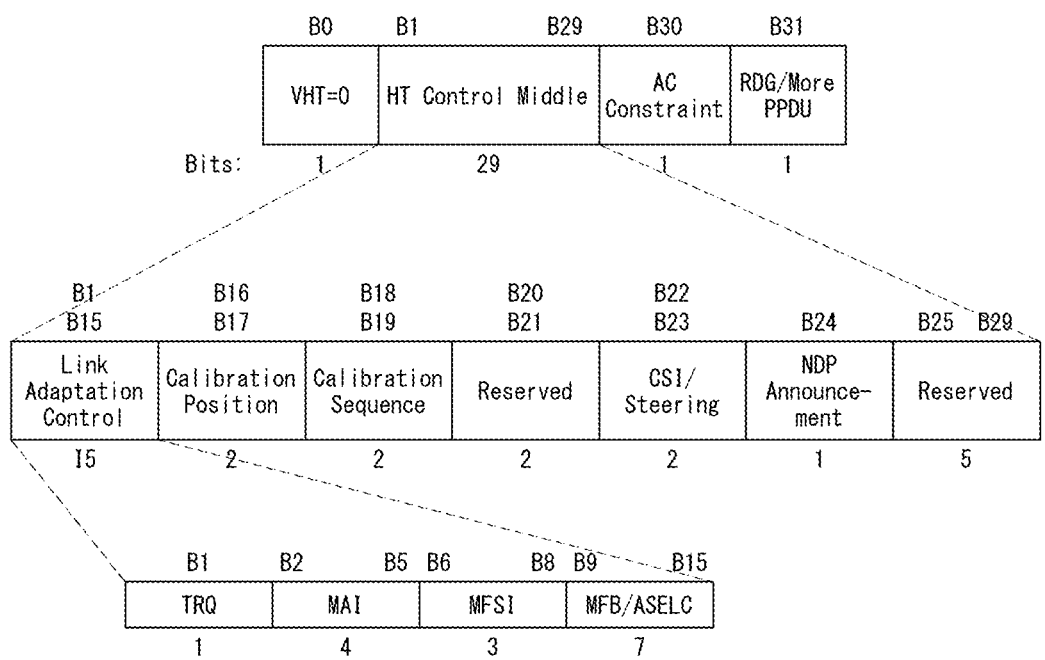
FIG. 7 exemplifies an HT format of an HT Control field in a wireless communication system to which the present invention may be applied.

FIG. 7 exemplifies an HT format of an HT Control field in a wireless communication system to which the present invention may be applied.

Referring to FIG. 7, the HT Control field may include VHT subfield, HT Control Middle subfield, AC Constraint subfield and Reverse Direction Grant (RDG)/More PPDU subfield.

The VHT subfield indicates whether the HT Control field has a format of the HT Control field for the VHT (VHT=1) or a format of the HT Control field for the HT (VHT=0). In FIG. 7, it will be described by assuming that the HT Control field has the format of the HT Control field (i.e., VHT=0).

The HT Control Middle subfield may be implemented to have different formats according to the indication of the VHT subfield. Detailed description for the HT Control Middle subfield will be described below.

The AC Constraint subfield indicates whether the Access Category (AC) to which a reverse direction data (RD) frame is mapped is limited to a single AC.

The RDG/More PPDU subfield may be differently interpreted depending on whether the corresponding field is transmitted by an RD initiator or an RD responder.

When the corresponding field is transmitted by the RD initiator, in the case that the RDG is existed, the RDG/More PPDU field is set to '1', and in the case that the RDG is not existed, the RDG/More PPDU field is set to '0'. When the corresponding field is transmitted by the RD responder, in the case that the PPDU including the corresponding subfield is the last frame transmitted by the RD responder, set to '1', and in the case that another PPDU is transmitted, set to '0'.

The HT Control Middle subfield of the HT Control field for the HT may include a Link Adaptation subfield, a Calibration Position subfield, a Calibration Sequence subfield, a reserved subfield, a Channel State Information (CSI)/Steering subfield, an HT Null Data Packet Announcement (HT NDP Announcement) subfield and a reserved subfield.

The Link Adaptation subfield may include a Training request (TRQ) subfield, a Modulation and Coding Scheme (MCS) Request or Antenna Selection (ASEL) Indication (MAI) subfield, an MCS Feedback Sequence Identifier (MFSI) subfield and an MCS Feedback and Antenna Selection Command (MFB/ASELC)/data subfield.

The TRQ subfield is set to '1' in the case of requesting sounding PPDU transmitting to a responder, and set to '0' in the case of not requesting sounding PPDU transmission to a responder.

When the MAI subfield is set to 14, it indicates the Antenna Selection (ASEL) indication, and the MFB/ASELC subfield is interpreted as Antenna Selection Command/data. Otherwise, the MAI subfield indicates the MCS request, and the MFB/ASELC subfield is interpreted as the MCS feedback.

In the case that the MAI subfield indicates the MCS Request (MRQ), the MAI subfield is interpreted to include the MCS request (MRQ) and the MRQ sequence identifier (MSI). When the MCS feedback is requested, the MRQ subfield is set to '1', and when the MCS feedback is not requested, the MRQ subfield is set to '0'. When the MRQ subfield is set to '1', the MSI subfield includes a sequence number for specifying the MCS feedback request. When the MRQ subfield is set to '0', the MSI subfield is set to a reserved bit.

Each of the subfields described above corresponds to an example of subfields that may be included in the HT Control field, and may be substituted by other subfield or may further include an additional subfield.

Figure 8:
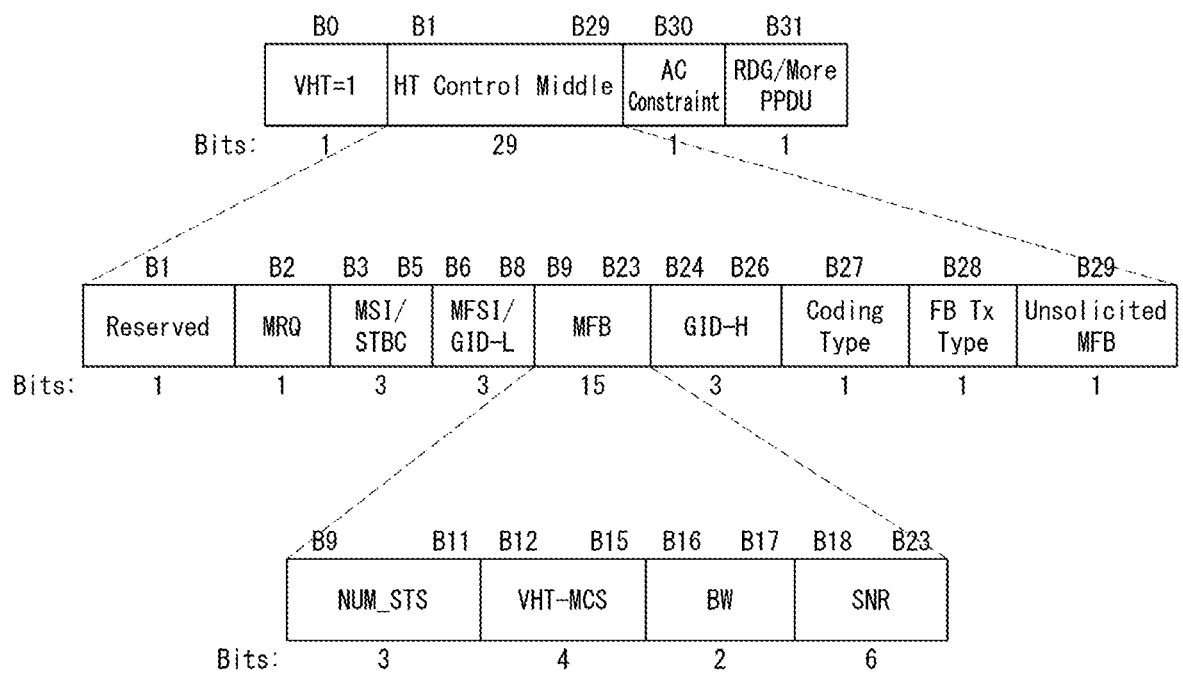
FIG. 8 exemplifies a VHT format of an HT Control field in a wireless communication system to which the present invention may be applied.

FIG. 8 exemplifies a VHT format of an HT Control field in a wireless communication system to which the present invention may be applied.

Referring to FIG. 8, the HT Control field may include a VHT subfield, an HT Control Middle subfield, an AC Constraint subfield and a Reverse Direction Grant (RDG)/More PPDU subfield.

In FIG. 8, it will be described by assuming the HT Control field for the VHT (i.e., VHT=1). The HT Control field for the VHT may be referred to a VHT Control field.

Since the description of the AC Constraint subfield and RDG/More PPDU subfield is identical to the description of FIG. 7, the overlapped description will be omitted.

As described above, the HT Control Middle subfield may be implemented to have different formats by indication of the VHT subfield.

The HT Control Middle subfield of the HT Control field for the VHT may include a reserved bit, a Modulation and Coding Scheme (MCS) feedback request (MRQ) subfield, a MRQ Sequence Identifier (MSI) subfield/space-time block coding (STBC) subfield, an MCS feedback sequence identifier (MFSI)/Least Significant Bit (LSB) of Group ID (GID-L) subfield, an MCS Feedback (MFB) subfield, a Most Significant Bit (MSB) of Group ID (GID-H) subfield, a Coding Type subfield, a Feedback Transmission type (FB Tx Type) subfield and an Unsolicited MFB subfield.

Table 3 represents description of each subfield included in the HT Control Middle subfield of the VHT format.

TABLE 3

| Subfield | Meaning | Definition |
| --- | --- | --- |
| MRQ | MCS request | In the case of requesting MCS feedback (solicited MFB), set to '1'. Otherwise, set to '0'. |
| MSI | MRQ sequence identifier | When Unsolicited MFB subfield is '0' and MRQ subfield is set to '1', the MSI subfield includes a sequence number in the range of 0 to 6 that distinguishes a specific request. When Unsolicited MFB subfield is '1', include Compressed MSI subfield (2 bits) and STBC indication subfield (1 bit). |
| MFSI/GID-L | MFB sequence identifier/LSB of Group ID | When Unsolicited MFB subfield is set to '0', MFSI/GID-L subfield includes a reception value of MSI included in a frame related to MFB information. When Unsolicited MFB subfield is set to '1' and MFB is estimated from MU PPDU, MFSI/GID-L subfield includes the Least Significant 3 bits of Group ID of PPDU of which MFB is estimated. |
| MFB | VHT N_STS, MCS, BW, SNR feedback | MFB subfield includes recommended MFB. VHT-MCS = 15, NUM_STS = 7 indicate that feedback is not existed. |
| GID-H | MSB of Group ID | When Unsolicited MFB subfield is set to '1'and MFB is estimated from VHT MU PPDU, GID-H subfield includes the Most Significant 3 bits of Group ID of PPDU of which MFB is estimated. When MFB is estimated from SU PPDU, all of GID-H subfields are set to '1'. |
| Coding Type | Coding type of MFB response | When Unsolicited MFB subfield is set to '1', Coding Type subfield of binary convolutional code (BCC) of a frame of which Unsolicited MFB is estimated includes '0', and low-density parity check (LDPC) includes '1'. |

TABLE 3-continued

| Subfield | Meaning | Definition |
| --- | --- | --- |
| FB Tx Type | Transmission type of MFB response | When Unsolicited MFB subfield is set to '1' and MFB is estimated from unbeamformed VHT PPDU, FB Tx Type subfield is set to '0'. When Unsolicited MFB subfield is set to '1' and MFB is estimated from beamformed VHT PPDU, FB Tx Type subfield is set to '1'. |
| Unsolicited MFB | Unsolicited MCS feedback indicator | When MFB is a response to MRQ, set to '1'. When MFB is not a response to MRQ, set to '0'. |

And the MFB subfield may include a Number of space time streams (NUM_STS) subfield, a VHT-MCS subfield, a Bandwidth (BW) subfield and a Signal to Noise Ratio (SNR) subfield.

The NUM_STS subfield indicates the number of spatial stream which is recommended. The VHT-MCS subfield indicates the recommended MCS. The BW subfield indicates bandwidth information related to the recommended MCS. The SNR subfield indicates data subcarrier and an average SNR value on the spatial stream.

The information included in each of the fields described above may follow the definition of an IEEE 802.11 system. In addition, each of the fields described above corresponds to an example of the fields that may be included in the MAC frame, but not limited thereto. That is, each of the fields described above may be substituted by other field, or an additional field may be further included. And not all fields may be essentially included.

Link Setup Procedure

Figure 9:
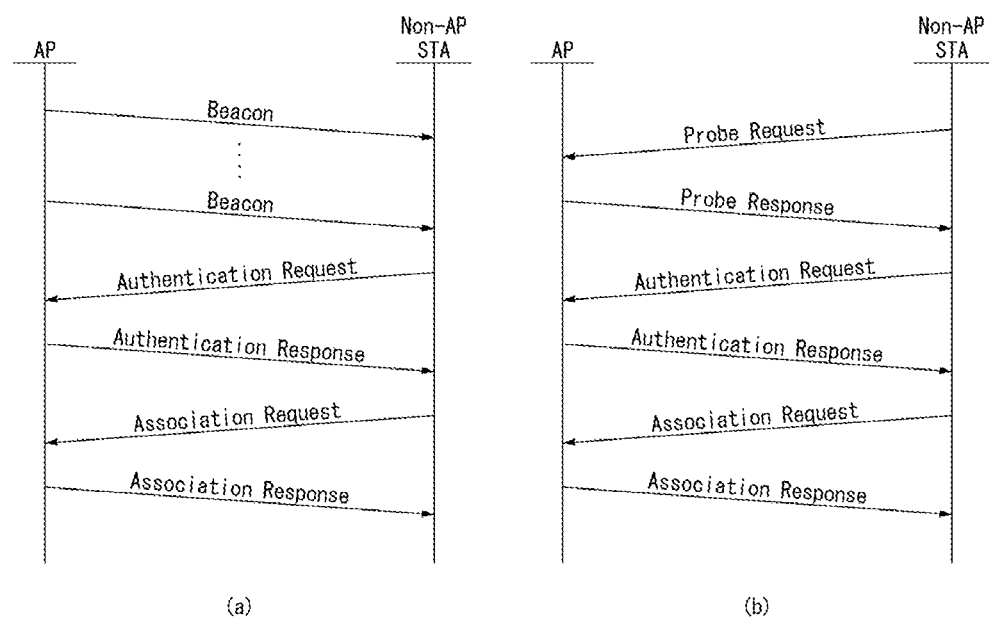
FIG. 9 is a diagram for describing a general link setup procedure in a wireless communication system to which the present invention may be applied.

FIG. 9 is a diagram for describing a general link setup procedure in a wireless communication system to which the present invention may be applied.

In order to setup link on a network and to transmit and receive data over the network, an STA should perform a scanning process for discovering the network, an authentication process, an association process, and the like, first. The link setup procedure may also be referred to a session setup procedure. In addition, the scanning, authentication and association procedures may also be collectively referred to an association procedure.

In WLAN system, the scanning procedure includes a passive scanning procedure and an active scanning procedure.

FIG. 9(a) exemplifies a link setup procedure according to the passive scanning, and FIG. 9(b) exemplifies a link setup procedure according to the active scanning.

As shown in FIG. 9(a), the passive scanning procedure is performed through a beacon frame which is periodically broadcasted by an AP. The beacon frame is one of the management frames in IEEE 802.11 standard, and periodically (e.g., 100 msec interval) broadcasted in order to indicate a presence of a wireless network such that a non-AP STA that performs scanning may participate in the wireless network by finding the wireless network. The beacon frame carries information on a current network (e.g., information on BSS).

In order to acquire information on a network, a non-AP STA waits for receiving a beacon frame by switching channels passively. The non-AP STA that receives a beacon frame may store the information on the network included in the received beacon frame, and may perform scanning in another channel in the same way above by moving to another channel. When the non-AP STA acquires the information on the network by receiving the beacon frame, the scanning procedure in the corresponding frame is completed.

As such, the passive scanning procedure has an advantage that overall overhead is small since the procedure is completed only when receiving a beacon frame regardless of transmitting other frame by a non-AP STA. However, the passive scanning procedure has a disadvantage that a time for performing scanning by the non-AP STA increases in proportional to a transmission period of a beacon frame.

On the other hand, according to the active scanning procedure shown in FIG. 9(b), by broadcasting a probe request frame by actively moving channels in order to search which AP is existed around, a non-AP STA requests network information from all APs that receives the probe request frame.

A responder that receives the probe request frame transmits a probe response frame by carrying the network information thereon after waiting for a random time in order to prevent collision among frames. The STA that receives the probe response frame may perform scanning in another channel in the same way above by moving to another channel after saving the network related information included in the received probe response frame. When the non-AP STA acquires the network information by receiving the probe response frame, the scanning procedure is completed.

The active scanning procedure has an advantage that the scanning procedure may be completed in shorter time than the passive scanning procedure. However, overall network overhead increases since an additional frame sequence is required.

The non-AP STA that completes the scanning procedure, after selecting a network following its own standard, performs the authentication procedure with a corresponding AP.

The authentication procedure includes a process that the non-AP STA transmits an authentication request frame to the AP and a process that the AP transmits an authentication response frame to the non-AP STA in response to this. That is, the authentication procedure is performed in two-way handshaking.

The authentication frame used for the authentication request/response corresponds to a management frame.

The authentication frame may include information on an authentication algorithm number, an authentication transaction sequence number, a status code, a challenge text, a Robust Security Network (RSN), a Finite Cyclic Group, and the like. These correspond to just examples of the information that may be included in the authentication request/response frame, or may be substituted by other information, or additional information may be further included in the authentication frame.

The non-AP STA may transmit the authentication request frame to the AP. Based on the information included in the received authentication request frame, the AP may determine whether to allow an authentication for the STA. Through the authentication response frame, the AP may provide the result of authentication operation to the non-AP STA.

Through the authentication procedure, the non-AP STA and the AP establish their association after going through the authentication with each other.

The association procedure includes a process that the non-AP STA transmits an association request frame to the AP and a process that the AP transmits an association response frame to the non-AP STA in response to this, which is performed in two-way handshaking.

The association request frame may include information related to various capability of the non-AP STA and information on a beacon listen interval, an service set identifier (SSID), supported rates, supported channels, RSN, mobile domain, supported operating classes, a Traffic Indication Map (TIM) Broadcast request, an interworking service capability, and the like.

Based on this, the AP determines whether the support is available for the corresponding non-AP STA. After the determination, the AP transmits the association response frame to the non-AP STA by carrying information on whether to allow the association request and the reason, and information on capability that is supported by the AP itself thereon.

The association response frame may include information related to various capability and information such as a status code, an Association ID (AID), a support rate, an Enhanced Distributed Channel Access (EDCA) parameter set, a Received Channel Power Indicator (RCPI), a Received Signal to Noise Indicator (RSNI), a mobile domain, a time out interval (association comeback time), a overlapping BSS scan parameter, a TIM broadcast response, a Quality of Service (QoS) map, and so on.

The information that may be included in the association request/response frame described above corresponds to just an example, and may be substituted by other information. And additional information may be further included therein.

When the non-AP STA and the AP establish the association successfully, normal transmission and reception are performed. On the other hand, when the non-AP STA fails to establish the association with the AP, the non-AP STA may try the association procedure again or try the association procedure to other AP based on the reason.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

Figure 10:
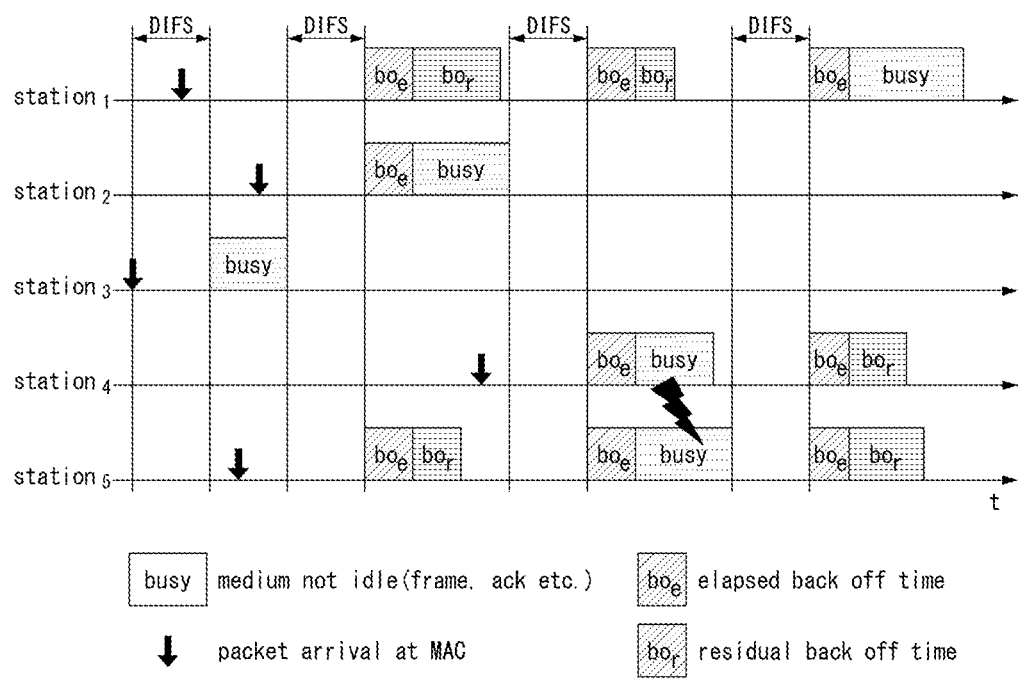
FIG. 10 is a diagram for describing an arbitrary backoff period and a frame transmission procedure in a wireless communication system to which the present invention may be applied.

FIG. 10 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 10, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 10 shows that the STA 2 has selected the smallest backoff count value and the STA 1 has selected the greatest backoff count value. That is, FIG. 10 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 10 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Method for Uplink Multiple User Transmission

In a situation that venders have great interests in various fields of a next generation WiFi and requests are increased for high throughput after 802.11ac standard and performance improvement of quality of experience (QoE), discussions on a new frame formats and numerology for 802.11ax system that is a next generation WLAN system, have been in progress actively.

The IEEE 802.11ax system is a next generation WLAN system for supporting higher data rate and processing more user loads, and one of the WLAN systems that is newly proposed recently, and is called High Efficiency WLAN (HEW).

The IEEE 802.11 ax WLAN system may operate in 2.4 GHz frequency band and 5 GHz frequency band, like the existing WLAN systems. Further, the IEEE 802.11 ax system may also operate in 60 GHz frequency band, which is higher than above.

In the IEEE 802.11ax system, a size of Fast Fourier Transform (FFT) of four times greater than that of the existing IEEE 802.11 OFDM system (IEEE 802.11a, 802.11n, 802.11ac, etc.) may be used for average throughput enhancement and outdoor robust transmission against intersymbol interference in outdoor environment. This will be described by reference to drawings below.

Hereinafter, in describing an HE format PPDU of the present invention, even though there is no separate mention, the description of the non-HT format PPDU, the HT-mixed format PPDU, the HT-greenfield format PPDU and/or the VHT format PPDU may be combined in the description of the HE format PPDU.

Figure 11:
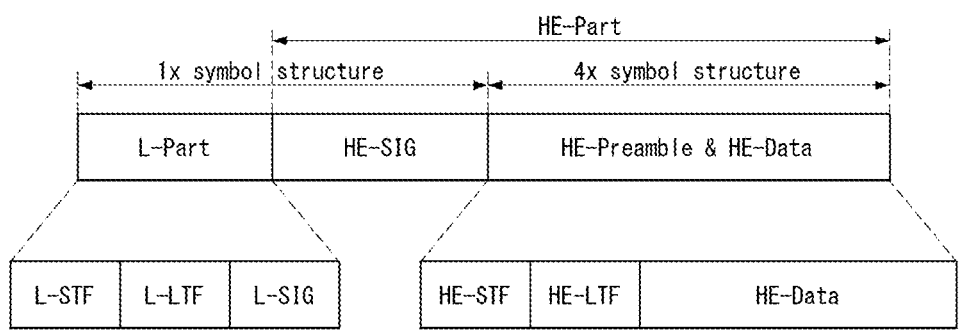
FIG. 11 is a diagram exemplifying a High Efficiency (HE) format PPDU according to an embodiment of the present invention.

FIG. 11 is a diagram exemplifying a High Efficiency (HE) format PPDU according to an embodiment of the present invention.

Referring to FIG. 11, the HE format PPDU for HEW may include a legacy part (L-part) and an HE part (HE-part), largely.

Identical to the form maintained in the existing WLAN system, the L-part includes an L-STF field, an L-LTF field and an L-SIG field. The L-STF field, the L-LTF field and the L-SIG field may be referred to a legacy preamble.

The HE-part is a part which is newly defined for 802.11ax standard, and may include an HE-SIG field, an HE-preamble field and an HE-data field. And the HE-preamble field may include an HE-STF field and an HE-LTF field. Further, the HE-SIG field in addition to the HE-STF field and the HE-LTF field, they may be collectively referred to the HE-preamble.

Although an order of the HE-SIG field, the HE-STF field and the HE-LTF field is illustrated in FIG. 11, these may be configured in a different order.

The L-part, the HE-SIG field and the HE-preamble may be collectively referred to a physical (PHY) preamble.

The HE-SIG field may include information for decoding the HE-data field (e.g., OFDMA, UL MU MIMO, improved MCS, etc.).

The L-part and the HE-part (particularly, the HE-preamble and the HE-data field) may have different sizes of Fast Fourier Transform (FFT) from each other, and may also use different Cyclic Prefixes (CPs) from each other. That is, subcarrier frequency spacing may be differently defined for the L-part and the HE-part (particularly, the HE-preamble and the HE-data field) from each other.

In the 802.11ax system, the size of FFT four times (4×) greater than that of the legacy WLAN system may be used. That is, the L-part may be configured by 1× symbol structure, and the HE-part (particularly, the HE-preamble and the HE-data field) may be configured by 4× symbol structure. Herein, the FFTs of 1×, 2× and 4× sizes signify a relative size with respect to the legacy WLAN system (e.g., IEEE 802.11a, 802.11n, 802.11ac, etc.).

For example, in the case that the FFT sizes used for the L-part are 64, 128, 256 and 512 in 20 MHz, 40 MHz, 80 MHz and 160 MHz, respectively, the FFT sizes used for the HE-part may be 256, 512, 1024 and 2048 in 20 MHz, 40 MHz, 80 MHz and 160 MHz, respectively.

As such, when the FFT size becomes greater than that of the legacy WLAN system, the number of subcarriers per unit frequency increases but the length of OFDM symbol is elongated since the subcarrier frequency spacing is narrowed.

That is, the use of greater FFT size means that the subcarrier frequency spacing is narrowed, and similarly, means that Inverse Discrete Fourier Transform (IDFT)/Discrete Fourier Transform (DFT) period increases. Herein, the IDFT/DFT period may mean a symbol length of an 01-DM symbol except the guard interval (GI).

Accordingly, when the size of FFT four times greater than that of the L-part is used for the HE-part (particularly, the HE-preamble and the HE-data field), the subcarrier frequency spacing of the HE-part becomes ¼ times the subcarrier frequency spacing of the L-part, and the IDFT/DFT period of the HE-part becomes 4 times the IDFT/DFT period of the L-part. For example, in the case that the subcarrier frequency spacing of the L-part is 312.5 kHz (=20 MHz/64, 40 MHz/128, 80 MHz/256 and/or 160 MHz/512), the subcarrier frequency spacing of the HE-part may be 78.125 kHz (=20 MHz/256, 40 MHz/512, 80 MHz/1024 and/or 160 MHz/2048). On the other hand, in the case that the IDFT/DFT period of the L-part is 3.2 μs(=1/312.5 kHz), the IDFT/DFT period of the HE-part may be 12.8 μs(=1/78.125 kHz).

Here, since one of 0.8 μs, 1.6 μs or 3.2 μs may be used for the GI, the OFDM symbol length (or symbol interval) of the HE-part including the GI may be 13.6 μs, 14.4 μs or 16 μs according to the GI.

Although it is illustrated the case that the HE-SIG field is configured as 1× symbol structure in FIG. 11, the HE-SIG field may also be configured as 4× symbol structure like the HE-preamble and the HE-data field.

Different from the example of FIG. 11, the HE-SIG field may be classified into an HE-SIG-A field and an HE-SIG-B field. In this case, the FFT size per unit frequency may become much greater after the HE-SIG B. That is, the OFDM symbol length may become longer than that of the L-part after the HE-SIG-B.

The HE format PPDU for a WLAN system to which the present invention may be applied may be transmitted through at least one 20 MHz channel. For example, the HE format PPDU may be transmitted in a frequency band of 40 MHz, 80 MHz or 160 MHz through total four 20 MHz channels. This will be described by reference to the drawing below.

FIG. 12 is a diagram exemplifying an HE format PPDU according to an embodiment of the present invention.

In FIG. 12, it is illustrated the PPDU format of the case that 80 MHz is allocated to a signal STA (or the case that an OFDM resource unit is allocated a plurality of STAs within 80 MHz) or different streams each having 80 MHz are allocated to a plurality of STAs.

Referring to FIG. 12, each of the L-STF, the L-LTF and the L-SIG may be transmitted to an OFDM symbol which is generated based on 64 FFT points (or 64 subcarriers) in 20 MHz channel.

The HE-SIG-A field may include common control information which is commonly transmitted to the STAs that receive the PPDU. The HE-SIG-A field may be transmitted in one to three OFDM symbols. The HE-SIG-A field includes the same information by being duplicated in a unit of 20 MHz. Further, the HE-SIG A field notifies overall bandwidth information of a system.

Table 4 illustrates information included in the HE-SIG-A field.

TABLE 4

| Field | Bits | Description |
| --- | --- | --- |
| Bandwidth | 2 | Indicate a bandwidth in which a PPDU is transmitted. For example, 20 MHz, 40 MHz, 80 MHz or 160 MHz |
| Group ID | 6 | Indicate a group of STA or STAs to receive a PPDU |
| Stream information | 12 | Indicate a location or a number of spatial stream for each STA or indicate a location or a number of spatial stream for a group of STAs |
| UL indication | 1 | Indicate whether a PPDU is headed to an AP (uplink) or to an STA (downlink) |
| MU indication | 1 | Indicate whether a PPDU is an SU-MIMO PPDU or a MU-MIMO PPDU |
| GI indication | 1 | Indicate whether a short GI is used or a long GI is used |
| Allocation information | 12 | Indicate the band or a channel (subchannel index or subband index) in which each STA is allocated in a band in which a PPDU is transmitted |
| Transmission power | 12 | Indicate a transmission power for each channel or each STA |

The information included in each of the fields illustrated in Table 4 may follow the definitions of the IEEE 802.11 system. Further, each of the fields described above corresponds to just an example that may be included in a PPDU, but is not limited thereto. That is, each of the fields described above may be substituted by other field, or an additional field may be further included. And not all fields may be essentially included.

The HE-STF is used for improving the performance of AGC estimation in a MIMO transmission.

The HE-SIG-B field may include user-specific information which is required that each STA is to receive its own data (e.g., PSDU). The HE-SIG-B field may be transmitted in one or two OFDM symbols. For example, the HE-SIG B field may include information on a modulation and coding scheme (MCS) of the corresponding PSDU and a length of the corresponding PSDU.

The L-STF, the L-LTF, the L-SIG and the HE-SIG-A field may be transmitted repeatedly in 20 MHz channel unit. For example, when a PPDU is transmitted through four 20 MHz channels (i.e., 80 MHz band), the L-STF, the L-LTF, the L-SIG and the HE-SIG A field may be repeatedly transmitted in every 20 MHz channel.

When a size of FFT increases, the legacy STA that supports the conventional IEEE 802.11a/g/n/ac may not decode the corresponding HE PPDU. In order for the legacy STA and the HE STA to coexist, the L-STF, the L-LTF and the L-SIG field are transmitted through 64 FFTs in 20 MHz channel in order for the legacy STA to receive. For example, the L-SIG field may occupy a single OFDM symbol, a single OFDM symbol time may be 4 μs, and a GI may be 0.8 μs.

Each size of FFT per frequency unit may become much greater from the HE-STF. For example, 256 FFT may be used in 20 MHz channel, 512 FFT may be used in 40 MHz channel, and 1024 FFT may be used in 80 MHz channel Since the interval between OFDM subcarrier becomes smaller as the size of FFT becomes greater, the number of OFDM subcarriers per unit frequency increases, but the OFDM symbol time increases. In order to improve system efficiency, a length of the GI after the HE-STF may be identically configured as a length of the GI of the HE-SIG-A.

The HE-SIG-A field may include information required to decode an HE PPDU by an HE STA. However, the HE-SIG-A field may be transmitted in 20 MHz channel through 64 FFTs such that both the legacy STA and the HE STA may receive it. This is because the HE STA may receive the conventional HT/VHT format PPDU as well as the HE format PPDU, and the legacy STA and the HE STA should distinguish the HT/VHT format PPDU from the HE format PPDU.

FIG. 13 is diagram exemplifying an HE format PPDU according to an embodiment of the present invention.

In FIG. 13, it is assumed that each of the 20 MHz channels is allocated to different STAs (e.g., STA 1, STA 2, STA 3 and STA 4) from each other.

Referring to FIG. 13, a size of FFT per frequency unit may become much greater than the HE-STF (or the HE-SIG-B). For example, 256 FFT may be used in 20 MHz channel from the HE-STF (or the HE-SIG-B), 512 FFT may be used in 40 MHz channel, and 1024 FFT may be used in 80 MHz channel.

Since the information transmitted in each field included in a PPDU is the same as the example of FIG. 12, the overlapped description will be omitted.

Although the HE-SIG-B field may include the information specified in each STA, the HE-SIG-B field may be encoded throughout entire bands (i.e., instructed by the HE-SIG-A field). That is, the HE-SIG-B field includes information on all STAs, and is received by all STAs.

The HE-SIG-B field may indicate the frequency bandwidth information allocated to each STA and/or stream information in the corresponding frequency band. For example, in the HE-SIG-B of FIG. 13, 20 MHz may be allocated to STA 1, the next 20 MHz may be allocated to STA 2, the next 20 MHz may be allocated to STA 3, and the next 20 MHz may be allocated to STA 4. In addition, 40 MHz may be allocated to STA 1 and STA 2, and the next 40 MHz may be allocated to STA 3 and STA 4. In this case, STA 1 and STA 2 may allocate different streams with each other, and STA 3 and STA 4 may allocate different stream with each other.

In addition, by defining an HE-SIG-C field, the HE-SIG-C field may be added in the example of FIG. 13. In this case, in the HE-SIG-C field, information on all STAs may be transmitted throughout entire bands, and the control information specific to each STA may be transmitted in a 20 MHz unit through the HE-SIG-C field.

Further, different from the examples of FIG. 12 and FIG. 13, the HE-SIG-B field may transmitted in a 20 MHz unit as the same as the HE-SIG-A field, not transmitted throughout entire bands. This will be described by reference to the drawing below.

FIG. 14 is a diagram exemplifying an HE format PPDU according to an embodiment of the present invention.

In FIG. 14, it is assumed that each of the 20 MHz channels is allocated different STAs (e.g., STA 1, STA 2, STA 3 and STA 4) from each other.

Referring to FIG. 14, the HE-SIG-B field may transmitted in a unit of 20 MHz as the same as the HE-SIG-A field, not transmitted throughout entire bands. However, in this case, the HE-SIG-B field may be transmitted by being encoded in a unit of 20 MHz, which is different from the HE-SIG-A field, but may not be transmitted by being duplicated in a unit of 20 MHz.

In this case, a size of FFT per frequency unit may become much greater from the HE-STF (or the HE-SIG-B). For example, 256 FFT may be used in 20 MHz channel from the HE-STF (or the HE-SIG-B), 512 FFT may be used in 40 MHz channel, and 1024 FFT may be used in 80 MHz channel.

Since the information transmitted in each field included in a PPDU is the same as the example of FIG. 12, the overlapped description will be omitted.

The HE-SIG-A field is transmitted by being duplicated in a unit of 20 MHz.

The HE-SIG-B field may indicate the frequency bandwidth information allocated to each STA and/or stream information in the corresponding frequency band. Since the HE-SIG-B field includes information on each STA, the HE-SIG-B field may include information on each STA for each HE-SIG-B field in a unit of 20 MHz. In this case, FIG. 14 exemplified the case that 20 MHz is allocated to each STA, for example, in the case that 40 MHz is allocated to an STA, the HE-SIG-B field may be transmitted by being duplicated in a unit of 20 MHz.

In the case that a part of bandwidth of which interference level from neighboring BSS is low in a situation of supporting different bandwidths for each BSS, it may be more preferable not to transmit the HE-SIG-B field throughout entire bands.

The data field in FIGS. 11 to 14 is a payload, and may include a SERVICE field, a scrambled PSDU, tail bits and padding bits.

Meanwhile, the HE format PPDU as shown in FIGS. 11 to 14 may be classified through a Repeated L-SIG (RL-SIG) which is a repeated symbol of the L-SIG field. The RL-SIG field may be inserted in front of the HE-SIG-A field, and each STA may distinguish the format of the received PPDU as the HE format PPDU using the RL-SIG

FIELD

The scheme that an AP operated in WLAN system transmits data to a plurality of STAs on the same time resource may be referred to downlink multi-user (DL MU) transmission. On the contrary, the scheme that a plurality of STAs operated in WLAN system transmits data to an AP on the same time resource may be referred to uplink multi-user (UL MU) transmission.

Such a DL MU transmission or UL MU transmission may be multiplexed on a frequency domain or a spatial domain.

In the case that the DL MU transmission or the UL MU transmission is multiplexed on the frequency domain, different frequency resources (e.g., subcarrier or tone) for each of the plurality of STAs may be allocated to downlink or uplink resource based on orthogonal frequency division multiplexing (OFDMA). The transmission scheme through different frequency resources from each other on the same time resource may be referred to 'DL/UL OFDMA transmission'.

In the case that the DL MU transmission or the UL MU transmission is multiplexed on the spatial domain, different spatial streams from each other may be allocated to downlink or uplink resource for each of the plurality of STAs. The transmission scheme through different spatial streams from each other on the same time resource may be referred to 'DL/UL MU MIMO'.

Method for Configuring an HE-STF (High Efficiency— Short Training Field) Sequence Hereinafter, the present invention proposes a method for configuring an HE-STF sequence and a method for transmitting and receiving a PPDU that includes an HE-STF field which is constructed based on the HE-STF sequence.

Before describing the present invention, the HT-STF defined in the 802.11n system and the VHT-STF defined in the 802.11ac system will be reviewed.

First, the HT-STF will be reviewed.

The HT-STF is used for improving the AGC estimation performance in a MIMO system. The duration in the HT-STF is 4 is. In a transmission of 20 MHz, the frequency domain sequence used for constructing the HT-STF is the same as the L-STF. In a transmission of 40 MHz, the HT-STF sequence of 20 MHz is duplicated and shifted in frequency, and a higher layer subcarrier is rotated by 90 degrees, thereby the HT-STF being constructed.

In a PPDU transmission of 20 MHz, the HT-STF Sequence (HTS) of the frequency domain is defined by Equation 1 below.

$$HTS_{-28,28} = \sqrt{1/2}\{0,0,0,0,1+j,0,0,0,0,-1,-j,0,0,0,1+\\j,0,0,0,-1-j,0,0,0,1+j,0,0,0,0,0,0,0,-1-j,0,0,0,-\\1-j,0,0,0,1+j,0,0,0,1+j,0,0,0,1+j,0,0,0,1+j,0,0,0,\\0\}$$ [Equation 1]

Referring to Equation 1, $HTS_{-28,28}$ exemplifies the HT-STF sequence which is mapped to a subcarrier that corresponds to subcarrier (or tone) index from −28 to subcarrier index 28.

That is, in a PPDU transmission of 20 MHz, in the case of the HT-STF Sequence, a non-zero value is mapped to the subcarrier of which subcarrier index is a multiple of 4 among the subcarriers from subcarrier index −28 to subcarrier index 28, but zero value is mapped to the subcarrier of which subcarrier index is −28, 0 or 28.

In a PPDU transmission of 40 MHz, the HT-STF Sequence of the frequency domain is defined by Equation 2 below.

$$HTS_{-58,58} = \\\sqrt{1/2}\{0,0,1+j,0,0,0,-1,-j,0,0,0,1+j,0,0,0,-1-j,0,0,0,0,-1-j,0,0,0,1+\\j,0,0,0,0,0,0,0,-1-j,0,0,0,-1-j,0,0,0,1+j,0,0,0,1+\\j,0,0,0,1+j,0,0,0,1+j,0,0,0,0,0,0,0,0,0,0,0,0,0,\\1-j,0,0,0,-1-j,0,0,0,1+j,0,0,0,-1-j,0,0,0,-1-j,0,\\0,0,1+j,0,0,0,0,0,0,0,-1-j,0,0,0,-1-j,0,0,0,1+j,0,\\0,0,1+j,0,0,0,1+j,0,0,0,1+j,0,0\}$$ [Equation 2]

Referring to Equation 2, $HTS_{-58,58}$ exemplifies the HT-STF sequence which is mapped to a subcarrier that corresponds to subcarrier (or tone) index from −58 to subcarrier index 58.

That is, in a PPDU transmission of 40 MHz, in the case of the HT-STF Sequence, a non-zero value is mapped to the subcarrier of which subcarrier index is a multiple of 4 among the subcarriers from subcarrier index −58 to subcarrier index 58, but zero value is mapped to the subcarrier of which subcarrier index is −32, −4, 0, 4 or 32.

In Equation 1 and Equation 2, the phase rotation for each sub channel of 20 MHz is not shown.

In the given bandwidth (i.e., PPDU transmission bandwidth), gamma γ (i.e., phase rotation) is applied to the HT-STF sequence defined by Equations 1 and 2 for each sub channel of 20 MHz.

In a PPDU transmission of 20 MHz, the gamma γ is defined by Equation 3 below.

$$\gamma_k = 1, \text{ in a 20 MHZ channel}$$ [Equation 3]

In Equation 3, k represents an index of subcarrier (or tone). That is, 1 is multiplied to the HT-STF sequence for all subcarriers.

In the case of a PPDU transmission of 40 MHz, the gamma γ is defined by Equation 4 below.

$$\Upsilon_k = \begin{cases} 1, & k \leq 0, \text{ in a 40 MHz channel} \\ j, & k > 0, \text{ in a 40 MHz channel} \end{cases}$$ [Equation 4]

In Equation 4, k represents an index of subcarrier (or tone).

In the case of 40 MHz channel, when the subcarrier index is equal to or less than 0, 1 is multiplied to the HT-STF sequence, and when the subcarrier index is greater than 0, j is multiplied to the HT-STF sequence.

Next, the VHT-STF will be described.

The VHT-STF field is used for improving AGC estimation performance in a MIMO transmission. The duration of the VHT-STF field is 4 is. In a transmission of 20 MHz, the frequency domain used for constructing the VHT-STF field is the same as the L-STF. In transmissions of 40 MHz and 80 MHz, the VHT-STF sequence of 20 MHz is duplicated and shifted in frequency for each 20 MHz sub channel, and a phase rotation is applied for each sub channel.

In a PPDU transmission of 20 MHz, the VHT-STF sequence (VHTS) of the frequency domain is defined by Equation 5 below.

$$VHTS_{-28,28} = HTS_{-28,28}$$ [Equation 5]

In Equation 5, $HTS_{-28,28}$ is defined by Equation 1 above.

In a PPDU transmission of 40 MHz, the VHT-STF Sequence of the frequency domain is defined by Equation 6 below.

$$VHTS_{-58,58} = HTS_{-58,58}$$ [Equation 6]

In Equation 6, $HTS_{-58,58}$ is defined by Equation 2 above.

In a PPDU transmission of 80 MHz, the VHT-STF Sequence of the frequency domain is defined by Equation 7 below.

$$VHTS_{-122,122} = \{VHTS_{-58,58}, 0,0,0,0,0,0,0,0,0,0, VHTS_{-58,58}\} \quad \text{[Equation 7]}$$

In Equation 7, $VHTS_{-58,58}$ is defined by Equation 6 above.

0 is mapped to a direct current (DC) tone, and $VHTS_{-58,58}$ sequence is mapped to opposite sides of the DC tone.

That is, in a PPDU transmission of 80 MHz, in the case of the VHT-STF Sequence, a non-zero value is mapped to the subcarrier of which subcarrier index is a multiple of 4 among the subcarriers from subcarrier index −122 to subcarrier index 122, but zero value is mapped to the subcarrier of which subcarrier index is −96, −68, −64, −60, −32, −4, 0, 4, 32, 60, 64, 68 or 96.

In the case of a noncontiguous PPDU transmission of 80+80 MHz, the VHT-STF sequence of 80 MHz defined in Equation 7 above is used for each frequency segment of 80 MHz.

In a contiguous PPDU transmission of 160 MHz, the VHT-STF sequence of the frequency domain is defined by Equation 8 below.

$$VHTS_{-250,250} = \{VHTS_{-122,122}, 0,0,0,0,0,0,0,0,0,0, VHTS_{-122,122}\} \quad \text{[Equation 8]}$$

In Equation 8, $VHTS_{-122,122}$ is defined by Equation 7 above.

0 is mapped to a direct current (DC) tone, and $VHTS_{-122,122}$ sequence is mapped to opposite sides of the DC tone.

That is, in a PPDU transmission of 160 MHz, in the case of the VHT-STF Sequence, a non-zero value is mapped to the subcarrier of which subcarrier index is a multiple of 4 among the subcarrier from subcarrier index −250 to subcarrier index 250, but zero value is mapped to the subcarrier of which subcarrier index is −224, −196, −192, −188, −160, −132, −128, −124, −96, −68, −64, −60, −32, −4, 0, 4, 32, 60, 64, 68, 96, 124, 128, 132, 160, 188, 192, 196 or 224.

In Equations 5 to 8, the phase rotation for each sub channel of 20 MHz is not shown.

In the given bandwidth (i.e., PPDU transmission bandwidth), gamma γ (i.e., phase rotation) is applied to the VHT-STF sequence defined by Equations 5 to 8 for each sub channel of 20 MHz.

Hereinafter, $\gamma_k$ and BW will be described for each PPDU bandwidth. In $\gamma_k$ and BW, k represents an index of subcarrier (or tone), and BW represents a PPDU transmission bandwidth.

In a PPDU transmission of 20 MHz, $\gamma_k$ and BW are defined by Equation 9 below.

$$\gamma_{k,20} = 1 \quad \text{[Equation 9]}$$

In a PPDU transmission of 20 MHz, 1 is multiplied to all of the VHT-STF sequence for all subcarriers.

In the case of a PPDU transmission of 40 MHz, $\gamma_k$ and BW are defined by Equation 10 below.

$$\Upsilon_{k,40} = \begin{cases} 1, & k < 0 \\ j, & k \geq 0 \end{cases} \quad \text{[Equation 10]}$$

In the case of 40 MHz PPDU transmission, when the subcarrier index is equal to or less than 0, 1 is multiplied to the VHT-STF sequence, and when the subcarrier index is equal to or greater than 0, j is multiplied to the VHT-STF sequence.

In the case of a PPDU transmission of 80 MHz, $\gamma_k$ and BW are defined by Equation 11 below.

$$\Upsilon_{k,80} = \begin{cases} 1, & k < -64 \\ -1, & k \geq -64 \end{cases} \quad \text{[Equation 11]}$$

In the case of 80 MHz PPDU transmission, when the subcarrier index is less than −64, 1 is multiplied to the VHT-STF sequence, and when the subcarrier index is equal to or greater than −64, −1 is multiplied to the VHT-STF sequence.

In the case of a noncontiguous PPDU transmission of 80+80 MHz, the frequency segment of 80 MHz uses the phase rotation as represented in Equation 11.

In a contiguous PPDU transmission of 160 MHz, $\gamma_k$ and BW are defined by Equation 12 below.

$$\Upsilon_{k,160} = \begin{cases} 1, & k < -192 \\ -1, & -192 \leq k < 0 \\ 1, & 0 \leq k < 64 \\ -1, & 64 \leq k \end{cases} \quad \text{[Equation 12]}$$

In the case of a contiguous PPDU transmission of 160 MHz, when the subcarrier index is less than −192, 1 is multiplied to the VHT-STF sequence, and when the subcarrier index is equal to or greater than −192 and less than 0, −1 is multiplied to the VHT-STF sequence. When the subcarrier index is equal to 0 and less than 64, 1 is multiplied to the VHT-STF sequence, and when the subcarrier index is equal to or greater than 64, −1 is multiplied to the VHT-STF sequence.

As exemplified in FIGS. 11 to 14, in 802.11ax standard, it is required to newly define the HE-STF field which is used for improving AGC estimation performance so as to be accord with a new PPDU format. Particularly, it is required to define the HE-STF sequence that may minimize peak-to-power average ratio (PAPR).

Generally, the PAPR is defined by peak amplitude of an OFDM signal divided by root mean square of OFDM signal amplitude.

Since the OFDM signal is configured by a set of many subcarriers (or tone) that have different amplitudes with each other, the PAPR value may become higher significantly. High PAPR causes a distortion of signal, and owing to the distortion of signal, noise and interference between subcarriers may increase, consequently. On the contrary, low PAPR may prevent a signal from being clipping. Accordingly, it is efficient to lower PAPR of each OFDM signal.

Hereinafter, the present invention proposes a method for generating an HE-STF sequence that may minimize the PAPR and a method for transmitting a PPDU to which the HE-STF is mapped.

In the legacy WLAN system, the FFT size may be 64, 128, 256 or 512 in 20 MHz, 40 MHz, 80 MHz or 160 MHz, respectively. In this case, in the legacy WLAN system, the subcarrier spacing may be 312.5 kHz (=20 MHz/64, 40 MHz/128, 80 MHz/256 and/or 160 MHz/512), and the IDFT/DFT period may be 3.2 μs (=1/312.5 kHz).

As described above, since the HT-STF and the VHT-STF are mapped to a non-zero value in four subcarrier spacing (i.e., subcarrier index is a multiple of 4) in a frequency domain, the HT-STF and the VHT-STF have a periodicity of 0.8 μs (=3.2 μs/4) that corresponds to ¼ times of the IDFT/DFT period in a time domain.

As described above, in the 802.11ax system (i.e., HEW system), a size of FFT (i.e., 4×) may be used, which is four times greater than that of the conventional IEEE 802.11 OFDM system (IEEE 802.11a, 802.11n, 802.11ac, etc.) in each bandwidth.

That is, in the case that the size of FFT used in the legacy WLAN system is 64, 128, 256 or 512 in 20 MHz, 40 MHz, 80 MHz and 160 MHz, respectively, a size of FFT used in the HE-part may be 256, 512, 1024 and 2048 in 20 MHz, 40 MHz, 80 MHz and 160 MHz, respectively. In this case, the subcarrier spacing of the HE-part may be 78.125 kHz (=20 MHz/256, 40 MHz/512, 80 MHz/1024 and/or 160 MHz/2048), and the IDFT/DFT period of the HE-part may be 12.8 μs (=1/78.125 kHz).

As such, since the subcarrier spacing of the HE-part corresponds to ¼ of the legacy WLAN system, when the HE-STF sequence is defined such that non-zero value is mapped in sixteen subcarrier intervals (e.g., subcarrier index is a multiple of 16), the HE-STF has the same periodicity (i.e., 0.8 μs) as that of the legacy WLAN system. That is, when the legacy WLAN system is referred to 1×, this case may be referred to 1× case.

In addition, when the HE-STF sequence is defined such that non-zero value is mapped in eight subcarrier intervals (e.g., subcarrier index is a multiple of 8), the HE-STF has a periodicity (i.e., 1.6 μs) that is two times greater than that of the legacy WLAN system. That is, this case may be referred to 2× case.

Further, when the HE-STF is defined such that non-zero value is mapped in four subcarrier intervals (e.g., subcarrier index is a multiple of 4), the HE-STF has a periodicity (i.e., 3.2 μs) four times greater than that of the legacy WLAN system. That is, this case may be referred to 4× case.

In order to define the HE-STF sequence, the existing HT-STF and/or VHT-STF sequence may be reused, as a simplest method. This will be described by reference to the drawing below.

Hereinafter, in the description of the present invention, the HE-STF tone (or subcarrier) means a tone (i.e., data tone) to which the HE-STF sequence is mapped.

Figure 15:
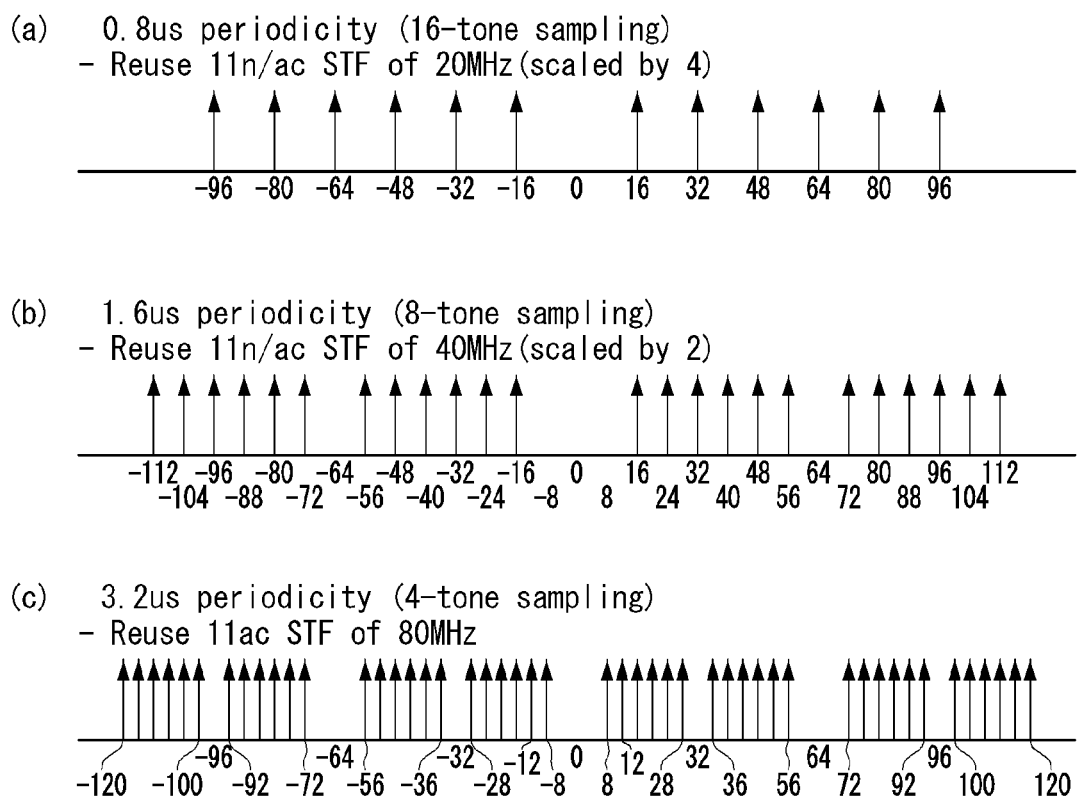
FIG. 15 is a diagram exemplifying an HE-STF tone in a 20 MHz PPDU transmission according to an embodiment of the present invention.

FIG. 15 is a diagram exemplifying an HE-STF tone in a 20 MHz PPDU transmission according to an embodiment of the present invention.

In FIG. 15, x axis represents a frequency domain. The numbers in x axis represent indexes of the HE-STF tone, and the arrows represents that non-zero values are mapped to the corresponding tone indexes. Further, zero is mapped to a tone that has a tone index which is not shown in FIG. 15.

FIG. 15(a) exemplifies the HE-STF (i.e., 16 tone sampling) of 0.8 μs periodicity for 20 MHz bandwidth. That is, non-zero value is mapped in an interval of 16 tones.

The HE-STF that has a periodicity of 0.8 μs for 20 MHz may be generated by reusing the HT-STF sequence (802.11n system) for 20 MHz bandwidth exemplified in Equation 1 or the VHT-STF sequence (802.11ac system) for 20 MHz bandwidth exemplified in Equation 5 by upscaling four times.

Herein, upscaling four times means that a value of four times the tone index to which the HT-STF sequence or the VHT-STF sequence for 20 MHz bandwidth is mapped corresponds to the tone index to which the HE-STF sequence is mapped. For example, tone index 4 to which the HT-STF sequence or the VHT-STF sequence is mapped corresponds to tone index 16 to which the HE-STF sequence is mapped.

Referring to Equations 1 and 5 above again, since non-zero value is mapped to the tone that has a tone index of a multiple of 4 among the tones that have tone indexes from −28 to 28 in the case of the HT-STF or the VHT-STF, a non-zero value may be mapped to the tone that has a tone index of a multiple of 16 among the tones that have tone indexes from −112 to 112 in the case of the HE-STF.

However, in the case of the HT-STF or the VHT-STF, since zero value is mapped to the tone of which tone index is −28, 0 or 28, in the case of the HE-STF, zero value is mapped to the tone of which tone index is −112 (=−28×4), 0 (=0×4) or 112 (=28×4).

FIG. 15(b) exemplifies an HE-STF (i.e., 8 tones or tone sampling) of 1.6 μs periodicity for 20 MHz bandwidth. That is, non-zero values are mapped in an interval of 8 tones.

The HE-STF that has a periodicity of 1.6 μs for 20 MHz may be generated by reusing the HT-STF sequence (802.11n system) for 40 MHz bandwidth exemplified in Equation 2 or the VHT-STF sequence (802.11ac system) for 40 MHz bandwidth exemplified in Equation 6 by upscaling four times.

Similar to above description, upscaling two times means that a value of four times the tone index to which the HT-STF sequence or the VHT-STF sequence for 40 MHz bandwidth is mapped corresponds to the tone index to which the HE-STF sequence is mapped. For example, tone index 4 to which the HT-STF sequence or the VHT-STF sequence is mapped corresponds to tone index 8 to which the HE-STF sequence is mapped.

Referring to Equations 2 and 6 above again, since non-zero value is mapped to the tone that has a tone index of a multiple of 4 among the tones that have tone indexes from −58 to 58 in the case of the HT-STF or the VHT-STF, a non-zero value may be mapped to the tone that has a tone index of a multiple of 8 among the tones that have tone indexes from −116 to 116 in the case of the HE-STF.

However, in the case of the HT-STF or the VHT-STF, since zero value is mapped to the tone of which tone index is −32, −4, 0, 4 or 32, in the case of the HE-STF, zero value is mapped to the tone of which tone index is −64 (=−32×2), −8 (=−4×2), 0 (=0×2), 8 (=4×2) or 64 (=32×2).

FIG. 15(c) exemplifies an HE-STF (i.e., 32 tones or tone sampling) of 3.2 μs periodicity for 20 MHz bandwidth. That is, non-zero values are mapped in an interval of 4 tones.

The HE-STF that has a periodicity of 3.2 μs for 20 MHz may be generated by reusing VHT-STF sequence (802.11ac system) for 80 MHz bandwidth exemplified in Equation 7.

Referring to Equation 7 above again, since non-zero value is mapped to the tone that has a tone index of a multiple of 4 among the tones that have tone indexes from −122 to 122 in the case of the VHT-STF, similarly, a non-zero value may be mapped to the tone that has a tone index of a multiple of 4 among the tones that have tone indexes from −122 to 122 in the case of the HE-STF.

However, in the case of the VHT-STF, since zero value is mapped to the tone of which tone index is −96, −68, −64, −60, −32, −4, 0, 4, 32, 60, 64, 68 or 96, in the case of the HE-STF, zero value is mapped to the tone of which tone index is −96, −68, −64, −60, −32, −4, 0, 4, 32, 60, 64, 68 or 96.

Similar to the example of FIG. 15 above, in case of reusing the existing HT-STF or VHT-STF sequence, the tone index to which a non-zero value is mapped among all HT-STF tones is not maintained at a regular interval.

It is preferable to implement the HE-STF tone (or subcarrier) available to be sampled universally (i.e., without a hole or an uncovered edge) in entire bandwidths for the OFDMA.

Accordingly, an index (i.e., location) of the HE-STF may be defined as Equation 13 below.

$$i_{STF} \bmod N_{STF\_Sample} = 0, \lfloor N_{DC}/2 \rfloor < |i_{STF}| \le N_{SR} \quad \text{[Equation 13]}$$

$N_{DC}$: number of DC tones $$N_{STF\_Sample} = \begin{cases} 16 & 0.8us \text{ periodicity} \\ 8 & 1.6us \text{ periodicity} \\ 4 & 3.2us \text{ periodicity} \end{cases}$$

In Equation 13, $i_{STF}$ represents the HE-STF tone index, and mod represents modulo operation.

$N_{SR}$ represents the most significant index of the data tone on which data (e.g., the HE-STF sequence) except guard tone may be carried.

$N_{DC}$ represents the number of DC tone (or tone).

The guard tone includes a tone that has the most negative index and a tone that has the most positive index, and may include one or more tones. In addition, the tone that has the most positive index may be referred to a right guard tone, and the tone that has the most negative index may be referred to a left guard tone.

The DC tone means a tone located in index 0 for generating a zero mean signal, and may include one or more tones.

To the guard tone and the DC tone, zero value is mapped.

According to Equation 13, in the case of the HE-STF of 0.8 μs periodicity, a non-zero value may be mapped in the data tone (i.e., the HE-STF tone) except the DC tone and the guard tone located in opposite sides of the PPDU bandwidth in an interval of 16 tones.

In addition, in the case of the HE-STF of 1.6 μs periodicity, a non-zero value may be mapped in the data tone (i.e., the HE-STF tone) except the DC tone and the guard tone located in opposite sides of the PPDU bandwidth in an interval of 8 tones.

Further, in the case of the HE-STF of 3.2 μs periodicity, a non-zero value may be mapped in the data tone (i.e., the HE-STF tone) except the DC tone and the guard tone located in opposite sides of the PPDU bandwidth in an interval of 4 tones.

The location of the HE-STF tone according to Equation 13 will be described by reference to the drawing below.

Figure 16:
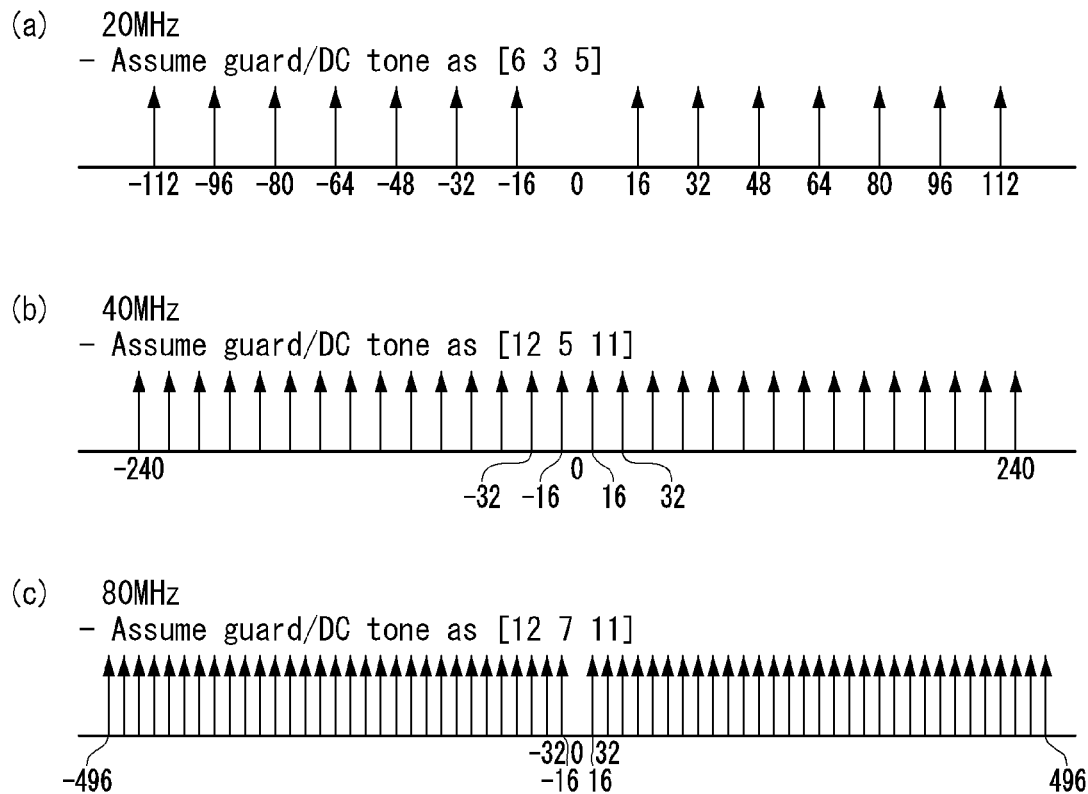
FIG. 16 is a diagram exemplifying an HE-STF tone according to an embodiment of the present invention.

FIG. 16 is a diagram exemplifying an HE-STF tone according to an embodiment of the present invention.

In FIG. 16, the location of the HE-STF tone that has 0.8 μs periodicity is exemplified.

In the notation of [x y z] in FIG. 16, x represents the number of left guard tone, y represents the number of DC tone, and z represents the number of right guard tone.

FIG. 16(a) exemplifies the location of the HE-STF tone in 20 MHz bandwidth. In FIG. 16(a), it is assumed that the guard tone and the DC tone is denoted by [6 3 5]. That is, it is illustrated the case that the left guard tone is 6, the DC tone is 3 and the right guard tone is 5.

In the case of the HE-STF of 0.8 μs periodicity in 20 MHz bandwidth, a non-zero value may be mapped to a tone that has a tone index of a multiple of 16 among the tone indexes from −112 to 112. That is, a non-zero value may be mapped to all tones that have the tone index of a multiple of 16 in the data tone except the guard tone and the DC tone.

FIG. 16(b) exemplifies the location of the HE-STF tone in 40 MHz bandwidth. In FIG. 16(b), it is assumed that the guard tone and the DC tone is denoted by [12 5 11]. That is, it is illustrated the case that the left guard tone is 12, the DC tone is 5 and the right guard tone is 11.

In the case of the HE-STF of 0.8 μs periodicity in 40 MHz bandwidth, a non-zero value may be mapped to a tone that has a tone index of a multiple of 16 among the tone indexes from −240 to 240. That is, a non-zero value may be mapped to all tones that have the tone index of a multiple of 16 in the data tone except the guard tone and the DC tone.

FIG. 16(c) exemplifies the location of the HE-STF tone in 80 MHz bandwidth. In FIG. 16(c), it is assumed that the guard tone or the DC tone is denoted by [12 7 11]. That is, it is illustrated the case that the left guard tone is 12, the DC tone is 7 and the right guard tone is 11.

In the case that the HE-STF is 0.8 μs periodicity in 80 MHz bandwidth, a non-zero value may be mapped to a tone that has a tone index of a multiple of 16 among the tone indexes from −496 to 496. That is, a non-zero value may be mapped to all tones that have the tone index of a multiple of 16 in the data tone except the guard tone and the DC tone.

Hereinafter, in denoting the STF sequence such as sequence$_{-a, b}$ (x), −a, b represents a range of all data tones to which the sequence is mapped. That is, −a represents the most negative tone index in all data tones, and b represents the most positive tone index in all data tones. And x represents an STF tone index to which a non-zero value is mapped.

In addition, in denoting the STF sequence such as sequence$_{-a, b}$ (x:z), x represents a range of the STF tone to which a non-zero value is mapped. That is, x represents the most negative tone index in the STF tone, and z represents the most positive tone index in the STF tone. In the notation, a and b are the same as above description.

Further, in denoting the STF sequence such as sequence$_{-a, b}$ (x:y:z), y represents an upscaling value. In the notation, a, b, x and z are the same as above description.

In addition, $0_x$ represents consecutive zero values of number x.

Embodiment 1

In this embodiment, an HE-STF sequence for a PPDU transmission of 20 MHz, 40 MHz and 80 MHz is proposed.

1) HE-STF sequence in frequency domain for 0.8 μs periodicity

The HE-STF sequence (HES) for a PPDU transmission of 20 MHz may be generated from an HT sequence (HTS) of 20 MHz together with two extra tones in tone indexes −112, 112 as represented by Equation 14 below.

$$\text{HES}_{-112,112}(-96:96) = \text{HTS}_{-28,28}(-24:24) \text{ with upscaling by 4}$$

$$\text{HES}_{-112,112}(-112) = \sqrt{1/2}(-1-j)$$

$$\text{HES}_{-112,112}(112) = \sqrt{1/2}(1+j)$$

$$\text{HES}_{-128,127} = \{0_{16}, \text{HES}_{-112,112}, 0_{15}\} \text{ where } 0_x \text{ mean } x \text{ contiguous } 0s \quad \text{[Equation 14]}$$

$\text{HES}_{-112,112}$ (−96:96) is generated by upscaling four times $\text{HTS}_{-28,28}$ (−24:24). Herein, $\text{HTS}_{-28,28}$ (−24:24) is the same as Equation 1 above.

Here, when upscaling four times $\text{HTS}_{-28,28}$ (−24:24), zero value is mapped to the tone indexes −112 (=−28×4) and 112 (=28×4). However, as described above, since it is preferable for the HE-STF tone to be defined for universally sampling in the entire bandwidths, $(\sqrt{1/2})(-1+j)$ and $(\sqrt{1/2})(1+j)$ values are mapped to $HES_{-112,112}$ $(-112)$ and $HES_{-112,112}$ $(112)$, respectively.

Considering 256 FFT size (i.e., total 256 tones) in 20 MHz ($HES_{-128,127}$), sixteen zero values are configured in the left side of $HES_{-112,112}$, and fifteen zero values are configured in the right side of $HES_{-112,112}$ (i.e., $\{0_{16}, HES_{-112,112}, 0_{15}\}$).

As such, according to the generation of the HE-STF sequence, the HE-STF tone to which a non-zero value is mapped is contiguously configured at intervals of sixteen tones in entire data tones.

The HE-STF sequence (HES) for a PPDU transmission of 40 MHz may be generated based on the HE-STF sequence of 20 MHz which is defined in Equation 14, as represented by Equation 15 below.

$$HES_{-128,112}(0)=\sqrt{1/2}(1+j)$$

$$HES_{-256,255}=\{HES_{-128,127}, HES_{-128,127}\} \quad \text{[Equation 15]}$$

Considering 512 FFT size (i.e., total 512 tones) in 40 MHz, $HES_{-256,255}$ may be generated based on two $HES_{-128,127}$ sequences defined in Equation 14 above (i.e., $\{HES_{-128,127}, HES_{-128,127}\}$).

Here, when using $HES_{-128,127}$ as it is, since zero value is mapped to $HES_{-128,127}(0)$, zero value is mapped to $HES_{-256,255}(-128)$ and $HES_{-256,255}(128)$ corresponding to this. However, as described above, since it is preferable for the HE-STF tone to be defined for universally sampling in the entire bandwidths, $(\sqrt{1/2})(1+j)$ value is mapped to $HES_{-128,127}(0)$. According to this, $(\sqrt{1/2})(1+j)$ value is mapped to $HES_{-256,255}(-128)$ and $HES_{-256,255}(128)$.

As such, according to the generation of the HE-STF sequence, the HE-STF tone to which a non-zero value is mapped is contiguously configured at intervals of sixteen tones in entire data tones.

The HE-STF sequence (HES) for a PPDU transmission of 80 MHz may be generated based on the HE-STF sequence of 40 MHz which is defined in Equation 15 as represented by Equation 16 below.

$$HES_{-256,255}(0)=\sqrt{1/2}(-1-j)$$

$$HES_{-512,511}=\{HES_{-256,255}, HES_{-256,255}\} \quad \text{[Equation 16]}$$

Considering 1024 FFT size (i.e., total 1024 tones) in 80 MHz, $HES_{-512,511}$ may be generated based on two $HES_{-256,255}$ sequences defined in Equation 15 above (i.e., $\{HES_{-256,255}, HES{-256,255}\}$).

Here, when using $HES_{-256,255}$ as it is, since zero value is mapped to $HES_{-256,255}(0)$, zero value is mapped to $HES_{-512,511}(-256)$ and $HES_{-512,511}(256)$ corresponding to this. However, as described above, since it is preferable for the HE-STF tone to be defined for universally sampling in the entire bandwidths, $(\sqrt{1/2})(-1-j)$ value is mapped to $HES_{-256,255}(0)$. According to this, $(\sqrt{1/2})(-1-j)$ value is mapped to $HES_{-512,511}(-256)$ and $HES_{-512,511}(256)$.

As such, according to the generation of the HE-STF sequence, the HE-STF tone to which a non-zero value is mapped is contiguously configured at intervals of sixteen tones in entire data tones.

In the case of a noncontiguous PPDU transmission of 80+80 MHz, the HT-STF sequence of 80 MHz defined in Equation 16 above is used for each frequency segment of 80 MHz.

In a contiguous PPDU transmission of 160 MHz, the HE-STF sequence may use two $HES_{-512,511}$ sequences defined in Equation 16 above, similar to the scheme described above, and a non-zero value may be allocated to $HES_{-512,511}(0)$.

In the given bandwidth (i.e., PPDU transmission bandwidth), gamma γ (i.e., phase rotation) is applied to the HE-STF sequence defined by Equations 14 to 16 for each sub channel of 20 MHz. In this case, gamma γ may be defined in the same way by applying the tone (or subcarrier) index which is four times upscaled to Equations 9 to 12 above.

Table 5 exemplifies the PAPR for each bandwidth in the case that the HE-STF sequence is defined according to embodiment 1 above.

In Table 5, the PAPR is represented by a scalar scale.

TABLE 5

| PAPR | 20 MHz | 40 MHz | 80 MHz |
| --- | --- | --- | --- |
| 11 ac | 1.6179 | 1.6179 | 1.6747 |
| Proposed | 1.5469 | 1.6667 | 1.9579 |

Referring to Table 5, in a PPDU transmission in which a FFT size of 4× is used, by using the HE-STF sequence that has 0.8 μs periodicity according to embodiment 1 of the present invention, the PAPR value may be minimized.

2) HE-STF sequence in frequency domain for 1.6 μs periodicity

The HE-STF sequence (HES) for a PPDU transmission of 20 MHz may be generated from an HT sequence (HTS) of 20 MHz as represented by Equation 17 below.

$$HES_{-56,56}(-48:48)=HTS_{-28,28}(-24:24) \text{ with upscaling by 2}$$

$$HES_{-56,56}(-56)=\sqrt{1/2}(-1-j)$$

$$HES_{-56,56}(56)=\sqrt{1/2}(1+j)$$

$$HES_{-64,63}=\{0_8, HES_{-56,56}, 0_7\} \text{ where } 0_x \text{ mean } x \text{ contiguous } 0s$$

$$HES_{-64,63}(0)=\sqrt{1/2}(1+j)$$

$$HES_{-128,127}=\{HES_{-64,63}, HES_{-64,63}\} \quad \text{[Equation 17]}$$

First, $HES_{-56,56}$ $(-48:48)$ is generated by upscaling two times $HTS_{-28,28}$ $(-24:24)$. Herein, $HTS_{-28,28}$ $(-24:24)$ is the same as Equation 1 above.

Here, when upscaling two times $HTS_{-28,28}$ $(-24:24)$, zero value is mapped to the tone indexes $-56$ ($=-28\times2$) and $56$ ($=-28\times2$). However, as described above, since it is preferable for the HE-STF tone to be defined for universally sampling in the entire bandwidths, $(\sqrt{1/2})(-1-j)$ and $(4/2)(1+j)$ values are mapped to $HES_{-56,56}$ $(-56)$ and $HES_{-56,56}$ $(56)$, respectively.

In addition, considering 256 FFT size (i.e., total 256 tones) in 20 MHz ($HES_{-128,127}$), $HES_{-128,127}$ may be generated based on two $HES_{-64,63}$ sequences (i.e., $\{HES_{-64,63}, HES_{-64,63}\}$).

$HES_{-64,63}$ may be generated by configuring eight zero values in the left side of $HES_{-56,56}$, and configuring seven zero values in the right side of $HES_{-56,56}$ (i.e., $\{0_8, HES_{-56,56}, 0_7\}$).

Here, when using $HES_{-64,63}$ as it is, since zero value is mapped to $HES_{-64,63}(0)$, zero value is mapped to $HES_{-128,127}(-64)$ and $HES_{-128,127}(64)$ corresponding to this. However, as described above, since it is preferable for the HE-STF tone to be defined for universally sampling in the entire bandwidths, $(\sqrt{1/2})(1+j)$ value is mapped to $HES_{-64,63}(0)$. According to this, $(\sqrt{1/2})(1+j)$ value is mapped to $HES_{-128,127}(-64)$ and $HES_{-128,127}(64)$.

As such, according to the generation of the HE-STF sequence, the HE-STF tone to which a non-zero value is mapped is contiguously configured at intervals of eight tones in entire data tones.

The HE-STF sequence for a PPDU transmission of 40 MHz may be generated based on the HE-STF sequence of 20 MHz which is defined in Equation 17 as represented by Equation 18 below.

$$HES_{-128,127}(0) = \sqrt{1/2}(-1-j)$$

$$HES_{-256,255} = \{HES_{-128,127}, HES_{-128,127}\} \quad \text{[Equation 18]}$$

Considering 512 FFT size (i.e., total 512 tones) in 40 MHz, $HES_{-256,255}$ may be generated based on two $HES_{-128,127}$ sequences defined in Equation 17 above (i.e., $\{HES_{-128,127}, HES_{-128,127}\}$).

Here, when using $HES_{-128,127}$ as it is, since zero value is mapped to $HES_{-128,127}(0)$, zero value is mapped to $HES_{-256,255}(-128)$ and $HES_{-256,255}(128)$ corresponding to this. However, as described above, since it is preferable for the HE-STF tone to be defined for universally sampling in the entire bandwidths, $(\sqrt{1/2})(-1-j)$ value is mapped to $HES_{-128,127}(0)$. According to this, $(\sqrt{1/2})(-1-j)$ value is mapped to $HES_{-256,255}(-128)$ and $HES_{-256,255}(128)$.

As such, according to the generation of the HE-STF sequence, the HE-STF tone to which a non-zero value is mapped is contiguously configured at intervals of eight tones in entire data tones.

In a PPDU transmission of 80 MHz, the HE-STF sequence may use two $HES_{-256,255}$ sequences defined in Equation 18 above, similar to the scheme described above, and a non-zero value may be allocated to $HES_{-256,255}(0)$.

In the case of a noncontiguous PPDU transmission of 80+80 MHz, the HE-STF sequence of 80 MHz described above may be used for each frequency segment of 80 MHz.

In a contiguous PPDU transmission of 160 MHz, the HE-STF sequence may use two $HES_{-512,511}$ sequences similar to the scheme described above, and a non-zero value may be allocated to $HES_{-512,511}(0)$.

In the given bandwidth (i.e., PPDU transmission bandwidth), gamma γ (i.e., phase rotation) is applied to the HE-STF sequence defined by Equations 17 and 18 for each sub channel of 20 MHz. In this case, gamma γ may be defined in the same way by applying the tone (or subcarrier) index which is four times upscaled to Equations 9 to 12 above.

Table 6 exemplifies the PAPR for each bandwidth in the case that the HE-STF sequence is defined according to embodiment 1 above.

In Table 6, the PAPR is represented by a scalar scale.

TABLE 6

| PAPR | 20 MHz | 40 MHz |
|---|---|---|
| 11 ac | 1.6179 | 1.6179 |
| Proposed | 1.6667 | 1.9579 |

Referring to Table 6, in a PPDU transmission in which a FFT size of 4× is used, by using the HE-STF sequence that has 1.6 μs periodicity according to embodiment 1 of the present invention, the PAPR value may be minimized.

Embodiment 2

In this embodiment, an HE-STF sequence for PPDU transmissions of 20 MHz, 40 MHz and 80 MHz is proposed based on subsequence.

For the convenience of description, the subsequence is referred to M sequence in this embodiment.

1) HE-STF sequence in frequency domain for 0.8 μs periodicity

In this embodiment, an HE-STF sequence for each bandwidth may be generated based on the M sequence.

First, the M sequence may be generated from the HT sequence (HTS) of 20 MHz as represented by Equation 19 below.

$$M_{-28,28}(-24:24) = HTS_{-28,28}(-24:24)$$

$$M_{-28,28}(-28) = \sqrt{1/2}(-1-j)$$

$$M_{-28,28}(28) = \sqrt{1/2}(1+j)$$

$$M_{-28,28}(0) = \sqrt{1/2}(1+j)$$

$M_{-28,28}(-24:24)$ may be generated in the same way of $HTS_{-28,28}(-24:24)$.

And, as described above, since it is preferable for the HE-STF tone to be defined for universally sampling in the entire bandwidths, $(\sqrt{1/2})(-1-j)$, $(\sqrt{1/2})(1+j)$ and $(\sqrt{1/2})(1+j)$ values are mapped to $M_{-28,28}(-28)$, $M_{-28,28}(28)$ and $M_{-28,28}(0)$, respectively, such that $M_{-28,28}(-28:28)$ sequence is generated.

The HE-STF sequence (HES) for a 20 MHz PPDU transmission may be generated based on the M sequence defined in Equation 19, as represented in Equation 20 below.

$$HES_{-112,112}(112:4:112) = M_{-28,28}(28:28)$$

$$HES_{-128,127} = \{0_{16}, HES_{-112,112}, 0_{15}\} \text{ where } 0_x \text{ mean } x \text{ contiguous 0s}$$

$$HES_{-128,127}(0) = 0 \quad \text{[Equation 20]}$$

$HES_{-112,112}$ (-112:4:112) is generated by upscaling four times the tone index of $M_{-28,28}$ (-28:28).

Considering 256 FFT size (i.e., total 256 tones) in 20 MHz ($HES_{-128,127}$), sixteen zero values are configured in the left side of $HES_{-112,112}$, and fifteen zero values are configured in the right side of $HES_{-112,112}$ (i.e., $\{0_{16}, HES_{-112,112}, 0_{15}\}$).

And, zero value is allocated to 0th tone (i.e., $HES_{-128,127}(0)$).

As such, according to the generation of the HE-STF sequence, the HE-STF tone to which a non-zero value is mapped is contiguously configured at intervals of sixteen tones in entire data tones.

The HE-STF sequence for a PPDU transmission of 40 MHz may be generated based on the M sequence which is defined in Equation 19, as represented by Equation 21 below.

$$HES_{-240,240}(-240:4:240) = \{M_{-28,28}, 0_7, M_{-28,28}\}$$

$$HES_{-256,255} = \{0_{16}, HES_{-240,240}, 0_{15}\} \quad \text{[Equation 21]}$$

The M sequence is located on the left side and the right side of seven tones that has zero value around the DC including the DC itself.

$HES_{-240,240}$ (-240:4:240) is generated by upscaling four times the tone index of the sequence.

Since the M sequence is located neighboring both of the tones that has three zero values in the right side and the tone that has three zero values in the left side, a non-zero value is allocated at intervals of four tones. In addition, the tone that has three zero values in the right side and the M sequence of 57 tones define total 60 tones, and 240 tones in the right side of $HES_{-240,240}$ (−240:4:240) are defined by upscaling four times the tone index of the sequence. So does for the tone in the left side.

Considering 512 FFT size (i.e., total 512 tones) in 40 MHz, sixteen zero values are configured in the left side of $HES_{-240,240}$, and fifteen zero values are configured in the right side of $HES_{-240,240}$ (i.e., −$\{0_{16}, HES_{-240,240}, 0_{15}\}$).

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19, as represented by Equation 22 below.

$$HES_{-496,496}(-496:4:496)=\{M_{-28,28}, 0_3,$$
$$\sqrt{1/2}(-1-j), 0_3, M_{-28,28}, 0_7, M_{-28,28}, 0_3,$$
$$\sqrt{1/2}(-1-j), 0_3, M_{-28,28}\}$$

$$HES_{-512,511}=\{0_{16}, HES_{-496,496}, 0_{15}\} \qquad \text{[Equation 22]}$$

Two M sequences are located on the left side of seven tones that have zero value around the DC including the DC itself, and two M sequences are located in the right side of seven tones that have zero value around the DC including the DC itself. And $(\sqrt{1/2})(-1-j)$ value is allocated to tone indexes −64 and 64 in the same way.

$HES_{-496,496}$ (−496:4:496) is generated by upscaling four times the tone index of the sequence.

The M sequence is located neighboring both of the tone that has three zero values in the right side and the tone that has three zero values in the left side, and $(\sqrt{1/2})(-1-j)$ value is allocated between two M sequences at intervals of four tones, such that a non-zero value is allocated at intervals of four tones.

In addition, in describing the tone in the right side, the tone that has three zero values in the right side and two M sequences of 57 tones and seven tones between two M sequences, that is the sequence for total 124 tones is defined, and by upscaling four times the tone index of the sequence, the 496 tones in the right side of $HES_{-496,496}$ (−496:4:496) are defined. So does for the tone in the left side.

Considering 1024 FFT size (i.e., total 1024 tones) in 80 MHz ($HES_{-512,511}$), sixteen zero values are configured in the left side of $HES_{-496,496}$, and fifteen zero values are configured in the right side of $HES_{-496,496}$ (i.e., $\{0_{16}, HES_{-496,496}, 0_{15}\}$).

As such, according to the generation of the HE-STF sequence, the HE-STF tone to which a non-zero value is mapped is contiguously configured at intervals of eight tones in entire data tones.

In the case of a noncontiguous PPDU transmission of 80+80 MHz, the HE-STF sequence of 80 MHz described above may be used for each frequency segment of 80 MHz.

In a contiguous PPDU transmission of 160 MHz, the HE-STF sequence may be generated based on the M sequence similar to the above described scheme.

In the given bandwidth (i.e., PPDU transmission bandwidth), gamma γ (i.e., phase rotation) is applied to the HE-STF sequence defined by Equations 20 to 22 for each sub channel of 20 MHz. In this case, gamma γ may be defined in the same way by applying the tone (or subcarrier) index which is four times upscaled to Equations 9 to 12 above.

Further, in this embodiment, additionally, a coefficient of the M sequence may be optimized. That is, the value allocated to the extra tone applying gamma to the coefficient of M sequence and the given bandwidth may be jointly optimized.

The HE-STF sequence for PPDU transmissions of 20 MHz and 40 MHz are the same as Equation 20 and 21, respectively.

The HE-STF sequence for a PPDU transmission of 80 MHz may be generated based on the M sequence which is defined in Equation 19 as represented by Equations 23 and 24 below.

$$HES_{-496,496}(-496:4:496)=\{M_{-28,28}, 0_3,$$
$$\sqrt{1/2}(1+j), 0_3, -M_{-28,28}, 0_7, -M_{-28,28}, 0_8,$$
$$\sqrt{1/2}(-1-j), 0_3, M_{-28,28}\}$$

$$HES_{-512,511}=\{0_{16}, HES_{-496,496}, 0_{15}\} \qquad \text{[Equation 23]}$$

Referring to Equation 23, there are differences in that $(\sqrt{1/2})(1+j)$ value is allocated to tone index −64 and $(\sqrt{1/2})(-1+j)$ value is allocated to tone index 64, in comparison with Equation 22 above.

$$HES_{-496,496}(-496:4:496)=\{M_{-28,28}, 0_3,$$
$$\sqrt{1/2}(-1-j), 0_3, M_{-28,28}, 0_7, M_{-28,28}, 0_3,$$
$$\sqrt{1/2}(-1+j), 0_3, M_{-28,28}\}$$

$$HES_{-512,511}=\{0_{16}, HES_{-496,496}, 0_{15}\} \qquad \text{[Equation 24]}$$

Referring to Equation 24, there are differences in that $(\sqrt{1/2})(-1-j)$ value is allocated to tone index −64 and $(\sqrt{1/2})(-1+j)$ value is allocated to tone index 64, in comparison with Equation 22 above.

In the given bandwidth (i.e., PPDU transmission bandwidth), gamma γ (i.e., phase rotation) is applied to the HE-STF sequence defined by Equations 20, 12, 23 and 24 for each sub channel of 20 MHz. In this case, gamma γ may be defined in the same way by applying the tone (or subcarrier) index which is four times upscaled to Equations 9 to 12 above.

2) HE-STF sequence in frequency domain for 1.6 μs periodicity

In 2× case (i.e., 1.6 μs periodicity), the value allocated to the extra tone applying gamma to the coefficient of M sequence and the given bandwidth may be jointly optimized.

The HE-STF sequence for a 20 MHz PPDU transmission may be generated based on the M sequence which is defined in Equation 19 as represented by Equation 25 below.

$$HES_{-120,120}(-120:2:120)=\{M_{-28,28}, 0_7, jM_{-28,28}\}$$

$$HES_{-128,127}=\{0_8, HES_{-120,120}, 0_7\} \qquad \text{[Equation 25]}$$

The M sequence is located on the left side of seven tones that have zero value around the DC including the DC itself, and the M sequence to which j is applied (multiplied) is located in the right side of seven tones that have zero value around the DC including the DC itself.

$HES_{-120,120}$ (−120:2:120) is generated by upscaling two times the tone index of the sequence.

Since the M sequence is located neighboring both of the tone that has three zero values in the right side and the tone that has three zero values in the left side, non-zero values are allocated in an interval of four tones. In addition, the tone that has three zero values in the right side and the M sequence of 57 tones define total 60 tones, and 120 tones in the right side of $HES_{-120,120}$ (−120:2:120) are defined by upscaling four times the tone index of the sequence. So does for the tone in the left side.

Considering 256 FFT size (i.e., total 256 tones) in 20 MHz ($HES_{-128,127}$), eight zero values are configured in the left side of $HES_{-120,120}$, and seven zero values are configured in the right side of $HES_{-120,120}$ (i.e., $\{0_8, HES_{-120,120}, 0_7\}$).

As such, according to the generation of the HE-STF sequence, the HE-STF tone to which a non-zero value is mapped is contiguously configured at intervals of eight tones in entire data tones.

The HE-STF sequence for a PPDU transmission of 40 MHz may be generated based on the M sequence which is defined in Equation 19.

Case 1) As represented by Equation 26 below, the number of tones that has zero value in the left side and the number of tones that has zero value in the right side may be configured less than 8, respectively.

$$HES_{-248,248}(-248:2:248) = \{M_{-28,28}, 0_3,$$
$$\sqrt{1/2}(-1-j), 0_3, M_{-28,28}, 0_7, -jM_{-28,28}, 0_3,$$
$$\sqrt{1/2}(-1-j), 0_3, jM_{-28,28}\}$$

$$HES_{-256,255} = \{0_8, HES_{-248,248}, 0_7\} \quad \text{[Equation 26]}$$

Two M sequences to which respective 1 and 1 are applied (multiplied) are located on the left side of seven tones that have zero value around the DC including the DC itself, and two M sequences to which respective $-j$ and $j$ are applied (multiplied) are located in the right side of seven tones that have zero value around the DC including the DC itself. And $(\sqrt{1/2})(-1-j)$ value is allocated to tone indexes $-64$ and $64$ in the same way.

$HES_{-248,248}(-248:2:248)$ is generated by upscaling two times the tone index of the sequence.

The M sequence is located neighboring both of the tone that has three zero values in the right side and the tone that has three zero values in the left side, and $(\sqrt{1/2})(-1-j)$ value is allocated between two M sequences in an interval of four tones, such that non-zero values are allocated in an interval of four tones.

In addition, in describing the tone in the right side, the tone that has three zero values in the right side and two M sequences of 57 tones and seven tones between two M sequence, that is the sequence for total 124 tones is defined, and by upscaling two times the tone index of the sequence, the 248 tones in the right side of $HES_{-248,248}(-248:2:248)$ are defined. So does for the tone in the left side.

Considering 512 FFT size (i.e., total 512 tones) in 40 MHz ($HES_{-256,255}$), eight zero values are configured in the left side of $HES_{-248,248}$, and seven zero values are configured in the right side of $HES_{-248,248}$ (i.e., $\{0_8, HES_{-248,248}, 0_7\}$).

As such, according to the generation of the HE-STF sequence, the HE-STF tone to which a non-zero value is mapped is contiguously configured at intervals of eight tones in entire data tones.

Case 2) As represented by Equation 27 below, the number of tones that has zero value in the left side and the number of tones that has zero value in the right side may be configured greater than 8 and less than 16, respectively.

$$HES_{-248,248}(-248:2:248) = \{M_{-28,28}, 0_3,$$
$$\sqrt{1/2}(-1-j), 0_3, M_{-28,28}, 0_7, -jM_{-28,28}, 0_3,$$
$$\sqrt{1/2}(-1-j), 0_3, jM_{-28,28}\}$$

$$HES_{-256,255} = \{0_8, HES_{-248,248}, 0_7\}$$

$$HES_{-256,255}(\pm 248) = 0 \quad \text{[Equation 27]}$$

Two M sequences to which respective 1 and 1 are applied (multiplied) are located on the left side of seven tones that have zero value around the DC including the DC itself, and two M sequences to which respective $-j$ and $j$ are applied (multiplied) are located in the right side of seven tones that have zero value around the DC including the DC itself. And $(\sqrt{1/2})(-1-j)$ value is allocated to tone indexes $-64$ and $64$ in the same way.

$HES_{-248,248}(-248:2:248)$ is generated by upscaling two times the tone index of the sequence.

And, considering 512 FFT size (i.e., total 512 tones) in 40 MHz ($HES_{-256,255}$), eight zero values are located in the left side of $HES_{-248,248}$, and seven zero values are located in the right side of $HES_{-248,248}$, such that $HES_{-256,255}$ is generated.

And, zero value is allocated to $HES_{-256,255}$ ($\pm 248$).

That is, by configuring zero value for all tones that are located in the right side of $HES_{-256,255}$ (240) tone, the number of tones that has zero value in the right side may be configured to 15, and by configuring zero value for all tones that are located in the left side of $HES_{-256,255}$ ($-240$) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19.

Case 1) As represented by Equation 28 below, the number of tones that has zero value in the left side and the number of tones that has zero value in the right side may be configured less than 8, respectively.

$$HES_{-504,504}(-504:2:504) = \{M_{-28,28}, 0_3,$$
$$\sqrt{1/2}(1-j), 0_3, jM_{-28,28}, 0_3, \sqrt{1/2}(1-j), 0_3, jM_{-28,28}, 0_3,$$
$$\sqrt{1/2}(1-j), 0_3, -jM_{-28,28}, 0_7, -M_{-28,28}, 0_3,$$
$$\sqrt{1/2}(1-j), 0_3, jM_{-28,28}, 0_3, \sqrt{1/2}(1-j), 0_3, jM_{-28,28}, 0_3,$$
$$\sqrt{1/2}(1-j), 0_3, jM_{-28,28}\}$$

$$HES_{-512,511} = \{0_8, HES_{-504,504}, 0_7\} \quad \text{[Equation 28]}$$

Four M sequences to which respective 1, j, j and $-j$ are applied (multiplied) are located on the left side of seven tones that have zero value around the DC including the DC itself, and four M sequences to which respective $-1$, j, j and j are applied (multiplied) are located in the right side of seven tones that have zero value around the DC including the DC itself. And $(\sqrt{1/2})(1-j)$ value is allocated to all of tone indexes $-192$, $-128$, $-64$, $64$, $128$ and $192$ in the same way.

$HES_{-504,504}(-504:2:504)$ is generated by upscaling two times the tone index of the sequence.

The M sequence is located neighboring both of the tone that has three zero values in the right side and the tone that has three zero values in the left side, and $(\sqrt{1/2})(-1-j)$ value is allocated between two M sequences in an interval of four tones, such that non-zero values are allocated in an interval of four tones.

In addition, in describing the tone in the right side, the tone that has three zero values in the right side and four M sequences of 57 tones and twenty one tones between M sequences, that is the sequence for total 252 tones is defined, and by upscaling two times the tone index of the sequence, the 504 tones in the right side of $HES_{-504,504}(-504:2:504)$ are defined. So does for the tone in the left side.

Considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, HES_{-504,504}, 0_7\}$).

As such, according to the generation of the HE-STF sequence, the HE-STF tone to which a non-zero value is mapped is contiguously configured at intervals of eight tones in entire data tones.

Case 2) As represented by Equation 29 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{1/2}(-1-j), 0_3, -jM_{-28,28}, 0_3,$$
$$\sqrt{1/2}(1+j), 0_3, -jM_{-28,28}, 0_3,$$
$$\sqrt{1/2}(1+j), 0_3, -jM_{-28,28}, 0_7, -M_{-28,28}, 0_3,$$
$$\sqrt{1/2}(1-j), 0_3, -jM_{-28,28}, 0_3,$$
$$\sqrt{1/2}(-1+j), 0_3, -jM_{-28,28}, 0_3, \sqrt{1/2}(1-j), 0_3, jM_{-28,28}\}$$

$$HES_{-512,511} = \{0_8, HES_{-504,504}, 0_7\}$$

$$HES_{-512,511}(\pm 504) = 0 \quad \text{[Equation 29]}$$

Four M sequences to which respective 1, −j, −j and −j are applied (multiplied) are located on the left side of seven tones that have zero value around the DC including the DC itself, and four M sequences to which respective −1, −j, −j and j are applied (multiplied) are located in the right side of seven tones that have zero value around the DC including the DC itself.

And different values are allocated to tone indexes −192, −128, −64, 64, 128 and 192. That is, $(\sqrt{1/2})(-1-j)$ value is allocated to tone index −192, $(\sqrt{1/2})(1+j)$ is allocated to tone index −128, $(\sqrt{1/2})(1+j)$ is allocated to tone index −64, $(\sqrt{1/2})(1-j)$ is allocated to tone index 64, $(\sqrt{1/2})(-1+j)$ is allocated to tone index 128, and $(\sqrt{1/2})(1-j)$ is allocated to tone index 192.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight zero values are located in the left side of $HES_{-504,504}$, and seven zero values are configured in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 25 to 29 for each sub channel of 20 MHz. In this case, gamma γ may be defined in the same way by applying the tone (or subcarrier) index which is four times upscaled to Equations 9 to 12 above.

Table 7 exemplifies the PAPR for each bandwidth in the case that the HE-STF sequence is defined according to embodiment 2 above.

In Table 7, the PAPR is represented by a scalar scale/decibel (dB) scale.

TABLE 7

| PAPR | 20 MHz | 40 MHz | 80 MHz | |
|---|---|---|---|---|
| 11 ac | 1.6179/2.0895 | 1.6179/2.0895 | 1.6747/2.2394 | |
| 1x proposed | 1.5469/1.8946 | 1.6667/2.2186 | 1.9579/2.9179 | 1.9053/2.7996 |
| 2x proposed | 1.6667/2.2186 | Case 1  1.9053/2.7996 | Case 1 | 1.8869/2.7575 |
| | | Case 2  1.8778/2.7365 | Case 2 | 1.8710/2.7207 |

Referring to Table 7, in a PPDU transmission in which a FFT size of 4× is used, by using the HE-STF sequence that has 0.8 μs periodicity (i.e., 1× case) and 1.6 μs periodicity (i.e., 2× case) according to embodiment 2 of the present invention, the PAPR value may be minimized.

Embodiment 2-1

In this embodiment, an HE-STF sequence for a PPDU transmission of 80 MHz is proposed.

In this embodiment, the coefficient of M sequence may be applied first, and then, a value may be inserted (i.e., allocated) to an extra tone.

Considering the HE-STF is transmitted by being duplicated, the same value as the DC tone that corresponds to the same bandwidth may be allocated to the extra tone. And, by applying gamma to the given bandwidth, the value allocated to the M sequence coefficient and the extra tone may be optimized.

The HE-STF sequence for a PPDU transmission of 20 MHz is the same as the sequence defined in Equation 25, and the HE-STF sequence for a PPDU transmission of 40 MHz is the same as the sequence defined in Equations 26 (case 1) and 27 (case 2).

The HE-STF sequence for a PPDU transmission of 80 MHz may be generated based on the M sequence which is defined in Equation 19.

Case 1) As represented by Equation 28 above, the number of tones that has zero value in the left side and the number of tones that has zero value in the right side may be configured less than 8, respectively.

Case 2) As represented by Equation 30 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{1/2}(-1-j), 0_3, -jM_{-28,28}, 0_3,$$
$$\sqrt{1/2}(-1+j), 0_3, M_{-28,28}, 0_3,$$
$$\sqrt{1/2}(-1-j), 0_3, M_{-28,28}, 0_7, M_{-28,28}, 0_3,$$
$$\sqrt{1/2}(-1-j), 0_3, -jM_{-28,28}, 0_3,$$
$$\sqrt{1/2}(-1+j), 0_3, -M_{-28,28}, 0_3, \sqrt{1/2}(-1-j), 0_3, M_{-28,28}\}$$

$$HES_{-512,511} = \{0_8, HES_{-504,504}, 0_7\}$$

$$HES_{-512,511}(\pm 504) = 0 \quad \text{[Equation 29]}$$

Four M sequences to which respective 1, j, 1 and 1 are applied (multiplied) are located on the left side of seven tones that have zero value around the DC including the DC itself, and four M sequences to which respective 1, −j, −1 and 1 are applied (multiplied) are located in the right side of seven tones that have zero value around the DC including the DC itself.

And different values are allocated to tone indexes −192, −128, −64, 64, 128 and 192. That is, $(\sqrt{1/2})(-1-j)$ value is allocated to tone index −192, $(\sqrt{1/2})(-1+j)$ is allocated to tone index −128, $(\sqrt{1/2})(-1-j)$ is allocated to tone index −64, $(\sqrt{1/2})(-1-j)$ is allocated to tone index 64, $(\sqrt{1/2})(-1+j)$ is allocated to tone index 128, and $(\sqrt{1/2})(-1-j)$ is allocated to tone index 192.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-504,504}$ (±504).

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 25 to 28 and Equation 30 for each sub channel of 20 MHz. In this case, gamma γ may be defined in the same way by applying the tone (or subcarrier) index which is four times upscaled to Equations 9 to 12 above.

Table 8 exemplifies the PAPR for each bandwidth in the case that the HE-STF sequence is defined according to embodiment 2-1 above.

In Table 8, the PAPR is represented by a scalar scale/decibel (dB) scale.

TABLE 8

| PAPR | 80 MHz | |
|---|---|---|
| 11 ac | 1.6747/2.2394 | |
| 1x proposed | 1.9579/2.9179 | 1.9053/2.7996 |
| 2x additional proposed 1 | Case 1 | 1.8869/2.7575 |
| | Case 2 | 1.9846/2.9767 |

Referring to Table 8, in a PPDU transmission in which a FFT size of 4× is used, by using the HE-STF sequence that has 1.6 μs periodicity according to embodiment 2-1 of the present invention, the PAPR value may be minimized.

Embodiment 2-2

In this embodiment, an HE-STF sequence for PPDU transmissions of 40 MHz and 80 MHz is proposed.

In this embodiment, a value may be inserted (i.e., allocated) to an extra tone first, and then, a subsequence (i.e., the M sequence) coefficient may be applied.

Considering that the HE-STF is transmitted by being duplicated, the same value as the DC tone that corresponds to the same bandwidth may be allocated to the extra tone. And, by applying gamma to the given bandwidth, the value allocated to the M sequence coefficient and the extra tone may be optimized.

The HE-STF sequence for a PPDU transmission of 40 MHz may be generated based on the M sequence which is defined in Equation 19.

Case 1) As represented by Equation 31 below, the number of tones that has zero value in the left side and the number of tones that has zero value in the right side may be configured less than 8, respectively.

$$HES_{-248,248}(-248:2:248)=\{M_{-28,28},0_3,$$
$$\sqrt{1/2}(-1-j),0_3,M_{-28,28},0_7,M_{-28,28},0_3,$$
$$\sqrt{1/2}(-1-j),0_3,M_{-28,28}\}$$

$$HES_{-256,255}=\{0_8,HES_{-248,248},0_7\}$$

$$HES_{-256,255}=\gamma HES_{-256,255} \quad \text{[Equation 31]}$$

(γ=1, −j, −j for −256≤tone≤−1, 0≤tone≤127, 128≤tone≤255)

Two M sequences are located on the left side of seven tones that have zero value around the DC including the DC itself, and two M sequences are located in the right side of seven tones that have zero value around the DC including the DC itself. And $(\sqrt{1/2})(-1-j)$ value is allocated to tone indexes −64 and 64 in the same way.

$HES_{-248,248}(-248:2:248)$ is generated by upscaling two times the tone index of the sequence.

Considering 512 FFT size (i.e., total 512 tones) in 40 MHz ($HES_{-256,255}$), eight zero values are configured in the left side of $HES_{-248,248}$, and seven zero values are configured in the right side of $HES_{-248,248}$ (i.e., $\{0_8, HES_{-248,248}, 0_7\}$).

And gamma γ is applied (i.e., multiplied) to $HES_{-256,256}$.

As such, according to the generation of the HE-STF sequence, the HE-STF tone to which a non-zero value is mapped is contiguously configured at intervals of eight tones in entire data tones.

Case 2) As represented by Equation 32 below, the number of tones that has zero value in the left side and the number of tones that has zero value in the right side may be configured greater than 8 and less than 16, respectively.

$$HES_{-248,248}(-248:2:248)=\{M_{-28,28},0_3,$$
$$\sqrt{1/2}(-1-j),0_3,M_{-28,28},0_7,M_{-28,28},0_3,$$
$$\sqrt{1/2}(1+j),0_3,M_{-28,28}\}$$

$$HES_{-256,255}=\{0_8,HES_{-248,248},0_7\}$$

$$HES_{-256,255}(\pm 248)=0$$

$$HES_{-256,255}=\gamma HES_{-256,255} \quad \text{[Equation 32]}$$

(γ=1, −1, −j for −256≤tone≤−129, −128≤tone≤−1, 0≤tone≤255)

Two M sequences are located on the left side of seven tones that have zero value around the DC including the DC itself, and two M sequences are located in the right side of seven tones that have zero value around the DC including the DC itself. And $(\sqrt{1/2})(1+j)$ value is allocated to tone indexes −64 and 64 in the same way.

$HES_{-248,248}(-248:2:248)$ is generated by upscaling two times the tone index of the sequence.

And, considering 512 FFT size (i.e., total 512 tones) in 40 MHz ($HES_{-256,255}$), eight tones to which zero value are allocated is located in the left side of $HES_{-256,255}$, and seven tones to which zero value is allocated are located in the right side of $HES_{-256,255}$, such that $HES_{-256,255}$ is generated.

And, zero value is allocated to $HES_{-256,255}$ (±248).

That is, by configuring zero value for all tones located in the right side of $HES_{-256,255}$ (240) tone, the number of tones that has zero value in the right side may be configured to 15, and by configuring zero value for all tones located in the left side of $HES_{-256,255}$ (−240) tone, the number of tones that has zero value in the left side may be configured to 16.

And gamma γ is applied (i.e., multiplied) to $HES_{-256,256}$.

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19.

Case 1) As represented by Equation 33 below, the number of tones that has zero value in the left side and the number of tones that has zero value in the right side may be configured less than 8, respectively.

$$HES_{-504,504}(-504:2:504)=\{M_{-28,28},0_3,$$
$$\sqrt{1/2}(-1-j),0_3,M_{-28,28},0_3,\sqrt{1/2}(-1-j),0_3,M_{-28,28},0_3,$$
$$\sqrt{1/2}(-1-j),0_3,M_{-28,28},0_7,M_{-28,28},0_3,$$
$$\sqrt{1/2}(-1-j),0_3,M_{-28,28},0_3,\sqrt{1/2}(-1-j),0_3,M_{-28,28},0_3,$$
$$\sqrt{1/2}(-1-j),0_3,jM_{-28,28}\}$$

$$HES_{-512,511}=\{0_8,HES_{-504,504},0_7\}$$

$$HES_{-512,511}=\gamma HES_{-512,511} \quad \text{[Equation 33]}$$

(γ=1, j, −1 for −512≤tone≤−129∥0≤tone≤127, −128≤tone≤−1∥384≤tone≤511, 128≤tone≤383)

Four M sequences are located on the left side of seven tones that have zero value around the DC including the DC itself, and four M sequences are located in the right side of seven tones that have zero value around the DC including the DC itself. And $(\sqrt{1/2})(-1-j)$ value is allocated to all of tone indexes −192, −128, −64, 64, 128 and 192 in the same way.

$HES_{-504,504}(-504:2:504)$ is generated by upscaling two times the tone index of the sequence.

In addition, considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, HES_{-504,504}, 0_7\}$).

And gamma γ is applied (i.e., multiplied) to $HES_{-512,511}$.

As such, according to the generation of the HE-STF sequence, the HE-STF tone to which a non-zero value is mapped is contiguously configured at intervals of eight tones in entire data tones.

Case 2) As represented by Equation 34 below, the number of tones that has zero value in the left side and the number of tones that has zero value in the right side may be configured greater than 8 and less than 16, respectively.

$$HES_{-504,504}(-504:2:504)=\{M_{-28,28},0_3,$$
$$\sqrt{1/2}(-1-j),0_3,-M_{-28,28},0_3,$$
$$\sqrt{1/2}(-1+j),0_3,-jM_{-28,28},0_3,$$
$$\sqrt{1/2}(-1-j),0_3,-M_{-28,28},0_7,-M_{-28,28},0_3,$$
$$\sqrt{1/2}(-1-j),0_3,-M_{-28,28},0_3,$$
$$\sqrt{1/2}(-1+j),0_3,-jM_{-28,28},0_3,\sqrt{1/2}(-1-j),0_3,M_{-28,28}\}$$

$$HES_{-512,511}=\{0_8,HES_{-504,504},0_7\}$$

$$HES_{-512,511}(\pm 504)=0$$

$$HES_{-512,511}=\gamma HES_{-512,511} \quad \text{[Equation 34]}$$

(γ=1, −1, −j for −512≤tone≤−385∥384≤tone≤511, −384≤tone≤−257∥−128≤tone≤255, −256≤tone≤−129∥256≤tone≤383)

Four M sequences to which respective 1, −1, −j and −1 are applied (multiplied) are located on the left side of seven tones that have zero value around the DC including the DC itself, and four M sequences to which respective −1, −1, −j and 1 are applied (multiplied) are located in the right side of seven tones that have zero value around the DC including the DC itself.

And different values are allocated to tone indexes −192, −128, −64, 64, 128 and 192. That is, $(\sqrt{1/2})(-1-j)$ value is allocated to tone index −192, $(\sqrt{1/2})(-1+j)$ is allocated to tone index −128, $(\sqrt{1/2})(-1-j)$ is allocated to tone index −64, $(\sqrt{1/2})(-1-j)$ is allocated to tone index 64, $(\sqrt{1/2})(-1+j)$ is allocated to tone index 128, and $(\sqrt{1/2})(-1-j)$ is allocated to tone index 192.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}$ (±504).

That is, by configuring zero value for all tones located in the right side of $HES_{-512,511}$(496) tone, the number of tones that has zero value in the right side may be configured to 15, and by configuring zero value for all tones located in the left side of $HES_{-512,511}$(−496) tone, the number of tones that has zero value in the left side may be configured to 16.

And gamma γ is applied (i.e., multiplied) to $HES_{-512,511}$.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 31 to 34 for each sub channel of 20 MHz. In this case, gamma γ may be defined in the same way by applying the tone (or subcarrier) index which is four times upscaled to Equations 9 to 12 above.

Table 9 exemplifies the PAPR for each bandwidth in the case that the HE-STF sequence is defined according to embodiment 2-2 above.

In Table 9, the PAPR is represented by a scalar scale/decibel (dB) scale.

TABLE 9

| PAPR | | 40 MHz | | 80 MHz |
|---|---|---|---|---|
| 11 ac | | 1.6179/2.0895 | | 1.6747/2.2394 |
| 1x proposed | | 1.6667/2.2186 | 1.9579/2.9179 | 1.9053/2.7996 |
| 2x additional | Case 1 | 1.9113/2.8133 | Case 1 | 1.9268/2.8484 |
| proposed 2 | Case 2 | 1.8985/2.7841 | Case 2 | 1.9391/2.8760 |

Referring to Table 9, in a PPDU transmission in which a FFT size of 4× is used, by using the HE-STF sequence that has 1.6 μs periodicity according to embodiment 2-2 of the present invention, the PAPR value may be minimized.

Embodiment 2-3

In this embodiment, an HE-STF sequence for a PPDU transmission of 80 MHz is proposed.

In this embodiment, similar to the concept of duplicating the HE-STF sequence of 80 MHz when generating the HE-STF sequence of 160 MHz in 1× case (i.e., 0.8 μs periodicity), a value is not inserted (i.e., allocated) to the tone that has ±256 tones (corresponds to DC tone in 40 MHz) when generating the HE-STF sequence of 80 MHz.

In case 1 and case 2 below, considering that the HT-STF is transmitted by being duplicated, the same value with the DC tone that corresponds to the same bandwidth may be allocated to an extra tone (except ±256 tones). However, in case 3 below, an independent value may be designated to all extra tones (except ±256 tones).

The HE-STF sequence for a PPDU transmission of 80 MHz may be generated based on the M sequence defined in Equation 19.

Case 1) The M sequence coefficient is applied first, and then, a value is inserted to the extra tone.

Case 1-A) As represented by Equation 35 below, the number of tones that has zero value in the left side and the number of tones that has zero value in the right side may be configured less than 8, respectively.

$$HES_{-504,504}(-504:2:504) = \{M_{-28,28}, 0_3,$$
$$\sqrt{1/2}(-1-j), 0_3, -M_{-28,28}, 0_7, M_{-28,28}, 0_3,$$
$$\sqrt{1/2}(-1-j), 0_3, jM_{-28,28}, 0_7, M_{-28,28}, 0_3,$$
$$\sqrt{1/2}(-1-j), 0_3, M_{-28,28}, 0_7, -M_{-28,28}, 0_3,$$
$$\sqrt{1/2}(-1-j), 0_3, jM_{-28,28}\}$$

$$HES_{-512,511} = \{0_8, HES_{-504,504}, 0_7\} \quad \text{[Equation 35]}$$

Four M sequences to which respective 1, −1, 1 and j are applied (multiplied) are located on the left side of seven tones that have zero value around the DC including the DC itself, and four M sequences to which respective 1, 1, −1 and j are applied (multiplied) are located in the right side of seven tones that have zero value around the DC including the DC itself.

And $(\sqrt{1/2})(-1-j)$ value is allocated to all of tone indexes −192, −64, 64 and 192, and zero value is allocated to tone indexes −128 and 128.

$HES_{-504,504}(-504:2:504)$ is generated by upscaling two times the tone index of the sequence.

In addition, considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, HES_{-504,504}, 0_7\}$).

As such, according to the generation of the HE-STF sequence, the HE-STF tone to which a non-zero value is mapped is contiguously configured at intervals of eight tones in entire data tones.

Case 1-B) As represented by Equation 36 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{1/2}(-1-j), 0_3, jM_{-28,28}, 0_3,$$
$$\sqrt{1/2}(-1+j), 0_3, jM_{-28,28}, 0_7, -M_{-28,28}, 0_3,$$
$$\sqrt{1/2}(-1+j), 0_3, jM_{-28,28}, 0_7, jM_{-28,28}, 0_3,$$
$$\sqrt{1/2}(-1+j), 0_3, -jM_{-28,28}, 0_3,$$
$$\sqrt{1/2}(-1+j), 0_3, -jM_{-28,28}\}$$

$$HES_{-512,511} = \{0_8, HES_{-504,504}, 0_7\}$$

$$HES_{-512,511}(\pm 504) = 0 \quad \text{[Equation 36]}$$

Four M sequences to which respective 1, j, j and j are applied (multiplied) are located on the left side of seven tones that have zero value around the DC including the DC itself, and four M sequences to which respective −1, j, j and −j are applied (multiplied) are located in the right side of seven tones that have zero value around the DC including the DC itself.

And $(\sqrt{1/2})(-1+j)$ value is allocated to all of tone indexes −192, −64, 64 and 192, and zero value is allocated to tone indexes −128 and 128.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

As such, according to the generation of the HE-STF sequence, the HE-STF tone to which a non-zero value is mapped is contiguously configured at intervals of eight tones in entire data tones.

Case 2) First, a value is inserted to an extra tone, and a subsequence (i.e., the M sequence) coefficient is applied.

Case 2-A) As represented by Equation 37 below, the number of tones that has zero value in the left side and the number of tones that has zero value in the right side may be configured less than 8, respectively.

$$HES_{-504,504}(-504:2:504) = \{M_{-28,28}, 0_3,$$
$$\sqrt{1/2}(-1-j), 0_3, M_{-28,28}, 0_3,$$
$$\sqrt{1/2}(-1-j), 0_3, M_{-28,28}, 0_7, -M_{-28,28}, 0_3,$$
$$\sqrt{1/2}(-1-j), 0_3, M_{-28,28}, 0_7, M_{-28,28}, 0_3,$$
$$\sqrt{1/2}(-1-j), 0_3, M_{-28,28}\}$$

$$HES_{-512,511} = \{0_8, HES_{-504,504}, 0_7\}$$

$$HES_{-512,511} = \gamma HES_{-512,511} \quad \text{[Equation 37]}$$

($\gamma$=1, j, −1 for −512≤tone≤−129∥0≤tone≤127, −128≤tone≤−1∥384≤tone≤511, 128≤tone≤383)

Four M sequences are located on the left side of seven tones that have zero value around the DC including the DC itself, and four M sequences are located in the right side of seven tones that have zero value around the DC including the DC itself.

And $(\sqrt{1/2})(-1-j)$ value is allocated to all of tone indexes −192, −64, 64 and 192, and zero value is allocated to tone indexes −128 and 128.

$HES_{-504,504}(-504:2:504)$ is generated by upscaling two times the tone index of the sequence.

In addition, considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, HES_{-504,504}, 0_7\}$).

And gamma $\gamma$ is applied (i.e., multiplied) to $HES_{-512,511}$.

As such, according to the generation of the HE-STF sequence, the HE-STF tone to which a non-zero value is mapped is contiguously configured at intervals of eight tones in entire data tones.

Case 2-B) As represented by Equation 38 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{\tfrac{1}{2}}(-1-j), 0_3, M_{-28,28}, 0_7, M_{-28,28}, 0_3,$$
$$\sqrt{\tfrac{1}{2}}(-1-j), 0_3, M_{-28,28}, 0_7, M_{-28,28}, 0_3,$$
$$\sqrt{\tfrac{1}{2}}(-1-j), 0_3, M_{-28,28}, 0_7, M_{-28,28}, 0_3,$$
$$\sqrt{\tfrac{1}{2}}(-1-j), 0_3, M_{-28,28}\}$$

$$HES_{-512,511} = \{0_8, HES_{-504,504}, 0_7\}$$

$$HES_{-512,511}(\pm 504) = 0$$

$$HES_{-512,511} = \gamma HES_{-512,511} \quad [\text{Equation 38}]$$

($\gamma=1$, $-1$, j for $-512 \leq \text{tone} \leq -385 \| 384 \leq \text{tone} \leq 511$, $-384 \leq \text{tone} \leq -257 \| -128 \leq \text{tone} \leq 255$, $-256 \leq \text{tone} \leq -129 \| 256 \leq \text{tone} \leq 383$)

Four M sequences are located on the left side of seven tones that have zero value around the DC including the DC itself, and four M sequences are located in the right side of seven tones that have zero value around the DC including the DC itself.

And $(\sqrt{\tfrac{1}{2}})(-1-j)$ value is allocated to all of tone indexes $-192$, $-64$, 64 and 192, and zero value is allocated to tone indexes $-128$ and 128.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

And gamma $\gamma$ is applied (i.e., multiplied) to $HES_{-512,511}$.

As such, according to the generation of the HE-STF sequence, the HE-STF tone to which a non-zero value is mapped is contiguously configured at intervals of eight tones in entire data tones.

Case 3) The value allocated to the extra tone applying gamma to the coefficient of M sequence and the given bandwidth is jointly optimized.

Case 3-A) The number of tones that has zero value in the left side and the number of tones that has zero value in the right side may be configured less than 8, respectively.

This is the same as Equation 35 (case 1-A) above.

Case 3-B) As represented by Equation 39 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{\tfrac{1}{2}}(1-j), 0_3, M_{-28,28}, 0_7, -M_{-28,28}, 0_3,$$
$$\sqrt{\tfrac{1}{2}}(1-j), 0_3, jM_{-28,28}, 0_7, -M_{-28,28}, 0_3,$$
$$\sqrt{\tfrac{1}{2}}(-1-j), 0_3, -M_{-28,28}, 0_7, M_{-28,28}, 0_3,$$
$$\sqrt{\tfrac{1}{2}}(1+j), 0_3, jM_{-28,28}\}$$

$$HES_{-512,511} = \{0_8, HES_{-504,504}, 0_7\}$$

$$HES_{-512,511}(\pm 504) = 0 \quad [\text{Equation 39}]$$

($\gamma=1$, j, $-1$ for $-512 \leq \text{tone} \leq -129 \| 0 \leq \text{tone} \leq 127$, $-128 \leq \text{tone} \leq -1 \| 384 \leq \text{tone} \leq 511$, $128 \leq \text{tone} \leq 383$)

Four M sequences to which respective 1, 1, $-1$ and j are applied (multiplied) are located on the left side of seven tones that have zero value around the DC including the DC itself, and four M sequences to which respective 1, $-1$, $-1$ and j are applied (multiplied) are located in the right side of seven tones that have zero value around the DC including the DC itself.

And different values are allocated to tone indexes $-192$, $-64$, 64 and 192. That is, $(\sqrt{\tfrac{1}{2}})(1-j)$ value is allocated to tone index $-192$, $(\sqrt{\tfrac{1}{2}})(1-j)$ is allocated to tone index $-64$, $(\sqrt{\tfrac{1}{2}})(-1-j)$ is allocated to tone index 64, and $(\sqrt{\tfrac{1}{2}})(1+j)$ is allocated to tone index 192. And zero value is allocated to tone indexes $-128$ and 128.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma $\gamma$ (i.e., phase rotation) is applied to the HE-STF sequence defined by Equations 35 to 39 for each sub channel of 20 MHz. In this case, gamma $\gamma$ may be defined in the same way by applying the tone (or subcarrier) index which is four times upscaled to Equations 9 to 12 above.

Table 10 exemplifies the PAPR for each bandwidth in the case that the HE-STF sequence is defined according to embodiment 2-3 above.

In Table 10, the PAPR is represented by a scalar scale/decibel (dB) scale.

TABLE 10

| PAPR | 80 MHz | |
|---|---|---|
| 11 ac | | 1.6747/2.2394 |
| 1x proposed | 1.9579/2.9179 | 1.9053/2.7996 |
| 2x additional proposed 3 | Case 1 | A 1.9053/2.7996 |
| | | B 1.9227/2.8391 |
| | Case 2 | A 1.9579/2.9179 |
| | | B 1.9709/2.9466 |
| | Case 3 | A 1.9053/2.7996 |
| | | B 1.8411/2.6508 |

Referring to Table 10, in a PPDU transmission in which a FFT size of 4× is used, by using the HE-STF sequence that has 1.6 μs periodicity (i.e., 2× case) according to embodiment 2-3 of the present invention, the PAPR value may be minimized.

Embodiment 2-4

In this embodiment, an HE-STF sequence for PPDU transmissions of 20 MHz, 40 MHz and 80 MHz are proposed.

In this embodiment, in order to minimize PAPR using 4× upsampling, a value of extra tone to which gamma is applied for the M sequence coefficient and a given bandwidth is optimized.

1) HE-STF sequence in frequency domain for 0.8 μs periodicity

The HE-STF sequence (HES) for a 20 MHz PPDU transmission may be generated based on the M sequence defined in Equation 19, as represented in Equation 40 below.

$$HES_{-112,112}(-112:4:112)=M_{-28,28}(-28:28)$$

$$HES_{-128,127}=\{0_{16}, HES_{-112,112}, 0_{15}\}$$

$$HES_{-128,127}(0)=0 \quad \text{[Equation 40]}$$

$HES_{-112,112}$ (−112:4:112) is generated by upscaling four times the tone index of $M_{-28,28}$ (−28:28).

Considering 256 FFT size (i.e., total 256 tones) in 20 MHz ($HES_{-128,127}$), sixteen zero values are configured in the left side of $HES_{-112,112}$, and fifteen zero values are configured in the right side of $HES_{-112,112}$ (i.e., $\{0_{16}, HES_{-112,112}, 0_{15}\}$).

And, zero value is allocated to 0th tone (i.e., $HES_{-128,127}$ (0)).

As such, according to the generation of the HE-STF sequence, the HE-STF tone to which a non-zero value is mapped is contiguously configured at intervals of sixteen tones in entire data tones.

The HE-STF sequence for a PPDU transmission of 40 MHz may be generated based on the M sequence which is defined in Equation 19, as represented by Equation 41 below.

$$HES_{-240,240}(-240:4:240)=\{M_{-28,28}, 0_7, jM_{-28,28}\}$$

$$HES_{-256,255}=\{0_{16}, HES_{-240,240}, 0_{15}\} \quad \text{[Equation 41]}$$

The M sequence is located on the left side of seven tones that has zero value around the DC including the DC itself, and the M sequence to which j is applied (multiplied) is located in the right side of seven tones that have zero value around the DC including the DC itself.

$HES_{-240,240}$ (−240:4:240) is generated by upscaling four times the tone index of the sequence.

Considering 512 FFT size (i.e., total 512 tones) in 40 MHz, sixteen zero values are configured in the left side of $HES_{-240,240}$, and fifteen zero values are configured in the right side of $HES_{-240,240}$ (i.e., $\{0_{16}, HES_{-240,240}, 0_{15}\}$).

As such, according to the generation of the HE-STF sequence, the HE-STF tone to which a non-zero value is mapped is contiguously configured at intervals of sixteen tones in entire data tones.

The HE-STF sequence for a PPDU transmission of 80 MHz may be generated based on the M sequence which is defined in Equation 19, as represented by Equation 42 below.

$$HES_{-496,496}(-496:4:496)=\{M_{-28,28}, 0_3,$$
$$\sqrt{1/2}(1+j), 0_3, jM_{-28,28}, 0_7, -jM_{-28,28}, 0_3,$$
$$\sqrt{1/2}(-1-j), 0_3, M_{-28,28}\}$$

$$HES_{-512,511}=\{0_{16}, HES_{-496,496}, 0_{15}\} \quad \text{[Equation 42]}$$

Two M sequences to which respective 1 and j are applied (multiplied) are located on the left side of seven tones that have zero value around the DC including the DC itself, and two M sequences to which respective −j and 1 are applied (multiplied) are located in the right side of seven tones that have zero value around the DC including the DC itself.

And different values are allocated to tone indexes −64 and 64. That is, $(\sqrt{1/2})(1+j)$ value is allocated to tone index −64, and $(\sqrt{1/2})(-1-j)$ value is allocated to tone index 64.

$HES_{-496,496}$(−496:4:496) is generated by upscaling four times the tone index of the sequence.

Considering 1024 FFT size (i.e., total 1024 tones) in 80 MHz ($HES_{-512,510}$, sixteen zero values are configured in the left side of $HES_{-496,496}$, and fifteen zero values are configured in the right side of $HES_{-496,496}$ (i.e., $\{0_{16}, HES_{-496,496}, 0_{15}\}$).

As such, according to the generation of the HE-STF sequence, the HE-STF tone to which a non-zero value is mapped is contiguously configured at intervals of sixteen tones in entire data tones.

In the given bandwidth (i.e., PPDU transmission bandwidth), gamma γ (i.e., phase rotation) is applied to the HE-STF sequence defined by Equations 40 to 42 for each sub channel of 20 MHz. In this case, gamma γ may be defined in the same way by applying the tone (or subcarrier) index which is four times upscaled to Equations 9 to 12 above.

2) HE-STF sequence in frequency domain for 1.6 μs periodicity

The HE-STF sequence for a 20 MHz PPDU transmission may be generated based on the M sequence which is defined in Equation 19 as represented by Equation 43 below.

$$HES_{-120,120}(-120:2:120)=\{M_{-28,28}, 0_7, -M_{-28,28}\}$$

$$HES_{-128,127}=\{0_8, HES_{-120,120}, 0_7\} \quad \text{[Equation 43]}$$

The M sequence is located on the left side of seven tones that have zero value around the DC including the DC itself, and the M sequence to which −1 is applied (multiplied) is located in the right side of seven tones that have zero value around the DC including the DC itself.

$HES_{-120,124}$(−120:2:120) is generated by upscaling two times the tone index of the sequence.

Considering 256 FFT size (i.e., total 256 tones) in 20 MHz ($HES_{-128,127}$), eight zero values are configured in the left side of $HES_{-120,120}$, and seven zero values are configured in the right side of $HES_{-120,120}$ (i.e., $\{0_8, HES_{-120,120}, 0_7\}$).

As such, according to the generation of the HE-STF sequence, the HE-STF tone to which a non-zero value is mapped is contiguously configured at intervals of eight tones in entire data tones.

The HE-STF sequence for a PPDU transmission of 40 MHz may be generated based on the M sequence which is defined in Equation 19.

Case 1) As represented by Equation 44 below, the number of tones that has zero value in the left side and the number of tones that has zero value in the right side may be configured less than 8, respectively.

$$HES_{-248,248}(-248:2:248)=\{M_{-28,28}, 0_3,$$
$$\sqrt{1/2}(-1+j), 0_3, -jM_{-28,28}, 0_7, M_{-28,28}, 0_3,$$
$$\sqrt{1/2}(-1-j), 0_3, jM_{-28,28}\}$$

$$HES_{-256,255}=\{0_8, HES_{-248,248}, 0_7\} \quad \text{[Equation 44]}$$

Two M sequences to which respective 1 and −j are applied (multiplied) are located on the left side of seven tones that have zero value around the DC including the DC itself, and two M sequences to which respective 1 and j are applied (multiplied) are located in the right side of seven tones that have zero value around the DC including the DC itself.

And different values are allocated to tone indexes −64 and 64. That is, $(\sqrt{1/2})(-1+j)$ value is allocated to tone index −64, and $(\sqrt{1/2})(-1-j)$ value is allocated to tone index 64.

$HES_{-248,248}(-248:2:248)$ is generated by upscaling two times the tone index of the sequence.

Considering 512 FFT size (i.e., total 512 tones) in 40 MHz ($HES_{-256,255}$), eight zero values are configured in the left side of $HES_{-248,248}$, and seven zero values are configured in the right side of $HES_{-248,248}$ (i.e., $\{0_8, HES_{-248,248}, 0_7\}$).

As such, according to the generation of the HE-STF sequence, the HE-STF tone to which a non-zero value is mapped is contiguously configured at intervals of eight tones in entire data tones.

Case 2) As represented by Equation 45 below, the number of tones that has zero value in the left side and the number of tones that has zero value in the right side may be configured greater than 8 and less than 16, respectively.

$$HES_{-248,248}(-248:2:248) = \{M_{-28,28}, 0_3,$$
$$\sqrt{1/2}(-1+j), 0_3, jM_{-28,28}, 0_7, -M_{-28,28}, 0_3,$$
$$\sqrt{1/2}(-1-j), 0_3, jM_{-28,28}\}$$

$$HES_{-256,255} = \{0_8, HES_{-248,248}, 0_7\}$$

$$HES_{-256,255}(\pm 248) = 0 \qquad \text{[Equation 45]}$$

Two M sequences to which respective 1 and j are applied (multiplied) are located on the left side of seven tones that have zero value around the DC including the DC itself, and two M sequences to which respective −1 and j are applied (multiplied) are located in the right side of seven tones that have zero value around the DC including the DC itself.

And different values are allocated to tone indexes −64 and 64. That is, $(\sqrt{1/2})(-1+j)$ value is allocated to tone index −64, and $(\sqrt{1/2})(-1-j)$ value is allocated to tone index 64.

$HES_{-248,248}(-248:2:248)$ is generated by upscaling two times the tone index of the sequence.

And, considering 512 FFT size (i.e., total 512 tones) in 40 MHz ($HES_{-256,255}$), eight tones to which zero value is allocated are located in the left side of $HES_{-248,248}$, and seven tones to which zero value is allocated are located in the right side of $HES_{-248,248}$, such that $HES_{-256,255}$ is generated.

And, zero value is allocated to $HES_{-256,255}(\pm 248)$.

That is, by configuring zero value for all tones located in the right side of $HES_{-256,255}$ (240) tone, the number of tones that has zero value in the right side may be configured to 15, and by configuring zero value for all tones located in the left side of $HES_{-256,255}$ (−240) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19.

Case 1) As represented by Equation 46 below, the number of tones that has zero value in the left side and the number of tones that has zero value in the right side may be configured less than 8, respectively.

$$HES_{-504,504}(-504:2:504) = \{M_{-28,28}, 0_3,$$
$$\sqrt{1/2}(1+j), 0_3, -M_{-28,28}, 0_3,$$
$$\sqrt{1/2}(-1-j), 0_3, -M_{-28,28}, 0_3,$$
$$\sqrt{1/2}(-1-j), 0_3, -M_{-28,28}, 0_7, -M_{-28,28}, 0_3,$$
$$\sqrt{1/2}(-1-j), 0_3, -M_{-28,28}, 0_3,$$
$$\sqrt{1/2}(-1-j), 0_3, -M_{-28,28}, 0_3, \sqrt{1/2}(-1-j), 0_3, -M_{-28,28}\}$$

$$HES_{-512,511} = \{0_8, HES_{-504,504}, 0_7\} \qquad \text{[Equation 46]}$$

Four M sequences to which respective 1, −1, 1 and −1 are applied (multiplied) are located on the left side of seven tones that have zero value around the DC including the DC itself, and four M sequences to which respective 1, −1, −1 and −1 are applied (multiplied) are located in the right side of seven tones that have zero value around the DC including the DC itself.

And, different values are allocated to tone indexes −192, −128, −64, 64, 128 and 192. That is, $(\sqrt{1/2})(1+j)$ value is allocated to tone index −192, $(\sqrt{1/2})(-1-j)$ value is allocated to tone index −128, $(\sqrt{1/2})(-1-j)$ is allocated to tone index −64, $(\sqrt{1/2})(-1-j)$ is allocated to tone index 64, $(\sqrt{1/2})(-1-j)$ is allocated to tone index 128, and $(\sqrt{1/2})(-1-j)$ is allocated to tone index 192.

$HES_{-504,504}(-504:2:504)$ is generated by upscaling two times the tone index of the sequence.

Considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, HES_{-504,504}, 0_7\}$).

As such, according to the generation of the HE-STF sequence, the HE-STF tone to which a non-zero value is mapped is contiguously configured at intervals of eight tones in entire data tones.

Case 2) As represented by Equation 47 below, the number of tones that has zero value in the left side and the number of tones that has zero value in the right side may be configured greater than 8 and less than 16, respectively.

$$HES_{-504,504}(-504:2:504) = \{M_{-28,28}, 0_3,$$
$$\sqrt{1/2}(1+j), 0_3, -M_{-28,28}, 0_3, \sqrt{1/2}(-1-j), 0_3, M_{-28,28}, 0_3,$$
$$\sqrt{1/2}(-1-j), 0_3, -M_{-28,28}, 0_7, M_{-28,28}, 0_3,$$
$$\sqrt{1/2}(-1-j), 0_3, -M_{-28,28}, 0_3,$$
$$\sqrt{1/2}(-1-j), 0_3, -M_{-28,28}, 0_3, \sqrt{1/2}(-1-j), 0_3, -M_{-28,28}\}$$

$$HES_{-512,511} = \{0_8, HES_{-504,504}, 0_7\}$$

$$HES_{-512,511}(\pm 504) = 0 \qquad \text{[Equation 47]}$$

Four M sequences to which respective 1, −1, 1 and −1 are applied (multiplied) are located on the left side of seven tones that have zero value around the DC including the DC itself, and four M sequences to which respective 1, −1, −1 and −1 are applied (multiplied) are located in the right side of seven tones that have zero value around the DC including the DC itself.

And different values are allocated to tone indexes −192, −128, −64, 64, 128 and 192. That is, $(\sqrt{1/2})(1+j)$ value is allocated to tone index −192, $(\sqrt{1/2})(-1-j)$ is allocated to tone index −128, $(\sqrt{1/2})(-1-j)$ is allocated to tone index −64, $(\sqrt{1/2})(-1-j)$ is allocated to tone index 64, $(\sqrt{1/2})(-1-j)$ is allocated to tone index 128, and $(\sqrt{1/2})(-1-j)$ is allocated to tone index 192.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}$(496) tone, the number of tones that has zero value in the right side may be configured to 15, and by configuring zero value for all tones located in the left side of HES$_{-512,511}$(−496) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 40 to 47 for each sub channel of 20 MHz. In this case, gamma γ may be defined in the same way by applying the tone (or subcarrier) index which is four times upscaled to Equations 9 to 12 above.

Table 11 exemplifies the PAPR for each bandwidth in the case that the HE-STF sequence is defined according to embodiment 2-4 above.

In Table 11, the PAPR is represented by a scalar scale/decibel (dB) scale.

TABLE 11

| PAPR | 20 MHz | 40 MHz | | 80 MHz | |
|---|---|---|---|---|---|
| 11 ac | 1.6747/2.3394 | 3.3494/5.2497 | | 2.7214/4.3480 | |
| 1× proposed | 1.7095/2.3288 | 2.7542/4.4000 | | 2.6654/4.2576 | |
| 2× proposed | 2.7542/4.4000 | Case 1 | 2.6654/4.2576 | Case 1 | 2.4688/3.9249 |
| | | Case 2 | 2.7722/4.4283 | Case 2 | 2.5436/4.0545 |

Referring to Table 11, in a PPDU transmission in which a FFT size of 4× is used, by using the HE-STF sequence that has 0.8 μs periodicity (i.e., 1× case) and 1.6 μs periodicity (i.e., 2× case) according to embodiment 2-4 of the present invention, the PAPR value may be minimized.

Embodiment 2-5

In this embodiment, an HE-STF sequence for PPDU transmissions of 20 MHz, 40 MHz and 80 MHz are proposed.

In this embodiment, in order to minimize PAPR using 8× upsampling, a value of extra tone to which gamma is applied for the M sequence coefficient and a given bandwidth is optimized.

1) HE-STF sequence in frequency domain for 0.8 μs periodicity

The HE-STF sequence (HES) for a 20 MHz transmission may be generated based on the M sequence defined in Equation 19, as represented in Equation 48 below.

$$HES_{-112,112}(-112:4:112) = M_{-28,28}(-24:24)$$

$$HES_{-128,127} = \{0_{16}, HES_{-112,112}, 0_{15}\}$$

$$HES_{-128,127}(0) = 0 \quad \text{[Equation 48]}$$

HES$_{-112,112}$ (−112:4:112) is generated by upscaling four times the tone index of $M_{-28,28}$ (−28:28).

Considering 256 FFT size (i.e., total 256 tones) in 20 MHz (HES$_{-128,127}$), sixteen zero values are configured in the left side of HES$_{-112,112}$, and fifteen zero values are configured in the right side of HES$_{-112,112}$ (i.e., $\{0_{16}, HES_{-112,112}, 0_{15}\}$).

And, zero value is allocated to 0th tone (i.e., HES$_{-128,127}$ (0)).

As such, according to the generation of the HE-STF sequence, the HE-STF tone to which a non-zero value is mapped is contiguously configured at intervals of sixteen tones in entire data tones.

The HE-STF sequence for a PPDU transmission of 40 MHz may be generated based on the M sequence which is defined in Equation 19, as represented by Equation 49 below.

$$HES_{-240,240}(-240:4:240) = \{M_{-28,28}, 0_7, jM_{-28,28}\}$$

$$HES_{-256,255} = \{0_{16}, HES_{-240,240}, 0_{15}\} \quad \text{[Equation 49]}$$

The M sequence is located on the left side of seven tones that has zero value around the DC including the DC itself, and the M sequence to which j is applied (multiplied) is located in the right side of seven tones that have zero value around the DC including the DC itself.

HES$_{-240,240}$ (−240:4:240) is generated by upscaling four times the tone index of the sequence.

Considering 512 FFT size (i.e., total 512 tones) in 40 MHz, sixteen zero values are configured in the left side of HES$_{-240,240}$, and fifteen zero values are configured in the right side of HES$_{-240,240}$ (i.e., $\{0_{16}, HES_{-240,240}, 0_{15}\}$).

As such, according to the generation of the HE-STF sequence, the HE-STF tone to which a non-zero value is mapped is contiguously configured at intervals of sixteen tones in entire data tones.

The HE-STF sequence for a PPDU transmission of 80 MHz may be generated based on the M sequence which is defined in Equation 19, as represented by Equation 50 below.

$$HES_{-496,496}(-496:4:496) = \{M_{-28,28}, 0_3,$$
$$\sqrt{1/2}(1+j), 0_3, jM_{-28,28}, 0_7, -jM_{-28,28}, 0_3,$$
$$\sqrt{1/2}(-1-j), 0_3, M_{-28,28}\}$$

$$HES_{-512,511} = \{0_{16}, HES_{-496,496}, 0_{15}\} \quad \text{[Equation 50]}$$

Two M sequences to which respective 1 and j are applied (multiplied) are located on the left side of seven tones that have zero value around the DC including the DC itself, and two M sequences to which respective −j and 1 are applied (multiplied) are located in the right side of seven tones that have zero value around the DC including the DC itself.

And different values are allocated to tone indexes −64 and 64. That is, ($\sqrt{1/2}$)(1+j) value is allocated to tone index −64, and ($\sqrt{1/2}$)(−1−j) value is allocated to tone index 64.

HES$_{-496,496}$ (−496:4:496) is generated by upscaling four times the tone index of the sequence.

Considering 1024 FFT size (i.e., total 1024 tones) in 80 MHz (HES$_{-512,511}$), sixteen zero values are configured in the left side of HES$_{-496,496}$, and fifteen zero values are configured in the right side of HES$_{-496,496}$ (i.e., $\{0_{16}, HES_{-496,496}, 0_{15}\}$).

As such, according to the generation of the HE-STF sequence, the HE-STF tone to which a non-zero value is mapped is contiguously configured at intervals of sixteen tones in entire data tones.

In the given bandwidth (i.e., PPDU transmission bandwidth), gamma γ (i.e., phase rotation) is applied to the HE-STF sequence defined by Equations 48 to 50 for each sub channel of 20 MHz. In this case, gamma γ may be defined in the same way by applying the tone (or subcarrier) index which is four times upscaled to Equations 9 to 12 above.

2) HE-STF sequence in frequency domain for 1.6 μs periodicity

The HE-STF sequence for a 20 MHz PPDU transmission may be generated based on the M sequence which is defined in Equation 19 as represented by Equation 51 below.

$$HES_{-120,120}(-120:2:120)=\{M_{-28,28},0_7,-M_{-28,28}\}$$

$$HES_{-128,127}=\{0_8, HES_{-120,120}, 0_7\} \quad \text{[Equation 51]}$$

The M sequence is located on the left side of seven tones that have zero value around the DC including the DC itself, and the M sequence to which −1 is applied (multiplied) is located in the right side of seven tones that have zero value around the DC including the DC itself.

$HES_{-120,120}(-120:2:120)$ is generated by upscaling two times the tone index of the sequence.

Considering 256 FFT size (i.e., total 256 tones) in 20 MHz ($HES_{-128,127}$), eight zero values are configured in the left side of $HES_{-120,120}$, and seven zero values are configured in the right side of $HES_{-120,120}$ (i.e., $\{0_8, HES_{-120,120}, 0_7\}$).

As such, according to the generation of the HE-STF sequence, the HE-STF tone to which a non-zero value is mapped is contiguously configured at intervals of eight tones in entire data tones.

The HE-STF sequence for a PPDU transmission of 40 MHz may be generated based on the M sequence which is defined in Equation 19.

Case 1) As represented by Equation 52 below, the number of tones that has zero value in the left side and the number of tones that has zero value in the right side may be configured less than 8, respectively.

$$HES_{-248,248}(-248:2:248)=\{M_{-28,28},0_3,$$
$$\sqrt{1/2}(-1-j),0_3,jM_{-28,28},0_7,-M_{-28,28},0_3,$$
$$\sqrt{1/2}(1-j),0_3,jM_{-28,28}\}$$

$$HES_{-256,255}=\{0_8, HES_{-248,248}, 0_7\} \quad \text{[Equation 52]}$$

Two M sequences to which respective 1 and j are applied (multiplied) are located on the left side of seven tones that have zero value around the DC including the DC itself, and two M sequences to which respective −1 and j are applied (multiplied) are located in the right side of seven tones that have zero value around the DC including the DC itself.

And different values are allocated to tone indexes −64 and 64. That is, $(\sqrt{1/2})(-1-j)$ value is allocated to tone index −64, and $(\sqrt{1/2})(1-j)$ value is allocated to tone index 64.

$HES_{-248,248}(-248:2:248)$ is generated by upscaling two times the tone index of the sequence.

Considering 512 FFT size (i.e., total 512 tones) in 40 MHz ($HES_{-256,255}$), eight zero values are configured in the left side of $HES_{-248,248}$, and seven zero values are configured in the right side of $HES_{-248,248}$ (i.e., $\{0_8, HES_{-248,248}, 0_7\}$).

As such, according to the generation of the HE-STF sequence, the HE-STF tone to which a non-zero value is mapped is contiguously configured at intervals of eight tones in entire data tones.

Case 2) As represented by Equation 53 below, the number of tones that has zero value in the left side and the number of tones that has zero value in the right side may be configured greater than 8 and less than 16, respectively.

$$HES_{-248,248}(-248:2:248)=\{M_{-28,28},0_3,$$
$$\sqrt{1/2}(-1+j),0_3,jM_{-28,28},0_7,-M_{-28,28},0_3,$$
$$\sqrt{1/2}(-1-j),0_3,jM_{-28,28}\}$$

$$HES_{-248,248}(-248:2:248)=\{M_{-28,28},0_3,$$
$$\sqrt{1/2}(1-j),0_3,-jM_{-28,28},0_7,-M_{-28,28},0_3,$$
$$\sqrt{1/2}(1+j),0_3,jM_{-28,28}\}$$

$$HES_{-256,255}=\{0_8, HES_{-248,248}, 0_7\}$$

$$HES_{-256,255}(\pm 248)=0 \quad \text{[Equation 53]}$$

Two M sequences to which respective 1 and j are applied (multiplied) are located on the left side of seven tones that have zero value around the DC including the DC itself, and two M sequences to which respective −1 and j are applied (multiplied) are located in the right side of seven tones that have zero value around the DC including the DC itself. And different values are allocated to tone indexes −64 and 64. That is, $(\sqrt{1/2})(-1+j)$ value is allocated to tone index −64, and $(\sqrt{1/2})(-1-j)$ value is allocated to tone index 64. $HES_{-248,248}(-248:2:248)$ is generated by upscaling two times the tone index of the sequence.

Further, two M sequences to which respective 1 and −j are applied (multiplied) are located on the left side of seven tones that have zero value around the DC including the DC itself, and two M sequences to which respective 1 and j are applied (multiplied) are located in the right side of seven tones that have zero value around the DC including the DC itself. And different values are allocated to tone indexes −64 and 64. That is, $(\sqrt{1/2})(1-j)$ value is allocated to tone index −64, and $(\sqrt{1/2})(1+j)$ value is allocated to tone index 64.

$HES_{-248,248}(-248:2:248)$ is generated by upscaling two times the tone index of the sequence.

And, considering 512 FFT size (i.e., total 512 tones) in 40 MHz ($HES_{-256,255}$), eight tones to which zero value is allocated are located in the left side of $HES_{-248,248}$, and seven tones to which zero value is allocated are located in the right side of $HES_{-248,248}$, such that $HES_{-256,255}$ is generated.

And, zero value is allocated to $HES_{-256,255}$ (±248).

That is, by configuring zero value for all tones located in the right side of $HES_{-256,255}$ (240) tone, the number of tones that has zero value in the right side may be configured to 15, and by configuring zero value for all tones located in the left side of $HES_{-256,255}$ (−240) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19.

Case 1) As represented by Equation 54 below, the number of tones that has zero value in the left side and the number of tones that has zero value in the right side may be configured less than 8, respectively.

$$HES_{-504,504}(-504:2:504)=\{M_{-28,28},0_3,$$
$$\sqrt{1/2}(1+j),0_3,-M_{-28,28},0_3,\sqrt{1/2}(-1-j),0_3,M_{-28,28},0_3,$$
$$\sqrt{1/2}(-1-j),0_3,-M_{-28,28},0_7,M_{-28,28},0_3,$$
$$\sqrt{1/2}(-1-j),0_3,-M_{-28,28},0_3,$$
$$\sqrt{1/2}(1-j),0_3,-M_{-28,28},0_3,\sqrt{1/2}(-1-j),0_3,-M_{-28,28}\}$$

$$HES_{-512,511}=\{0_8, HES_{-504,504}, 0_7\} \quad \text{[Equation 54]}$$

Four M sequences to which respective 1, −1, 1 and −1 are applied (multiplied) are located on the left side of seven tones that have zero value around the DC including the DC itself, and four M sequences to which respective 1, −1, −1 and −1 are applied (multiplied) are located in the right side of seven tones that have zero value around the DC including the DC itself.

And, different values are allocated to tone indexes −192, −128, −64, 64, 128 and 192. That is, $(\sqrt{1/2})(1+j)$ value is allocated to tone index −192, $(\sqrt{1/2})(-1-1)$ value is allocated to tone index −128, $(\sqrt{1/2})(-1-1)$ is allocated to tone index −64, $(\sqrt{1/2})(-1-1)$ is allocated to tone index 64, $(\sqrt{1/2})(-1-1)$ is allocated to tone index 128, and $(\sqrt{1/2})(-1-1)$ is allocated to tone index 192.

$HES_{-504,504}(-504:2:504)$ is generated by upscaling two times the tone index of the sequence.

Considering 1024 FFT size (i.e., total 1024 tones) in 80 MHz ($HES_{-512,511}$), eight zero values are configured in the left side of $HES_{-504,504}$, and seven zero values are configured in the right side of $HES_{-504,504}$ (i.e., $\{0_8, \text{In } HES_{-504,504}, 0_7\}$).

As such, according to the generation of the HE-STF sequence, the HE-STF tone to which a non-zero value is mapped is contiguously configured at intervals of eight tones in entire data tones.

Case 2) As represented by Equation 55 below, the number of tones that has zero value in the left side and the number of tones that has zero value in the right side may be configured greater than 8 and less than 16, respectively.

$HES_{-504,504}(-504:2:504)=\{M_{-28,28},0_3,$
$\sqrt{1/2}(1+j),0_3,-M_{-28,28},0_3,\sqrt{1/2}(-1-j),0_3,M_{-28,28},0_3,$
$\sqrt{1/2}(-1-j),0_3,-M_{-28,28},0_7,M_{-28,28},0_3,$
$\sqrt{1/2}(-1-j),0_3,-M_{-28,28},0_3,$
$\sqrt{1/2}(-1-j),0_3,-M_{-28,28},0_3,\sqrt{1/2}(-1-j),0_3,-M_{-28,28}\}$ $HES_{-512,511}=\{0_8, HES_{-504,504}, 0_7\}$ $HES_{-512,511}(\pm 504)=0$      [Equation 55]

Four M sequences to which respective 1, −1, 1 and −1 are applied (multiplied) are located on the left side of seven tones that have zero value around the DC including the DC itself, and four M sequences to which respective 1, −1, −1 and −1 are applied (multiplied) are located in the right side of seven tones that have zero value around the DC including the DC itself.

And different values are allocated to tone indexes −192, −128, −64, 64, 128 and 192. That is, $(\sqrt{1/2})(1+j)$ value is allocated to tone index −192, $(\sqrt{1/2})(-1-j)$ is allocated to tone index −128, $(\sqrt{1/2})(-1-j)$ is allocated to tone index −64, $(\sqrt{1/2})(-1-j)$ is allocated to tone index 64, $(\sqrt{1/2})(-1-j)$ is allocated to tone index 128, and $(\sqrt{1/2})(-1-j)$ is allocated to tone index 192.

$HES_{-504,504}(-504:2:504)$ is generated by upscaling two times the tone index of the sequence.

And, considering 1024 FFT size (i.e., total 1024 tones) in 80 MHz ($HES_{-512,511}$), eight tones to which zero value is allocated are located in the left side of $HES_{-504,504}$, and seven tones to which zero value is allocated are located in the right side of $HES_{-504,504}$, such that $HES_{-512,511}$ is generated.

And, zero value is allocated to $HES_{-512,511}(\pm 504)$.

That is, by configuring zero value for all tones located in the right side of $HES_{-512,511}(496)$ tone, the number of tones that has zero value in the right side may be configured to 15, and by configuring zero value for all tones located in the left side of $HES_{-512,511}(-496)$ tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 48 to 55 for each sub channel of 20 MHz. In this case, gamma γ may be defined in the same way by applying the tone (or subcarrier) index which is four times upscaled to Equations 9 to 12 above.

Table 12 exemplifies the PAPR for each bandwidth in the case that the HE-STF sequence is defined according to embodiment 2-5 above.

In Table 12, the PAPR is represented by a scalar scale/decibel (dB) scale.

TABLE 12

| PAPR | 20 MHz | 40 MHz | | 80 MHz | |
|---|---|---|---|---|---|
| 11 ac | 1.6747/2.2394 | 3.3494/5.2497 | | 2.8551/4.5562 | |
| 1x proposed | 1.7095/2.3288 | 2.8031/4.4765 | | 2.7415/4.3799 | |
| 2x proposed | 2.8031/4.4765 | Case 1 | 2.7415/4.3799 | Case 1 | 2.4688/3.9249 |
| | | Case 2 | 2.7722/4.4283 | Case 2 | 2.5436/4.0545 |

Referring to Table 11, in a PPDU transmission in which a FFT size of 4x is used, by using the HE-STF sequence that has 0.8 μs periodicity (i.e., 1x case) and 1.6 μs periodicity (i.e., 2x case) according to 2–5 embodiment of the present invention, the PAPR value may be minimized.

Embodiment 2-6

In this embodiment, an HE-STF sequence for PPDU transmissions of 20 MHz, 40 MHz and 80 MHz are proposed.

In this embodiment, the M sequence is repeated, and a value is inserted (i.e., allocated) to an extra tone without being optimized in the aspect of the PAPR.

1) HE-STF sequence in frequency domain for 0.8 μs periodicity

The HE-STF sequence (HES) for a 20 MHz transmission may be generated based on the M sequence defined in Equation 19, as represented in Equation 56 below.

$HES_{-112,112}(-112:4:112)=M_{-28,28}(-28:28)$ $HES_{-128,127}=\{0_{16}, HES_{-112,112}, 0_{15}\}$ $HES_{-128,127}(0)=0$      [Equation 56]

$HES_{-112,112}(-112:4:112)$ is generated by upscaling four times the tone index of $M_{-28,28}(-28:28)$.

Considering 256 FFT size (i.e., total 256 tones) in 20 MHz ($HES_{-128,127}$), sixteen zero values are configured in the left side of $HES_{-112,112}$, and fifteen zero values are configured in the right side of $HES_{-112,112}$ $\{0_{16}, HES_{-112,112}, 0_{15}\}$).

And, zero value is allocated to 0th tone (i.e., $HES_{-128,127}(0)$).

As such, according to the generation of the HE-STF sequence, the HE-STF tone to which a non-zero value is mapped is contiguously configured at intervals of sixteen tones in entire data tones.

The HE-STF sequence for a PPDU transmission of 40 MHz may be generated based on the M sequence which is defined in Equation 19, as represented by Equation 57 below.

$$HES_{-240,240}(-240:4:240)=\{M_{-28,28},0_7,jM_{-28,28}\}$$

$$HES_{-256,255}=\{0_{16},HES_{-240,240},0_{15}\} \quad \text{[Equation 57]}$$

The M sequence is located on the left side and the right side of seven tones that has zero value around the DC including the DC itself.

$HES_{-240,240}$ (−240:4:240) is generated by upscaling four times the tone index of the sequence.

Considering 512 FFT size (i.e., total 512 tones) in 40 MHz, sixteen zero values are configured in the left side of $HES_{-240,240}$, and fifteen zero values are configured in the right side of $HES_{-240,240}$ (i.e., $\{0_{16}, HES_{-240,240}, 0_{15}\}$).

As such, according to the generation of the HE-STF sequence, the HE-STF tone to which a non-zero value is mapped is contiguously configured at intervals of sixteen tones in entire data tones.

The HE-STF sequence for a PPDU transmission of 80 MHz may be generated based on the M sequence which is defined in Equation 19, as represented by Equation 58 below.

$$HES_{-496,496}(-496:4:496)=\{M_{-28,28},0_3,a,0_3,M_{-28,28},0_7,M_{-28,28},0_3,b,0_3,M_{-28,28}\}$$

$$HES_{-256,255}=\{0_{16},HES_{-240,240},0_{15}\} \quad \text{[Equation 58]}$$

a and b are selected any value among $\sqrt{1/2}(1+j)$, $\sqrt{1/2}(1-j)$, $\sqrt{1/2}(-1+j)$ and $\sqrt{1/2}(-1-j)$ Two M sequences are located on the left side of seven tones that have zero value around the DC including the DC itself, and two M sequences are located in the right side of seven tones that have zero value around the DC including the DC itself.

And any one arbitrary value among $(\sqrt{1/2})(1+j)$, $(\sqrt{1/2})(1-j)$, $(\sqrt{1/2})(-1+j)$ and $(\sqrt{1/2})(-1-j)$ is selected and allocated to tone indexes −64 and 64.

$HES_{-496,496}(-496:4:496)$ is generated by upscaling four times the tone index of the sequence.

Considering 1024 FFT size (i.e., total 1024 tones) in 80 MHz ($HES_{-512,511}$), sixteen zero values are configured in the left side of $HES_{-496,496}$, and fifteen zero values are configured in the right side of $HES_{-496,496}$ (i.e., $\{0_{16}, HES_{-496,496}, 0_{15}\}$).

As such, according to the generation of the HE-STF sequence, the HE-STF tone to which a non-zero value is mapped is contiguously configured at intervals of sixteen tones in entire data tones.

In the given bandwidth (i.e., PPDU transmission bandwidth), gamma γ (i.e., phase rotation) is applied to the HE-STF sequence defined by Equations 56 to 58 for each sub channel of 20 MHz. In this case, gamma γ may be defined in the same way by applying the tone (or subcarrier) index which is four times upscaled to Equations 9 to 12 above.

2) HE-STF sequence in frequency domain for 1.6 μs periodicity

The HE-STF sequence for a 20 MHz PPDU transmission may be generated based on the M sequence which is defined in Equation 19 as represented by Equation 59 below.

$$HES_{-120,120}(-120:2:120)=M_{-28,28},0_7,M_{-28,28})$$

$$HES_{-128,127}=\{0_{168},HES_{-120,120},0_7\} \quad \text{[Equation 59]}$$

The M sequence is located on the left side and the right side of seven tones that have zero value around the DC including the DC itself.

$HES_{-120,120}(-120:2:120)$ is generated by upscaling two times the tone index of the sequence.

Considering 256 FFT size (i.e., total 256 tones) in 20 MHz ($HES_{-128,127}$), eight zero values are configured in the left side of $HES_{-120,120}$, and seven zero values are configured in the right side of $HES_{-120,120}$ (i.e., $\{0_8, HES_{-120,120}, 0_7\}$).

As such, according to the generation of the HE-STF sequence, the HE-STF tone to which a non-zero value is mapped is contiguously configured at intervals of eight tones in entire data tones.

The HE-STF sequence for a PPDU transmission of 40 MHz may be generated based on the M sequence which is defined in Equation 19.

Case 1) As represented by Equation 60 below, the number of tones that has zero value in the left side and the number of tones that has zero value in the right side may be configured less than 8, respectively.

$$HES_{-248,248}(-248:2:248)=\{M_{-28,28},0_3,a,0_3,M_{-28,28},0_7,M_{-28,28},0_3,b,0_3,M_{-28,28}\}$$

$$HES_{-256,255}=\{0_8,HES_{-248,248},0_7\} \quad \text{[Equation 60]}$$

a and b are selected any value among $\sqrt{1/2}(1+j)$, $\sqrt{1/2}(1-j)$, $\sqrt{1/2}(-1+j)$ and $\sqrt{1/2}(-1-j)$ Two M sequences are located on the left side of seven tones that have zero value around the DC including the DC itself, and two M sequences are located in the right side of seven tones that have zero value around the DC including the DC itself.

And any one arbitrary value among $(\sqrt{1/2})(1+j)$, $(\sqrt{1/2})(1-j)$, $(\sqrt{1/2})(-1+j)$ and $(\sqrt{1/2})(-1-j)$ is selected and allocated to tone indexes −64 and 64.

$HES_{-248,248}(-248:2:248)$ is generated by upscaling two times the tone index of the sequence.

Considering 512 FFT size (i.e., total 512 tones) in 40 MHz ($HES_{-256,255}$), eight zero values are configured in the left side of $HES_{-248,248}$, and seven zero values are configured in the right side of $HES_{-248,248}$ (i.e., $\{0_8, HES_{-248,248}, 0_7\}$).

As such, according to the generation of the HE-STF sequence, the HE-STF tone to which a non-zero value is mapped is contiguously configured at intervals of eight tones in entire data tones.

Case 2) As represented by Equation 61 below, the number of tones that has zero value in the left side and the number of tones that has zero value in the right side may be configured greater than 8 and less than 16, respectively.

$$HES_{-248,248}(-248:2:248)=\{M_{-28,28},0_3,a,0_3,M_{-28,28},0_7,M_{-28,28},0_3,b,0_3,M_{-28,28}\}$$

$$HES_{-256,255}=\{0_8,HES_{-248,248},0_7\}$$

$$HES_{-256,255}(\pm 248)=0 \quad \text{[Equation 61]}$$

a and b are selected any value among $\sqrt{1/2}(1+j)$, $\sqrt{1/2}(1-j)$, $\sqrt{1/2}(-1+j)$ and $\sqrt{1/2}(-1-j)$ Two M sequences are located on the left side of seven tones that have zero value around the DC including the DC itself, and two M sequences are located in the right side of seven tones that have zero value around the DC including the DC itself.

And any one arbitrary value among $(\sqrt{1/2})(1+j)$, $(\sqrt{1/2})(1-j)$, $(\sqrt{1/2})(-1+j)$ and $(\sqrt{1/2})(-1-j)$ is selected and allocated to tone indexes −64 and 64.

HES$_{-248,248}$ (−248:2:248) is generated by upscaling two times the tone index of the sequence.

And, considering 512 FFT size (i.e., total 512 tones) in 40 MHz (HES$_{-256,255}$), eight tones to which zero value is allocated are located in the left side of HES$_{-248,248}$, and seven tones to which zero value is allocated are located in the right side of HES$_{-248,248}$, such that HES$_{-256,255}$ is generated.

And, zero value is allocated to HES$_{-256,255}$ (±248).

That is, by configuring zero value for all tones located in the right side of HES$_{-256,255}$ (240) tone, the number of tones that has zero value in the right side may be configured to 15, and by configuring zero value for all tones located in the left side of HES$_{-256,255}$ (−240) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

The HE-STF sequence for a PPDU transmission of 80 MHz may be generated based on the M sequence which is defined in Equation 19.

Case 1) As represented by Equation 62 below, the number of tones that has zero value in the left side and the number of tones that has zero value in the right side may be configured less than 8, respectively.

$$HES_{-504,504}(-504:2:504)=\{M_{-28,28},0_3,a,0_3,M_{-28,28},$$
$$0_3,b,0_3,M_{-28,28},0_3,c,0_3,M_{-28,28},0_7,M_{-28,28},0_3,d,$$
$$0_3,M_{-28,28},0_3,e,0_3,M_{-28,28},0_3,f,0_3,M_{-28,28}\}$$

$$HES_{-512,511}=\{0_8,HES_{-504,504},0_7\} \quad \text{[Equation 62]}$$

a, b, c, d, e and f are selected any value among $\sqrt{1/2}(1+j)$, $\sqrt{1/2}(1-j)$, $\sqrt{1/2}(-1+j)$ and $\sqrt{1/2}(-1-j)$ Four M sequences are located on the left side of seven tones that have zero value around the DC including the DC itself, and four M sequences are located in the right side of seven tones that have zero value around the DC including the DC itself.

And any one arbitrary value among $(\sqrt{1/2})(1+j)$, $(\sqrt{1/2})(1-j)$, $(\sqrt{1/2})(-1+j)$ and $(\sqrt{1/2})(-1-j)$ is selected and allocated to tone indexes −192, −128, −64, 64, 128 and 192.

HES$_{-504,504}$(−504:2:504) is generated by upscaling two times the tone index of the sequence.

Considering 1024 FFT size (i.e., total 1024 tones) in 80 MHz (HES$_{-512,511}$), eight zero values are configured in the left side of HES$_{-504,504}$, and seven zero values are configured in the right side of HES$_{-504,504}$ (i.e., $\{0_8, HES_{-504,504}, 0_7\}$).

As such, according to the generation of the HE-STF sequence, the HE-STF tone to which a non-zero value is mapped is contiguously configured at intervals of eight tones in entire data tones.

Case 2) As represented by Equation 63 below, the number of tones that has zero value in the left side and the number of tones that has zero value in the right side may be configured greater than 8 and less than 16, respectively.

$$HES_{-504,504}(-504:2:504)=\{M_{-28,28},0_3,a,0_3,M_{-28,28},$$
$$0_3,b,0_3,M_{-28,28},0_3,c,0_3,M_{-28,28},0_7,M_{-28,28},0_3,d,$$
$$0_3,M_{-28,28},0_3,e,0_3,M_{-28,28},0_3,f,0_3,M_{-28,28}\}$$

$$HES_{-512,511}=\{0_8,HES_{-504,504},0_7\}$$

$$HES_{-512,511}(\pm504)=0 \quad \text{[Equation 63]}$$

a, b, c, d, e and f are selected any value among $\sqrt{1/2}(1+j)$, $\sqrt{1/2}(1-j)$, $\sqrt{1/2}(-1+j)$ and $\sqrt{1/2}(-1-j)$ Four M sequences are located on the left side of seven tones that have zero value around the DC including the DC itself, and four M sequences are located in the right side of seven tones that have zero value around the DC including the DC itself.

And any one arbitrary value among $(\sqrt{1/2})(1+j)$, $(\sqrt{1/2})(1-j)$, $(\sqrt{1/2})(-1+j)$ and $(\sqrt{1/2})(-1-j)$ is selected and allocated to tone indexes −192, −128, −64, 64, 128 and 192.

HES$_{-504,504}$(−504:2:504) is generated by upscaling two times the tone index of the sequence.

And, considering 1024 FFT size (i.e., total 1024 tones) in 80 MHz (HES$_{-512,511}$), eight tones to which zero value is allocated are located in the left side of HES$_{-504,504}$, and seven tones to which zero value is allocated are located in the right side of HES$_{-504,504}$, such that HES$_{-512,511}$ is generated.

And, zero value is allocated to HES$_{-512,511}$(±504).

That is, by configuring zero value for all tones located in the right side of HES$_{-512,511}$(496) tone, the number of tones that has zero value in the right side may be configured to 15, and by configuring zero value for all tones located in the left side of HES$_{-512,511}$(−496) tone, the number of tones that has zero value in the left side may be configured to 16.

As such, according to the generation of the HE-STF sequence, the HE-STF tone to which a non-zero value is mapped is contiguously configured at intervals of eight tones in entire data tones.

In the given bandwidth (i.e., PPDU transmission bandwidth), gamma γ (i.e., phase rotation) is applied to the HE-STF sequence defined by Equations 59 to 63 for each sub channel of 20 MHz. In this case, gamma γ may be defined in the same way by applying the tone (or subcarrier) index which is four times upscaled to Equations 9 to 12 above.

Figure 17:
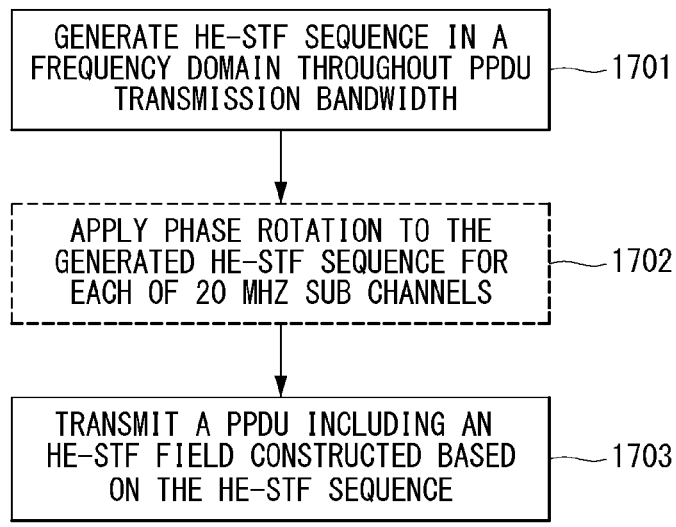
FIG. 17 is a diagram exemplifying a method for a PPDU transmission and reception according to an embodiment of the present invention.

FIG. 17 is a diagram exemplifying a method for a PPDU transmission and reception according to an embodiment of the present invention.

Referring to FIG. 17, a wireless apparatus (an AP or a non-AP STA) generates an HE-STF sequence in a frequency domain throughout the PPDU transmission bandwidth (step, S1701).

Herein, the wireless apparatus may generate the HE-STF sequence using the method according to embodiment 1, embodiment 2, embodiment 2-1, embodiment 2-2, embodiment 2-3, embodiment 2-4, embodiment 2-5 and/or embodiment 2-6.

The wireless apparatus may apply a phase rotation to the generated HE-STF sequence for each of 20 MHz sub channels (step, S1702).

The wireless apparatus may not apply the phase rotation to the HE-STF sequence, and in this case, step S1702 may be omitted.

The wireless apparatus transmits a PPDU that includes an HE-STF field which is constructed based on the HE-STF sequence (step, S1703).

Herein, the HE-STF sequence may be mapped to a data tone except a direct current (DC) tone and a guard tone. That is, in step S1701 above, the length of the HE-STF sequence may be configured to be equal to the number of data tones except the direct current (DC) tone and the guard tone.

In addition, a non-zero value may be mapped to all data tones that have a tone index which is a multiple of a predetermined value (e.g., 4, 8 or 16). That is, in step S1701 above, the HE-STF sequence may be configured such that all data tones that have a tone index which is the multiple of a predetermined value (e.g., 4, 8 or 16).

General Apparatus to which the Present Invention May be Applied

Figure 18:
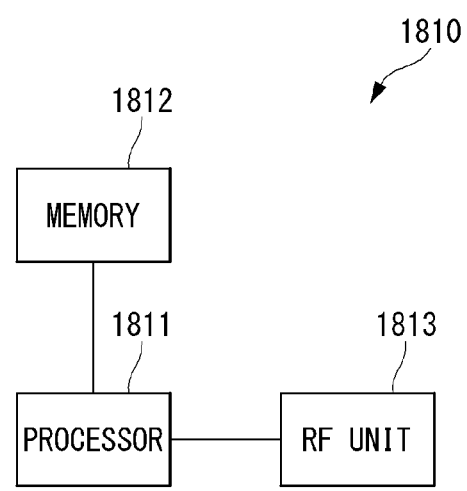
FIG. 18 is a block diagram exemplifying a wireless apparatus according to an embodiment of the present invention.

FIG. 18 is a block diagram exemplifying a wireless apparatus according to an embodiment of the present invention.

Referring to FIG. 18, an apparatus 1810 according to the present invention may include a processor 1811, a memory 1812, and a radio frequency (RF) unit 1813. The apparatus 1810 may be an AP or a non-AP STA for implementing the embodiments of the present invention.

The RF unit 1813 is connected to the processor 1811 to transmit and/receive a wireless signal. For example, the RF unit 1813 may implement the physical layer according to the IEEE 802.11 system.

The processor 1811 is connected to the RF unit 1813 to implement the physical layer and/or MAC layer according to the IEEE 802.11 system. The processor 1811 may be configured to perform the operations according to the various embodiments of the present invention according to FIGS. 1 to 16 above. In addition, a module that implements the operations of the AP and/or the STA according to the various embodiments of the present invention according to FIGS. 1 to 16 above may be stored in the memory 1812 and executed by the processor 1811.

The memory 1812 is connected to the processor 1811 and stores various pieces of information for driving the processor 1811. The memory 1812 may be included in the processor 1811, or installed exterior to the processor 1811 and connected to the processor 1811 with a known means.

Further, the apparatus 1810 may have a single antenna or multiple antennas.

Such a detailed configuration of the apparatus 1810 may be implemented such that the features described in various embodiments of the present invention described above are independently applied or two or more embodiments are simultaneously applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting and receiving a PPDU in a wireless communication system of the present invention is mainly described with examples that applied to the IEEE 802.11 system, but may be applied to other wireless communication system in addition to the IEEE 802.11 system.

The invention claimed is:

1. A method for transmitting a Physical Protocol Data Unit (PPDU) in a wireless communication system, the method performed by a first apparatus, the first apparatus including a transceiver, a memory and a processor, the method comprising:
generating a High Efficiency-Short Training Field (HE-STF) sequence in a frequency domain throughout a transmission bandwidth of the PPDU,
wherein coefficients of the HE-STF sequence including subsequences and a plurality of values are mapped to tones,
wherein the tones have a tone index which is a multiple of a predetermined interval, and
wherein each of the subsequences is multiplied by 1, −1 or a specific imaginary value; and
transmitting the PPDU that includes the HE-STF sequence to a second apparatus.

2. The method of claim 1,
wherein the transmission bandwidth includes at least one sub-channel, and
wherein a phase rotation is applied to the generated HE-STF sequence for each of the at least one sub-channel configured in unit of 20 megahertz (MHz) in the transmission bandwidth of the PPDU.

3. The method of claim 1, wherein each of the subsequences in the HE-STF sequence is an M sequence.

4. The method of claim 1, wherein the subsequences in the HE-STF sequence are mapped to a data tone except a direct current tone and a guard tone.

5. The method of claim 4, wherein the subsequences in the HE-STF sequence are mapped to all data tones that have a tone index which is a multiple of the predetermined interval.

6. The method of claim 5, wherein the predetermined interval is 16 when the HE-STF sequence has 0.8 µs periodicity, and
wherein the predetermined interval is 8 when the HE-STF sequence has 1.6 µs periodicity.

7. A first apparatus for transmitting a Physical Protocol Data Unit (PPDU) in a wireless communication system, the first apparatus comprising:
 a memory;
 a transceiver configured to transmit and receive a wireless signal; and
 a processor configured to control the transceiver,
 wherein the processor is configured to perform:
 generating a High Efficiency-Short Training Field (HE-STF) sequence in a frequency domain throughout a transmission bandwidth of the PPDU,
 wherein coefficients of the HE-STF sequence including subsequences and a plurality of values are mapped to tones,
 wherein the tones have a tone index which is a multiple of a predetermined interval, and
 wherein each of the subsequences is multiplied by 1, −1 or a specific imaginary value; and
 transmitting the PPDU that includes the HE-STF sequence to a second apparatus.

* * * * *